US012396908B2

(12) United States Patent
Baiera

(10) Patent No.: US 12,396,908 B2
(45) Date of Patent: Aug. 26, 2025

(54) STEP STOOL AND METHOD OF USE

(71) Applicant: Vincent J. Baiera, San Diego, CA (US)

(72) Inventor: Vincent J. Baiera, San Diego, CA (US)

( * ) Notice: Subject to any disclaimer, the term of this patent is extended or adjusted under 35 U.S.C. 154(b) by 167 days.

(21) Appl. No.: 18/525,000

(22) Filed: Nov. 30, 2023

(65) Prior Publication Data

US 2024/0091086 A1 Mar. 21, 2024

Related U.S. Application Data

(63) Continuation-in-part of application No. 17/723,282, filed on Apr. 18, 2022, now Pat. No. 11,850,197, which is a continuation-in-part of application No. 17/087,448, filed on Nov. 2, 2020, now Pat. No. 11,311,437, which is a continuation-in-part of application No. 16/782,410, filed on Feb. 5, 2020, (Continued)

(51) Int. Cl.
*A61G 7/053* (2006.01)
*A47C 12/00* (2006.01)

(52) U.S. Cl.
CPC .............. *A61G 7/053* (2013.01); *A47C 12/00* (2013.01)

(58) Field of Classification Search
CPC .. A61G 7/053; A61G 2203/36; A61G 7/1003; A61G 7/1006; A47C 12/00; A61H 2003/005; A61H 2003/004
See application file for complete search history.

(56) References Cited

U.S. PATENT DOCUMENTS 1,641,514 A 9/1927 Wieber
2,445,619 A * 7/1948 Josephs .................. A61G 7/053 5/81.1 R (Continued)

FOREIGN PATENT DOCUMENTS

CN 2624729 7/2004
CN 101666206 6/2012

(Continued)

OTHER PUBLICATIONS

International Search Report and Written Opinion for International Patent Application No. PCT/US2016/036998 mailed on Sep. 12, 2016 in 15 pages.

(Continued)

*Primary Examiner* — Eric J Kurilla
(74) *Attorney, Agent, or Firm* — Procopio, Cory, Hargreaves & Savitch LLP

(57) ABSTRACT

A bed step stool for assisting a user into and out of bed comprising a first support; a second support; a wheel assembly coupled to a side of the bed step stool; a step assembly supported between the first support and the second support and enabling the user to step thereon for assisting the user into and out of the bed; wherein the bed step stool includes a first orientation where the bed step stool is stabilized on the surface and the wheel assembly coupled to the side of the bed step stool is out of the way, and a second orientation where the bed step stool is tilted towards the side and is supported by the wheel assembly coupled to the side of the bed step stool, allowing rolling movement of the bed step stool on the surface via the one or more wheels of the wheel assembly.

6 Claims, 42 Drawing Sheets

Related U.S. Application Data now Pat. No. 11,083,655, which is a continuation-in-part of application No. 16/372,181, filed on Apr. 1, 2019, now Pat. No. 10,835,432, which is a continuation-in-part of application No. 16/262,668, filed on Jan. 30, 2019, now Pat. No. 10,456,310, which is a continuation-in-part of application No. 16/042,930, filed on Jul. 23, 2018, now Pat. No. 10,213,353, which is a continuation of application No. 15/175,872, filed on Jun. 7, 2016, now Pat. No. 10,034,807.

(60) Provisional application No. 62/184,102, filed on Jun. 24, 2015.

(56) References Cited

U.S. PATENT DOCUMENTS

| | | | | | |
|---|---|---|---|---|---|
| 2,644,961 | A * | 7/1953 | Hillenbrand | A61G 7/053 5/507.1 |
| 2,659,902 | A * | 11/1953 | Fitzgerald | A61G 7/053 182/39 |
| 2,682,671 | A | 7/1954 | Faure | |
| 2,941,215 | A * | 6/1960 | Johnson | A61G 7/053 5/507.1 |
| 2,975,436 | A | 3/1961 | Ries | |
| 3,085,258 | A * | 4/1963 | Wolferts | A61H 3/00 5/503.1 |
| 3,162,867 | A * | 12/1964 | Hoffman | A61G 7/053 5/507.1 |
| 3,176,322 | A * | 4/1965 | Mulcahy | A61G 7/053 5/503.1 |
| 3,668,723 | A * | 6/1972 | Bratton | A61G 7/053 5/652 |
| 3,739,793 | A * | 6/1973 | Wilson | A61G 7/1038 5/503.1 |
| 3,918,108 | A * | 11/1975 | Feyerherm | A61G 7/1059 4/667 |
| 3,957,071 | A * | 5/1976 | Kenner | A61H 3/00 108/115 |
| 4,503,932 | A | 3/1985 | Hilton | |
| 4,722,356 | A * | 2/1988 | Rehder | A61H 3/00 297/423.37 |
| 4,982,464 | A | 1/1991 | Lucero | |
| 5,046,206 | A * | 9/1991 | Broyles | A47C 20/028 5/648 |
| 5,131,494 | A | 7/1992 | Heifetz | |
| 5,347,666 | A * | 9/1994 | Kippes | A61G 7/1038 5/81.1 R |
| 5,354,022 | A | 10/1994 | Coonrod | |
| 5,357,876 | A | 10/1994 | Kniefel et al. | |
| 5,449,013 | A * | 9/1995 | Landers | A61G 7/053 135/74 |
| 5,535,459 | A * | 7/1996 | DiMatteo | A61G 7/0573 297/DIG. 10 |
| 5,579,864 | A | 12/1996 | Shorrock | |
| D411,888 | S | 7/1999 | King | |
| 5,971,102 | A | 10/1999 | Brown | |
| 6,026,933 | A | 2/2000 | King et al. | |
| 6,134,731 | A * | 10/2000 | Thom | A61G 7/053 5/426 |
| 6,401,280 | B1 * | 6/2002 | Baker | A61G 7/0507 5/426 |
| 6,871,364 | B1 * | 3/2005 | Leoutsakos | B66F 7/0641 5/81.1 R |
| 6,926,119 | B1 | 8/2005 | Schrock | |
| 7,076,817 | B1 * | 7/2006 | Garver | A61G 7/0507 425/430 |
| D576,291 | S | 9/2008 | Latimer et al. | |
| 7,987,538 | B1 | 8/2011 | Kimball | |
| D701,069 | S * | 3/2014 | Miller | D6/718.3 |
| 8,720,645 | B2 | 5/2014 | Parker | |
| 9,016,715 | B2 | 4/2015 | Moliner | |
| 10,456,310 | B2 * | 10/2019 | Baiera | A61G 7/053 |
| 10,543,145 | B1 * | 1/2020 | McGuire | A61G 7/10 |
| 10,646,396 | B2 | 5/2020 | Lass | |
| 10,986,928 | B2 | 4/2021 | Dumont | |
| 2004/0049855 | A1 * | 3/2004 | Leoutsakos | A47C 19/02 5/81.1 R |
| 2004/0107519 | A1 * | 6/2004 | Grody | A61G 7/053 14/69.5 |
| 2005/0262632 | A1 * | 12/2005 | Wu | A61G 7/0507 5/426 |
| 2007/0083994 | A1 * | 4/2007 | Miller | A47C 21/08 5/430 |
| 2009/0139798 | A1 | 6/2009 | Bernard | |
| 2009/0294214 | A1 | 12/2009 | Vosbikian et al. | |
| 2011/0078856 | A1 | 4/2011 | Schulte | |
| 2012/0061181 | A1 | 3/2012 | Onobrakpeya | |
| 2012/0079651 | A1 | 4/2012 | Lafontaine | |
| 2013/0111663 | A1 | 5/2013 | Brown | |
| 2014/0009917 | A1 * | 1/2014 | Westermann | A61G 7/002 5/616 |
| 2014/0208493 | A1 | 7/2014 | Ahmed | |
| 2015/0216750 | A1 * | 8/2015 | Miller | A61G 7/0518 29/428 |
| 2016/0374881 | A1 * | 12/2016 | Baiera | A61G 7/053 5/507.1 |
| 2017/0202727 | A1 * | 7/2017 | Wegener | A61H 3/00 |
| 2019/0105222 | A1 | 4/2019 | Fellingham et al. | |
| 2020/0352400 | A1 | 11/2020 | Grendel | |
| 2021/0386612 | A1 * | 12/2021 | Colon | A61H 3/00 |
| 2022/0104626 | A1 | 4/2022 | Pinnock | |

FOREIGN PATENT DOCUMENTS

| | | | |
|---|---|---|---|
| DE | 9408273 | U1 | 10/1994 |
| GB | 979347 | A | 1/1965 |
| JP | 3191784 | U | 7/2014 |

OTHER PUBLICATIONS

Sammons Preston Floor to Tub Bath Rail, Curved Grab Bar with 200 lbs Capacity for Shower or Bathtub, Rail Clamps and Tightens to Tub Wall, Fits Most Modern Bathtubs, 34" from Floor to Tub—Product No. 00885914021026 by Sammons Preston—accessed on May 30, 2019. https://www.amazon.com/Sammons-Preston-Capacity-Tightens-Bathtubs/dp/B000ITK7VA/ref=sr_1_2_sspa?keywords=step2bed&qid=1551886206&s=gateway&sr=8-2-spons&psc=1.

* cited by examiner

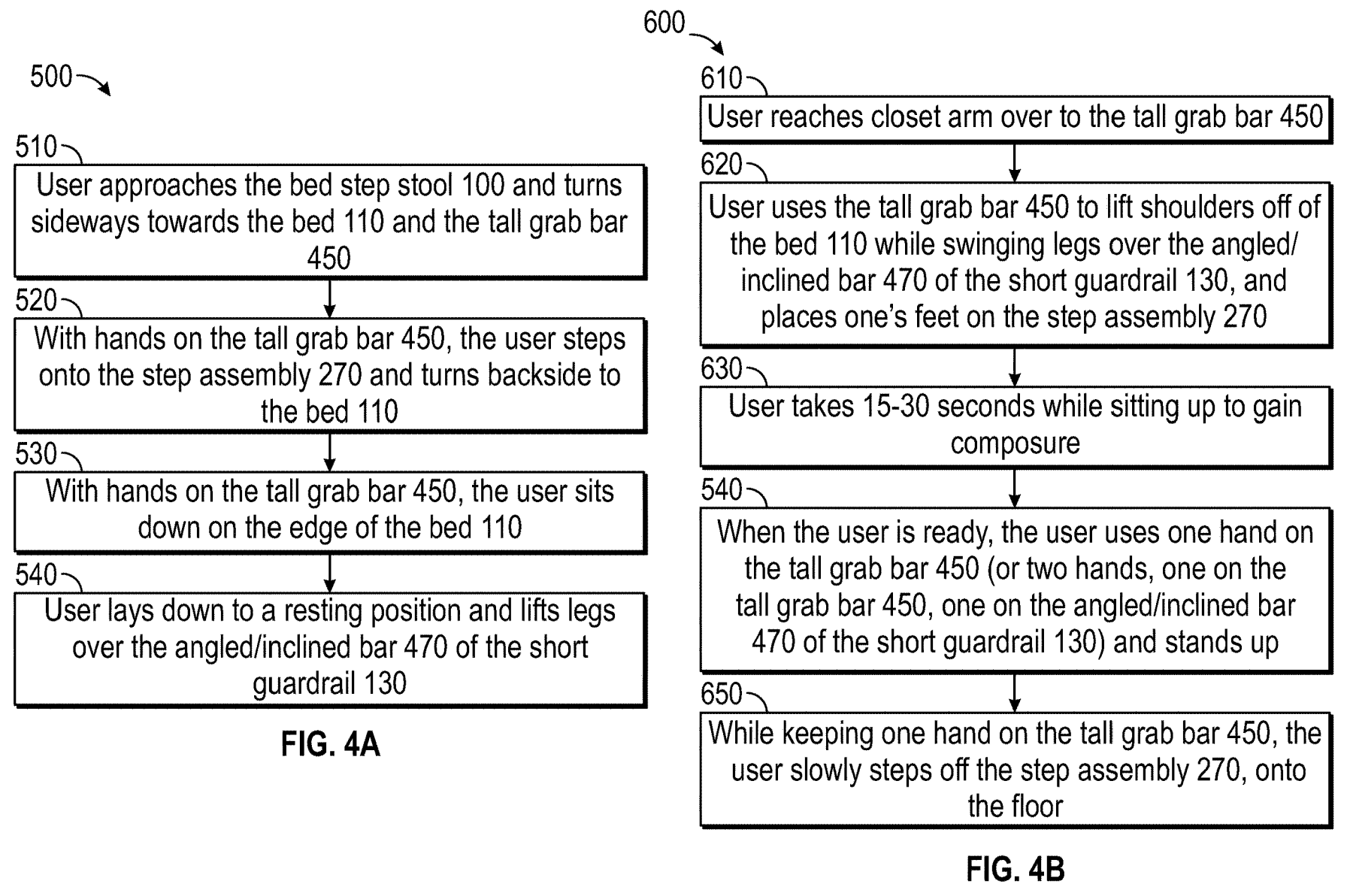

500

- 510 — User approaches the bed step stool 100 and turns sideways towards the bed 110 and the tall grab bar 450
- ↓
- 520 — With hands on the tall grab bar 450, the user steps onto the step assembly 270 and turns backside to the bed 110
- ↓
- 530 — With hands on the tall grab bar 450, the user sits down on the edge of the bed 110
- ↓
- 540 — User lays down to a resting position and lifts legs over the angled/inclined bar 470 of the short guardrail 130

FIG. 4A

600

- 610 — User reaches closet arm over to the tall grab bar 450
- ↓
- 620 — User uses the tall grab bar 450 to lift shoulders off of the bed 110 while swinging legs over the angled/inclined bar 470 of the short guardrail 130, and places one's feet on the step assembly 270
- ↓
- 630 — User takes 15-30 seconds while sitting up to gain composure
- ↓
- 540 — When the user is ready, the user uses one hand on the tall grab bar 450 (or two hands, one on the tall grab bar 450, one on the angled/inclined bar 470 of the short guardrail 130) and stands up
- ↓
- 650 — While keeping one hand on the tall grab bar 450, the user slowly steps off the step assembly 270, onto the floor

FIG. 4B

STEP STOOL AND METHOD OF USE

CROSS-REFERENCE TO RELATED APPLICATION

This application is a continuation-in-part of U.S. patent application Ser. No. 17/723,282, filed Apr. 18, 2021, which is a continuation-in-part of U.S. patent application Ser. No. 17/087,448, filed Nov. 2, 2020, which is a continuation-in-part of U.S. patent application Ser. No. 16/782,410, filed Feb. 5, 2020, which is a continuation-in-part of U.S. patent application Ser. No. 16/372,181, filed Apr. 1, 2019, which is a continuation-in-part of U.S. patent application Ser. No. 16/262,668, filed Jan. 30, 2019, which is a continuation-in-part of U.S. patent application Ser. No. 16/042,930, filed Jul. 23, 2018, which is a continuation of U.S. patent application Ser. No. 15/175,872 filed Jun. 7, 2016, which claims the benefit of provisional patent application No. 62/184,102 filed on Jun. 24, 2015. All of these prior applications are incorporated by reference herein.

FIELD OF THE INVENTION

The present subject matter relates generally to a step stool for entry to a bath tub. More specifically, the present invention relates to a step stool and guardrail that allows users to get into a bathtub from the side of the bathtub by way rails set at a perpendicular angle to the bathtub.

BACKGROUND OF THE INVENTION

Seniors and individuals with limited mobility must employ a variety of protective measures when it comes to simple, everyday tasks such as getting in and out of bathtub, bed, and even sleeping. They may use bed rails running parallel to the bed in order to prevent falls, and step stools to help them get in to bed.

A difficulty with bed rails is that they are usually attached to the bed, typically by being placed between the mattress and box spring of the bed. They are not mobile or portable. This makes the user's sleeping situation less flexible.

Additionally, even using a combination of bed rail and step stool, seniors and persons with limited mobility are still required to enter their bed from the top or the bottom (where there are no guardrails). This may inconvenience individuals who must climb up their beds or over their pillows in order to arrive at their desired resting position.

Another challenge for seniors and individuals with limited mobility is getting in and out of a bathtub. The high walls of the bathtub, along with a possibly wet/slippery surface of a bathtub and/or bathroom floor, can make getting into and out of a bathtub treacherous for seniors and individuals with limited mobility

SUMMARY OF THE INVENTION

An aspect of the disclosure involves a bed step stool for assisting a user into and out of bed including opposite sides, a head, and a foot comprising a first support to be disposed closer to the head of the bed; a second support to be disposed closer to the foot of the bed, the bed step stool including a side and at least one of the first support and the second support including an upper portion configured to be gripped by a user; a wheel assembly coupled to the side of the bed step stool and including one or more wheels configured to roll on a surface; a step assembly supported between the first support and the second support, the step assembly to enable the user to step thereon for assisting the user into and out of the bed; wherein the first support and the second support define an unobstructed pathway for entry and exit with respect to the bed and the bed step stool that is perpendicular with respect to the sides of the bed whereby the user goes between the first support and the second support, onto the step assembly, and off the step assembly without any obstruction, and the bed step stool including a first orientation where the bed step stool is stabilized on the surface and the wheel assembly coupled to the side of the bed step stool is out of the way, and a second orientation where the bed step stool is tilted towards the side and is supported by the wheel assembly coupled to the side of the bed step stool, allowing rolling movement of the bed step stool on the surface via the one or more wheels of the wheel assembly.

One or more implementations of the aspect of invention described above includes one or more of the following: the wheel assembly is detachably coupled to the side of the bed step stool.

Another aspect of the disclosure involves a bed step stool for assisting a user into and out of bed including opposite sides, a head, and a foot comprising: a first support to be disposed closer to the head of the bed; a second support to be disposed closer to the foot of the bed; a wheel assembly coupled to the side of the bed step stool and including one or more wheels configured to roll on a surface; a step assembly supported between the first support and the second support, the step assembly to enable the user to step thereon for assisting the user into and out of the bed; a raising and lowering mechanism disposed under the step assembly configured to raise and lower the step assembly; wherein the first support and the second support define an unobstructed pathway for entry and exit with respect to the bed and the bed step stool that is perpendicular with respect to the sides of the bed whereby the user goes between the first support and the second support, onto the step assembly, and off the step assembly without any obstruction, and the bed step stool including a first orientation where the raising and lowering mechanism orients the step assembly in a raised position to facilitate getting the user into and out of bed and a second orientation where the raising and lowering mechanism orients the step assembly in a lowered position to facilitate getting the user onto and off of the step relative to a support surface.

One or more implementations of the aspect of invention described above includes one or more of the following: the raising and lowering mechanism is a stair stepper mechanism that lowers when the user steps on the step assembly and then recoils, lifting the user up after both feet are on the step assembly; the raising and lowering mechanism is a manual control and a hydraulic or pneumatic vertical lift mechanism that a user controls via the manual control to raise and lower the step assembly to a desired height; and/or the raising and lowering mechanism is a manual control and a counterbalance vertical lift mechanism that a user controls via the manual control to raise and lower the step assembly to a desired height.

BRIEF DESCRIPTION OF THE DRAWINGS

FIG. 4A is a flow chart illustrating an exemplary method of using the bed step stool to get into the bed shown in FIG. 1;

FIG. 4B is a flow chart illustrating an exemplary method of using the bed step stool to get out of the bed shown in FIG. 1;

DETAILED DESCRIPTION OF EMBODIMENTS OF INVENTION

Figure 1:
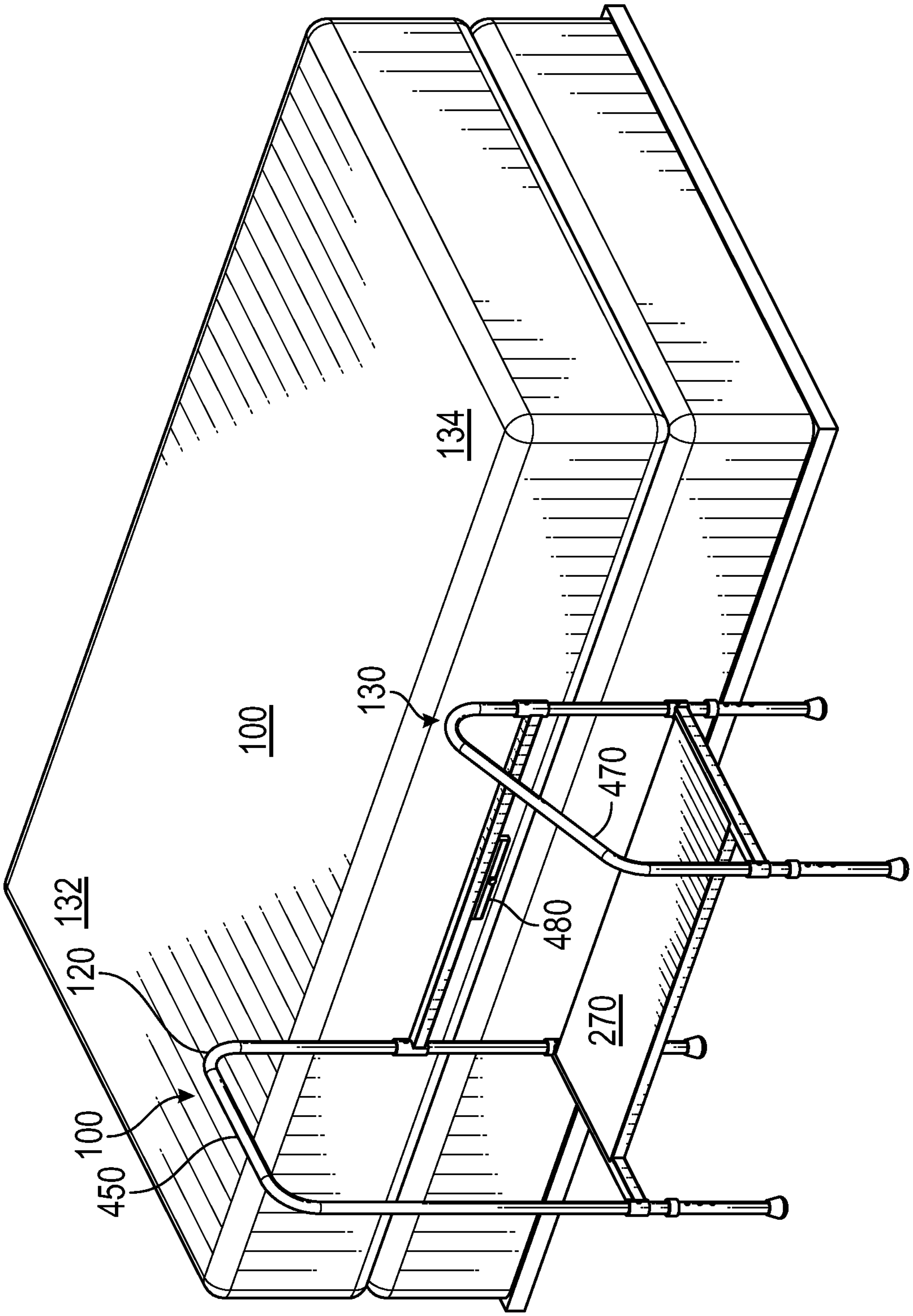
FIG. 1 is a perspective view of an embodiment of the bed step stool shown in position/use adjacent to a side of a user's bed.
Figure 2:
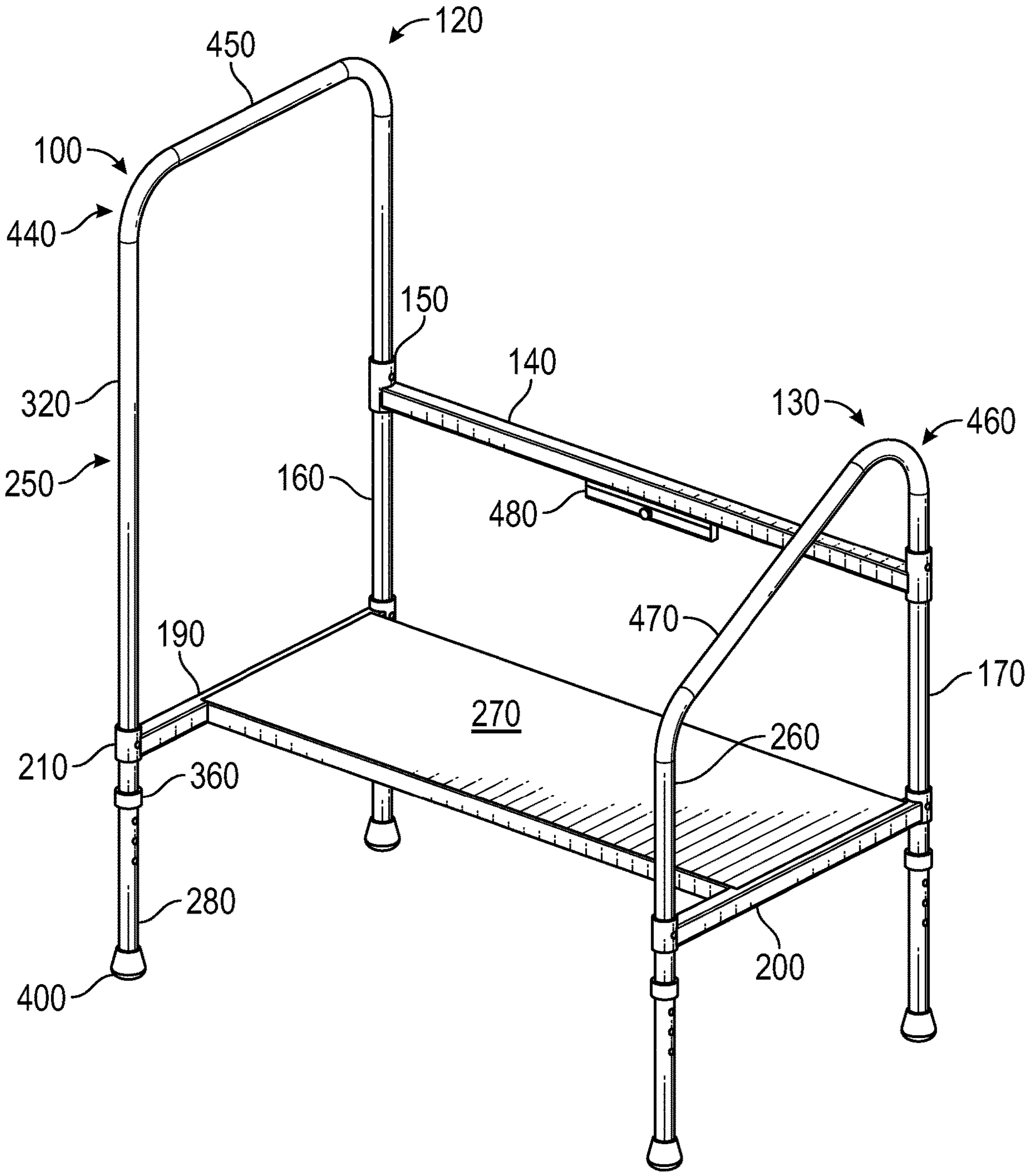
FIG. 2 is a perspective view of the bed step stool of FIG. 1.
Figure 3A:
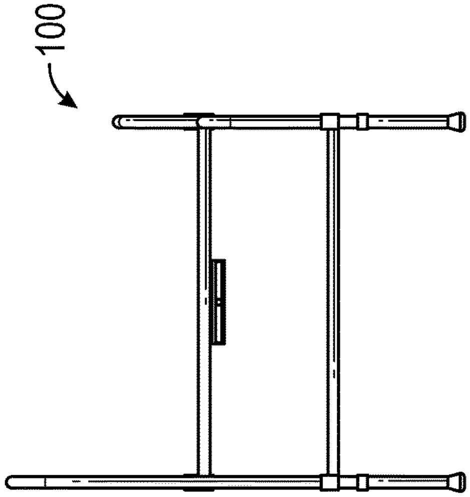
FIGS. 3A, 3B, 3C, 3D, 3E, and 3F are front, rear, right, left, top, and bottom views of the bed step stool of FIG. 1.
Figure 3B:
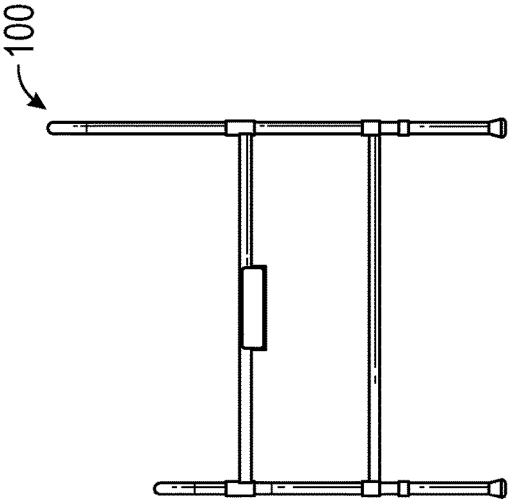
Figure 3C:
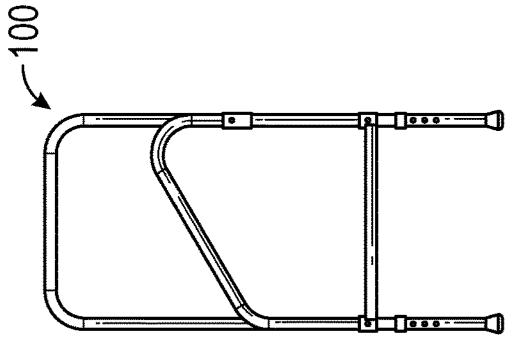
Figure 3D:
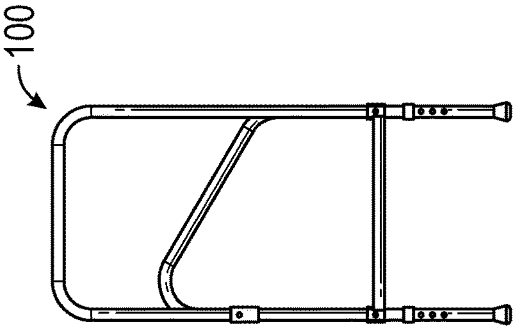
Figure 3E:
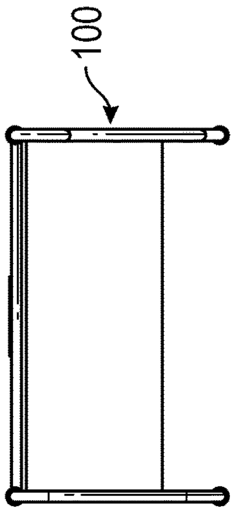
Figure 3F:
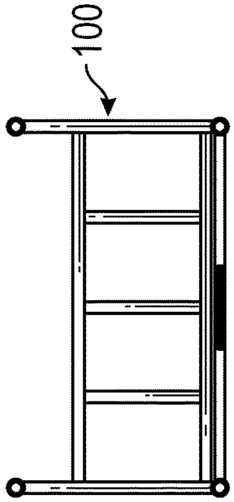

Before describing a bathtub step stool, with reference to FIGS. 1 to 3F, an embodiment of a bed step stool 100 for use by a user to assist the user to get into and out of a bed 110 will first be described. Although the bed step stool 100 is shown and described as an aid for assisting one to get into and out of a bed, the step stool 100 may be used to assist one onto and off of various types of elevated furniture. For example, but not by way of limitation, the step stool 100 may be used to assist one to get in and out of a vehicle (e.g., car, van) that may be too high for them (e.g., step stool1 100 may be a different model/version having a lower cross bar in the back, but still maintain similar functionality to that shown and described herein). The step stool 100 may be used in the home to assist one onto and off of an elevated chair/stool (e.g., bar stool) taller than a kitchen chair.

The bed step stool 100 includes a long(er)/tall(er) guardrail/first support 120 parallel with and spaced with respect to a short(er) guardrail/second support 130. The tall guardrail 120 is closer to a head 132 of the bed and the short guardrail 130 closer to a foot 134 of the bed 110. The tall guardrail 120 is taller than a height of the bed 110 at which the user is supported when resting and the short guardrail 130 is closer in height to the height of the bed 110. The tall guardrail 120 and the short guardrail 130 define respective parallel planes that are perpendicular with a plane define by a side 136 of the bed 110.

A lateral crossbar assembly 140 connects (via fasteners 150) a back leg 160 of the tall guardrail 120 to a back leg 170 of the short guardrail 130.

Step crossbar assemblies 190, 200 connect (via fasteners 210) the back legs 160, 170 to front legs 250, 260 of the tall guardrail 120 and short guardrail 130, respectively.

A step assembly 270 has a generous width and depth to enable a user (e.g., senior) to securely step onto the step assembly 270. The step assembly 270 may include a slip protection tape or another slip prevention material on an upper surface. The step assembly 270 is supported between the tall guardrail 120 and the short guardrail 130 by the step crossbar assemblies 190, 200.

The longitudinal direction of the lateral crossbar assembly 140 and the step assembly 270 are parallel with the plane define by a side 136 of the bed 110 and perpendicular with respect to planes defined by the tall guardrail 120 and the short guardrail 130. When the bed step stool 100 is in position, with the crossbar assembly 140 adjacent to or abutting the side 136 of the bed 110, the bed step stool 100 and the bed 110 form a T-shaped configuration.

The tall guardrail 120 and short guardrail 130 include elevation tubes/legs 280 telescopingly received in upper tubes 320, 33, 340, 350 for adjusting the height of the entire bed step stool 100 and the height of the step assembly 270 via rotatable adjustment collars 360 and bolt holes/bolts.

The step height is what goes up or down based off the bolt hole you choose (the height) that works for you. The tall and short rail's height relationship doesn't change after it is put together, only the step height and the unit as a whole then keeps the same relationship of distance.

Lower ends of the elevation tubes 280 include rubber tips 400.

An upper portion 440 of the tall guardrail 120 includes an upside-down U-shaped tall grab bar 450.

An upper portion 460 of the short guardrail 130 includes an angled/inclined bar 470.

The lateral crossbar assembly 140 carries a motion-detecting lighting assembly 480 for illuminating via one or more lights (e.g., LEDs) the step assembly 270 upon detected motion (e.g., movement of the user's legs) of the user by a motion sensor.

In an alternative embodiment, the bed step stool 100 includes a configuration for use with the opposite side of the bed 110. In this alternative embodiment, instead of the tall guardrail 120 on the left side and the short guardrail 130 on the right side of the step assembly 270, the tall guardrail 120 is on the right side and the short guardrail 130 on the left side of the step assembly 270. The upper portions 440, 460 of the tall guardrail 120 and the short guardrail 130 (or, alternatively, the tall guardrail 120 and the short guardrail 130) are reversible to enable the bed step stool 100 to accommodate both sides of the bed 110.

Although the bed step stool 100 shown may accommodate a wide variety of different-sized users, in an alternative embodiment, the bed step stool 100 includes one or more configurations to accommodate different types/sized users.

With reference additionally to FIG. 4A, an exemplary method 500 of using the bed step stool 100 to get into the bed 110 will be described. At step 510, the user approaches the bed step stool 100 and turns sideways towards the bed 110 and the tall grab bar 450 (i.e., user facing towards tall grab bar 450 and the head 132 of the bed 110). As the user approaches the bed step stool 100, the motion-detecting lighting assembly 460 illuminates the step assembly 270 upon detected movement of the user's legs. At step 520, with hands on the tall grab bar 450, the user steps onto the step assembly 270 and turns backside to the bed 110. At step 530, with hands on the tall grab bar 450, the user sits down on the edge of the bed 110. At step 540, the user lays down to a resting position and lifts one's legs over the angled/inclined bar 470 of the short guardrail 130.

With reference additionally to FIG. 4B, an exemplary method 600 of using the bed step stool 100 to get out of the bed 110 will be described. At step 610, a user reaches one's closest arm over to the tall grab bar 450. At step 620, the user uses the tall grab bar 450 to lift one's shoulders off of the bed 110 while swinging legs over the angled/inclined bar 470 of the short guardrail 130, and places one's feet on the step assembly 270. As the user swings one's legs over the angled/inclined bar 470 and one's feet approach the step assembly 270, the motion-detecting lighting assembly 460 illuminates the step assembly 270 upon detected movement of the user's legs. At step 630, the user takes 15-30 seconds while sitting up to gain composure. At step 640, when the user is ready, the user uses one hand on the tall grab bar 450 (or two hands, one on tall grab bar 450, one on angled/inclined bar 470 of the short guardrail 130) and stands up. At step 650, while keeping one hand on the tall grab bar 450, the user slowly steps off the step assembly 270, onto the floor.

Advantages of the bed step stool 100 and above described methods include one or more of the following: the perpendicular orientation of the tall guardrail 120 and the short guardrail 130 with respect to of the bed step stool 100 provides a pathway to entry/exit with respect to the bed 110 whereby the user goes between the guardrails 120, 130 to step on the step assembly 270, the bed step stool 100 allows individuals to safely enter/exit their bed 110 from the side 136 of the bed 110, the bed step stool 100 provides guardrails 120, 130 for support and protection at a perpendicular angle to the longitudinal direction of the bed 110 (or plane define by the side 136 of the bed 110), allowing the user to safely remain secure in the bed 110, the elevation tubes/legs 280 telescopingly received in upper tubes 320, 33, 340, 350 allow the user to adjust the height of the bed step stool 100 so that the bed step stool 100 can be used with a variety of bed heights and/or user heights, the bed step stool 100 allows users to enter the bed 110 at the final point of resting and eliminates the need to move the bed 110 up or down into position, the step assembly 270 of the bed step stool 100 includes a wide platform to improve safety and ease of use, the bed step stool 100 may be used in any setting, including a nursing home, a hospital, or a patient's home; the bed step stool 100 may be used with different types of beds/furniture; because the bed step stool 100 rests on legs rather than between the mattress and the box spring, there is no limit to the type of furniture/beds that the bed step stool 100 can be used in connection with, the bed step stool 100 is portable (the bed step stool 100 in the embodiment shown and described is designed not to attach to the bed, allowing one to easily store the bed step stool 100 by sliding it into a corner or closet when not in use); the bed step stool 100 helps reduce a senior's risk of falling because as they use the product their actual fear of falling is reduced; and/or the bed step stool 100 provides the user with a sense of safety (using the step 270 and grab bar(s) 450, 470 make the user more confident in one's movements; when the user feels safer, the user reduces the risk of falling by reducing one's fear of falling).

Figure 5:
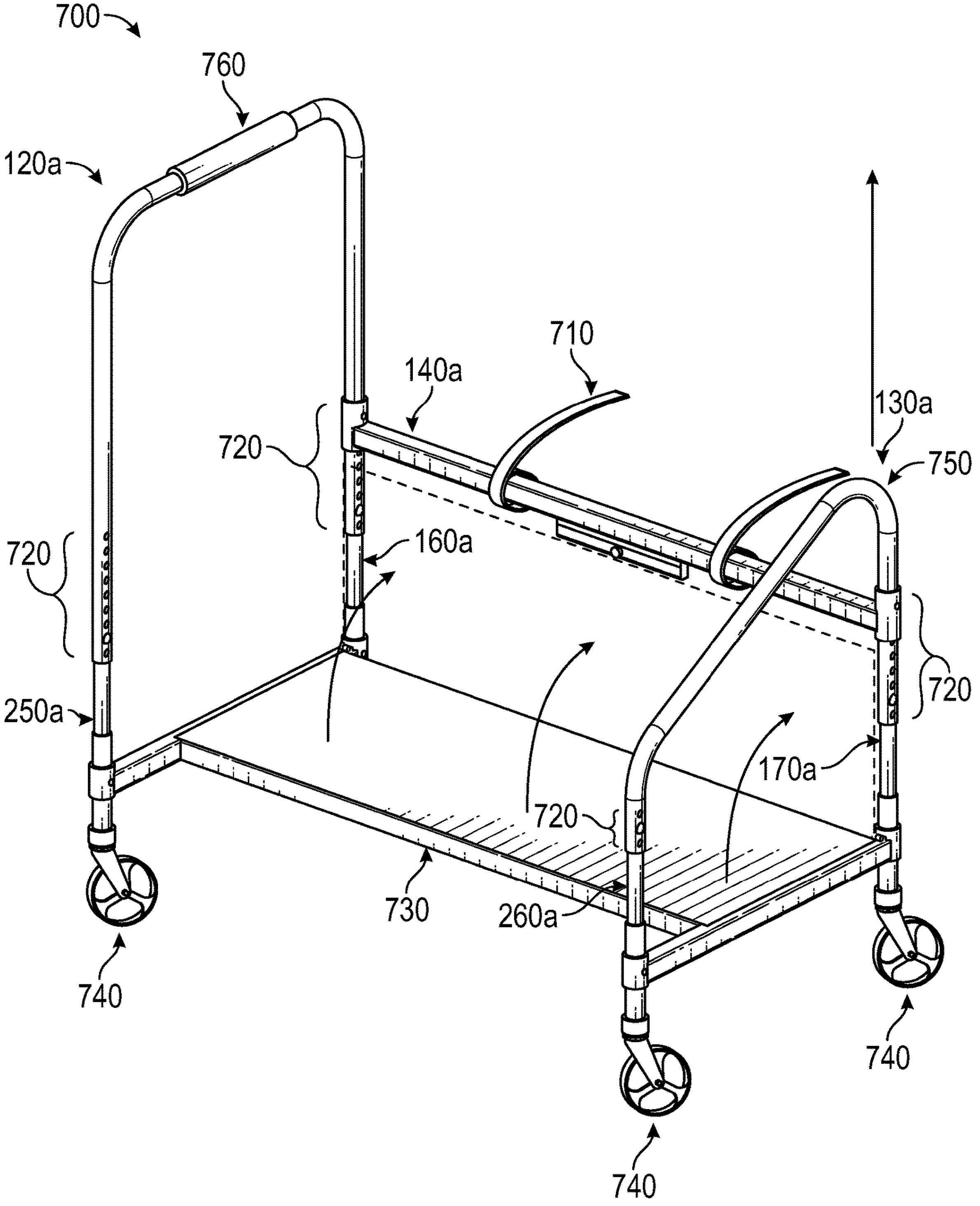
FIG. 5 is a perspective view of another embodiment of a bed step stool.

With FIG. 5, another embodiment of a bed step stool 700 that may include one or more of the below-described features will be described, with like elements to those shown and/or described with respect to FIGS. 1-4 shown and/or described with like reference numbers, but with an "a" suffix, and with the subject matter described above with respect to FIGS. 1-4 incorporated herein. Straps 710 made of hook and loop fasteners (e.g., Velcro®) or another soft material connect the lateral crossbar assembly 140*a* to a bed frame to improve stability of the bed step stool 700. Height adjustment mechanisms 720 are disposed at four corners (e.g., at bottom of guard rails 120*a*, 130*a* and top of legs 160*a*, 170*a*, 250*a*, 260*a*) above step assembly 730 to allow both the tall guard rail rai 120*a* and/or the short guard rail 130*a* to adjust in height in a manner different than that previously described. Step assembly 730 flips/rotates up and allows the user to have the step in a low/deployed mode/position to step on to assist in getting into and/or out of bed or retracted/high/flipped/rotated mode that allows the user to walk or step more into the middle of the bed step stool 700 without stepping up at all. Lockable wheels 740 connected to the bottom of each of the four legs 160*a*, 170*a*, 250*a*, 260*a*. The wheels 740 may be inserted in the bottom of each of the four legs 160*a*, 170*a*, 250*a*, 260*a* in lieu of height adjustment legs inserted in the bottom of each of the four legs 160*a*, 170*a*, 250*a*, 260*a*. Short guard rail 130*a* raises in height to at least the same height as the tall guard rail 120*a*. The tall guard rail 120*a* includes a padded grip 760.

Figure 6A:
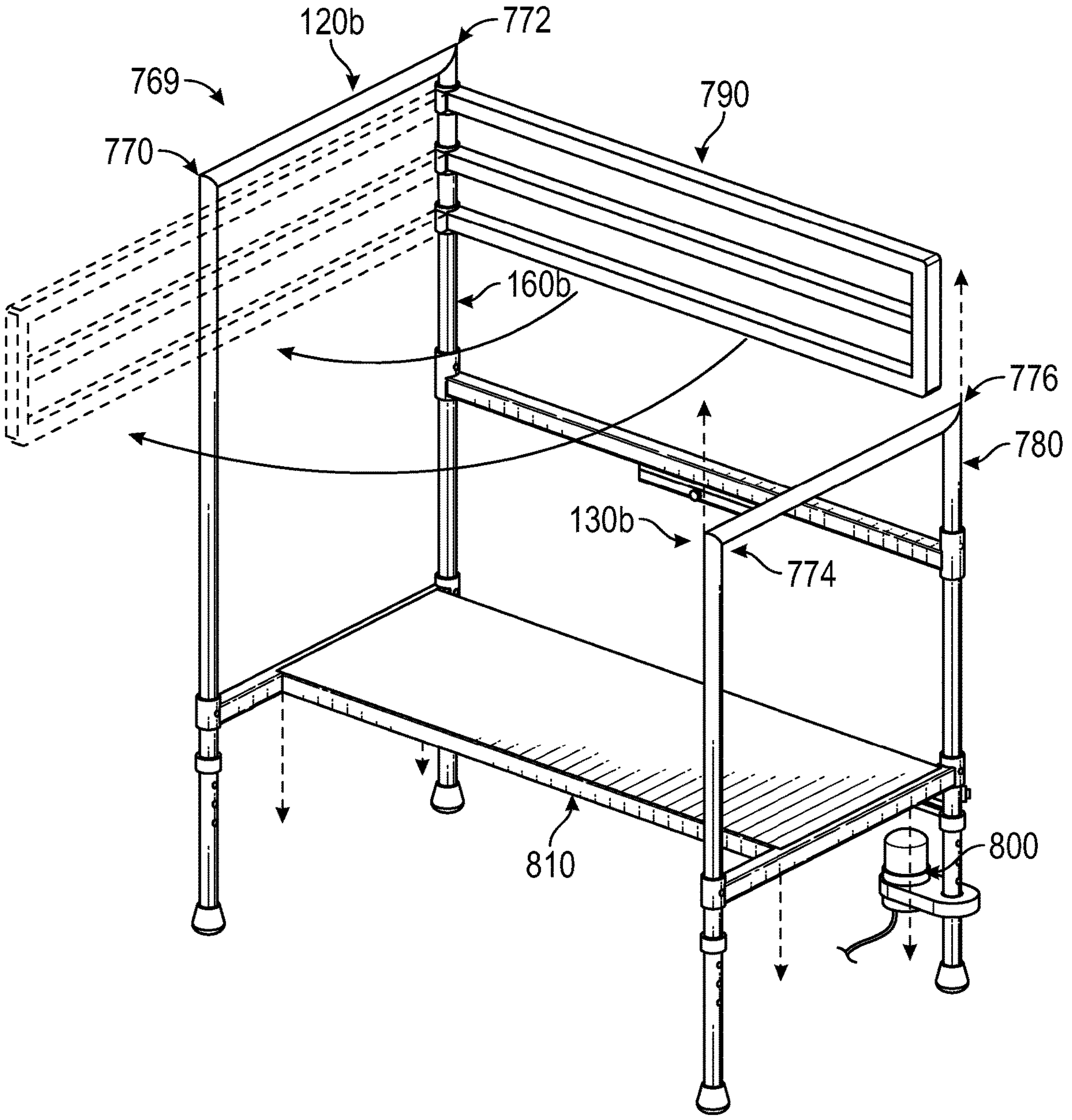
FIG. 6A is a perspective view of a further embodiment of a bed step stool.

With reference to FIG. 6A, a further embodiment of a bed step stool 769 will be described. The bed step stool 769 may include one or more of the below-described features, with like elements to those shown and/or described with respect to FIGS. 1-5 are shown and/or described with like reference numbers, but with a "b" suffix, and with the subject matter described above with respect to FIGS. 1-5 incorporated herein. The tall guard rail 120*b* and/or the short guard rail 130*b* includes square corners 770, 772, 774, 776. Short guard rail 130*b* raises in height to at least the same height as the tall guard rail 120*b*. A bed rail attachment 790 rotatably attached to the tall guard rail 120*b* and/or the leg 160*b* serves as a bed rail to keep a user from falling/getting out of bed when the user is lying down, but swings open to allow the user to get in and out of bed easily. Although not shown, a latch or hook may be used to the bed rail attachment in the bed rail position/mode and/or the open position mode. A motor 800 operably coupled to the step assembly 270*b* (e.g., via a rotatable screw mechanism) raises and lowers the step assembly 270*b* vertically up and down for users (e.g., elders) who can't raise their leg to step onto the step assembly 270*b* when the step assembly 270*b* is raised.

Figure 6B:
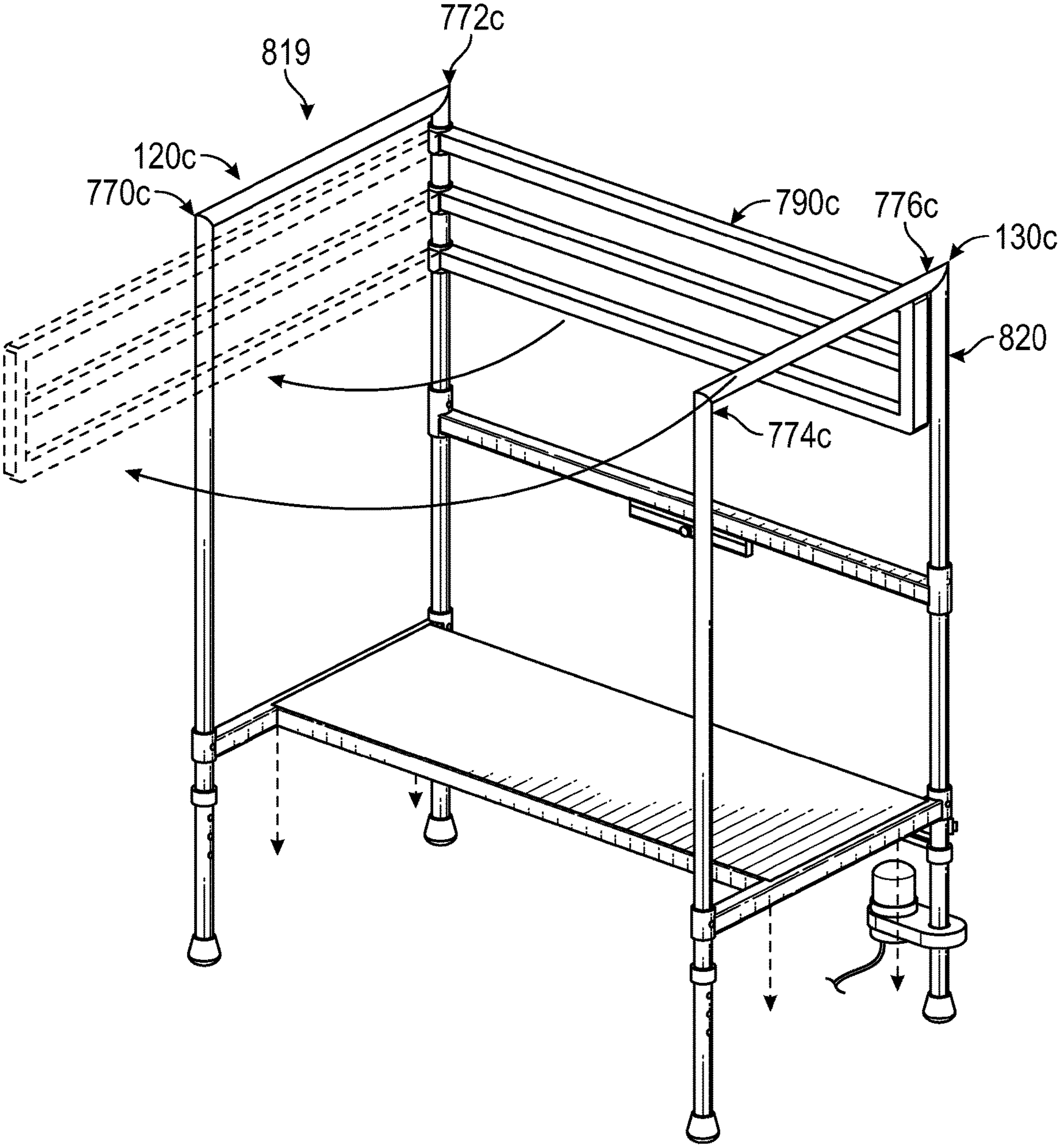
FIG. 6B is a perspective view of a still further embodiment of a bed step stool.

With reference to FIG. 6B, a still further embodiment of a bed step stool 819 will be described. Like elements to those shown and/or described with respect to FIGS. 1-6A are shown and/or described with like reference numbers, but with a "c" suffix, and with the subject matter described above with respect to FIGS. 1-6A incorporated herein. The guard rail 120*c* and/or the guard rail 130*c* have the same, tall height, include includes square corners 770*c*, 772*c*, 774*c*, 776*c*, and include the bed rail attachment 790*c*.

Figure 7:
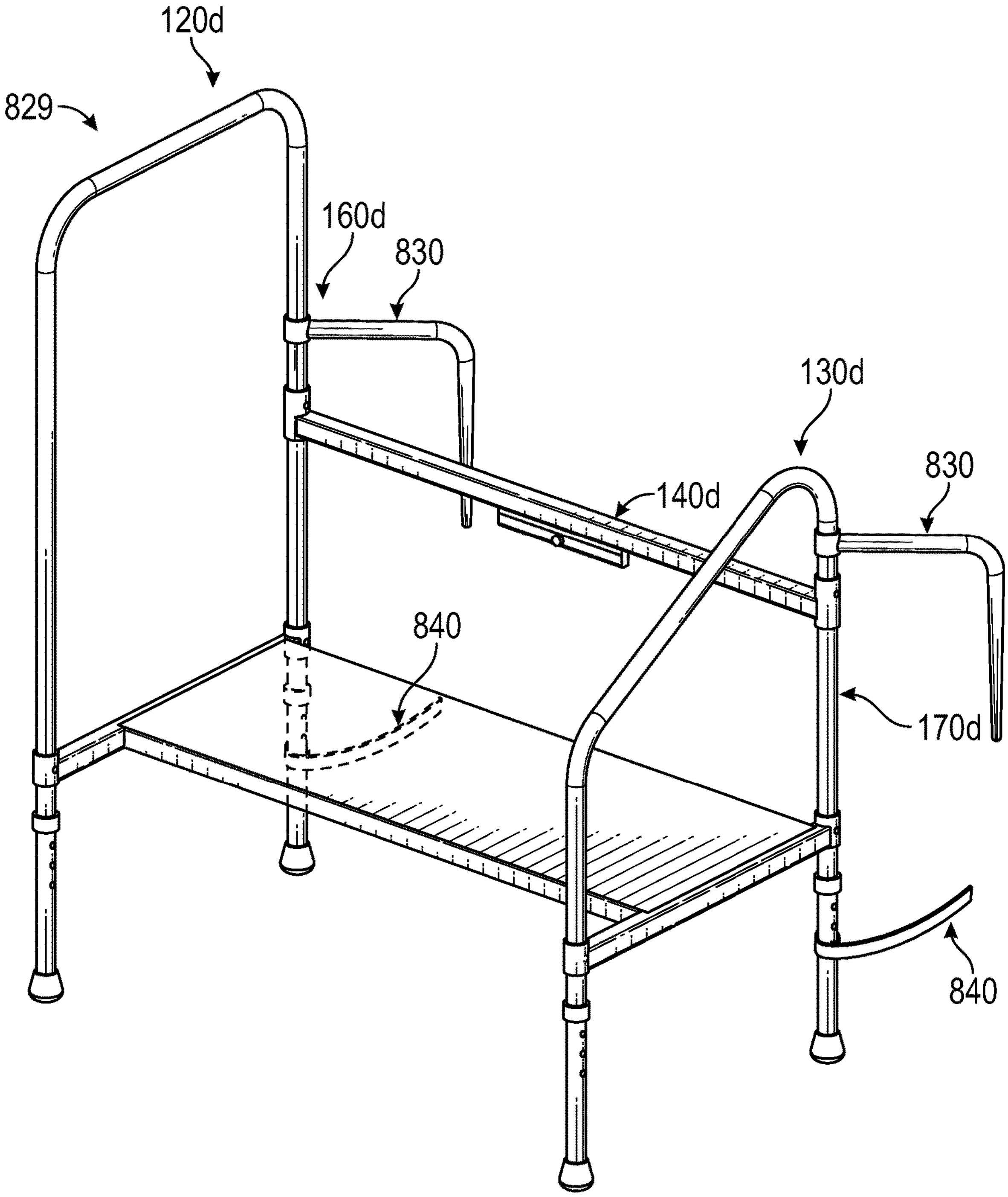
FIG. 7 is a perspective view of a step stool that may be used with a bathtub.

With reference to FIG. 7, an embodiment of a step stool 829 that may be used with a bathtub will be described. Like elements to those shown and/or described with respect to FIGS. 1-6B are shown and/or described with like reference numbers, but with a "d" suffix, and with the subject matter described above with respect to FIGS. 1-6B incorporated herein. Attachments 830 (e.g., L-shaped member that raises, lowers, rotates) that go on the back of the bath step stool 829 (e.g., attached to the tall guard rail 120*d*, short guard rail 130*d*, leg 160*d*, leg 170*d*, and/or the lateral crossbar assembly 140*d*) go over the edge/side of a bathtub to sit next to the bathtub and essentially attach to the bathtub. This allows a user to set the product next to the bathtub and be stable so the individual has a step, a rail, to help people the user into and out of the bathtub. Straps 840 attach to the legs 160*d*, 170*d* and to bed frame attach to the bed that can help keep the step stool 829 more stable. Straps 840 made of hook and loop fasteners (e.g., Velcro®) or another soft material connect the legs 160*d*, leg 170*d* to a bed frame to improve stability of the step stool 700.

FIGS. 8A, 8B, 8C, 8D are perspective views of a further embodiment of bed step stools 849, 859, 869, 879, where like elements to those shown and/or described with respect to FIGS. 1-7 are shown and/or described with like reference numbers, but with an "e" suffix, and with the subject matter described above with respect to FIGS. 1-7 incorporated herein shown attached to a bed 110*e*, but with different embodiments of a bed attachment 850, 860, 870, 880 shown.

Figure 8A:
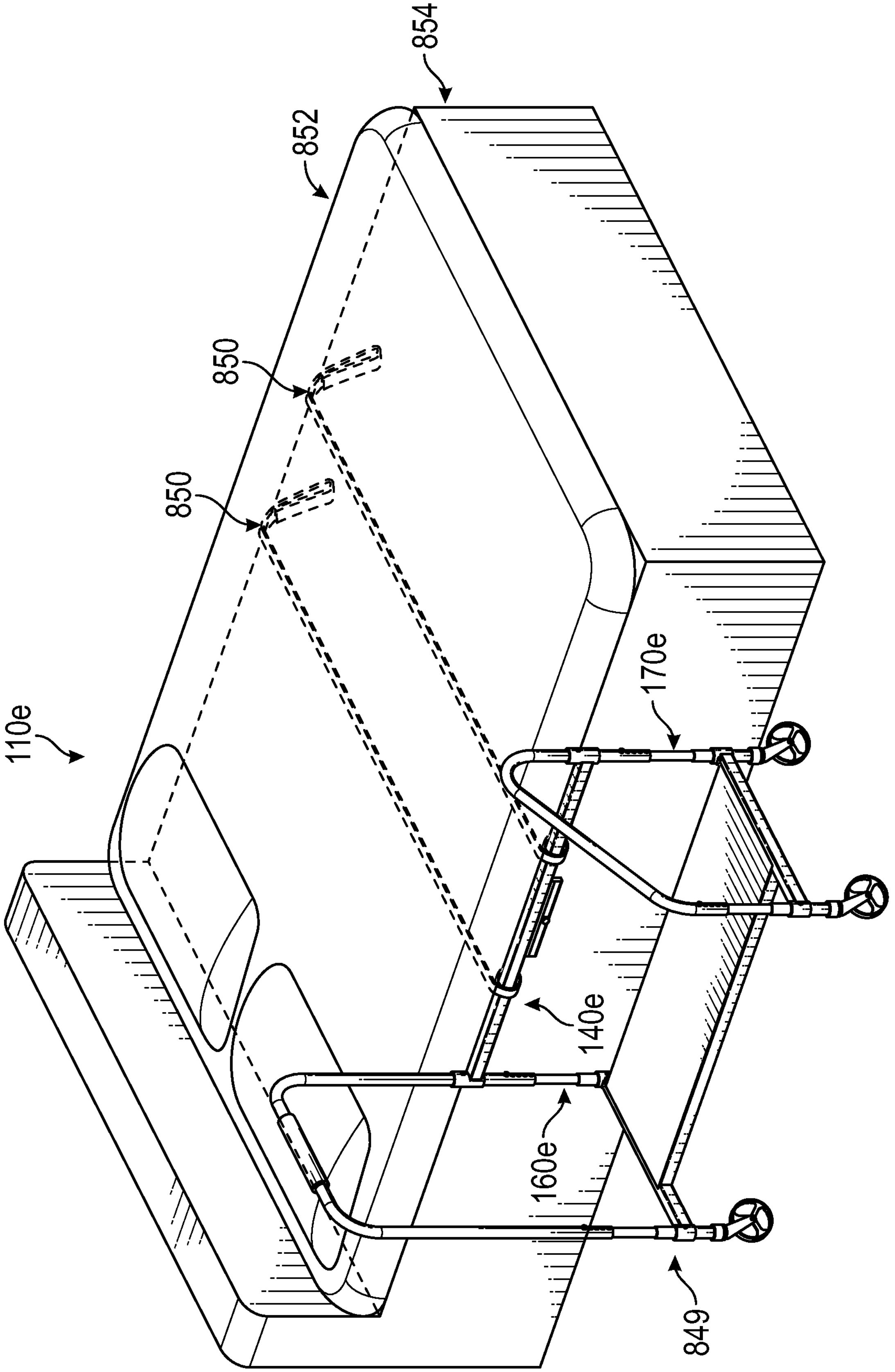
FIGS. 8A, 8B, 8C, 8D are perspective views of a further embodiment of a bed step stool shown attached to a bed, but with different embodiments of a bed attachment shown.

In FIG. 8A, the bed attachment(s) 850 include strap(s) that attach to the lateral crossbar assembly 140*e* (and/or the legs 160*e*, leg 170*e*) and run across the bed 110*e* between a box spring (or other mattress support) 852 and mattress 854 and can attach to the bed frame. For example, but not by way of limitation, the bed attachment 850 may include nylon strap(s) with distal ends terminating in hook and loop fasteners (e.g., Velcro®).

Figure 8B:
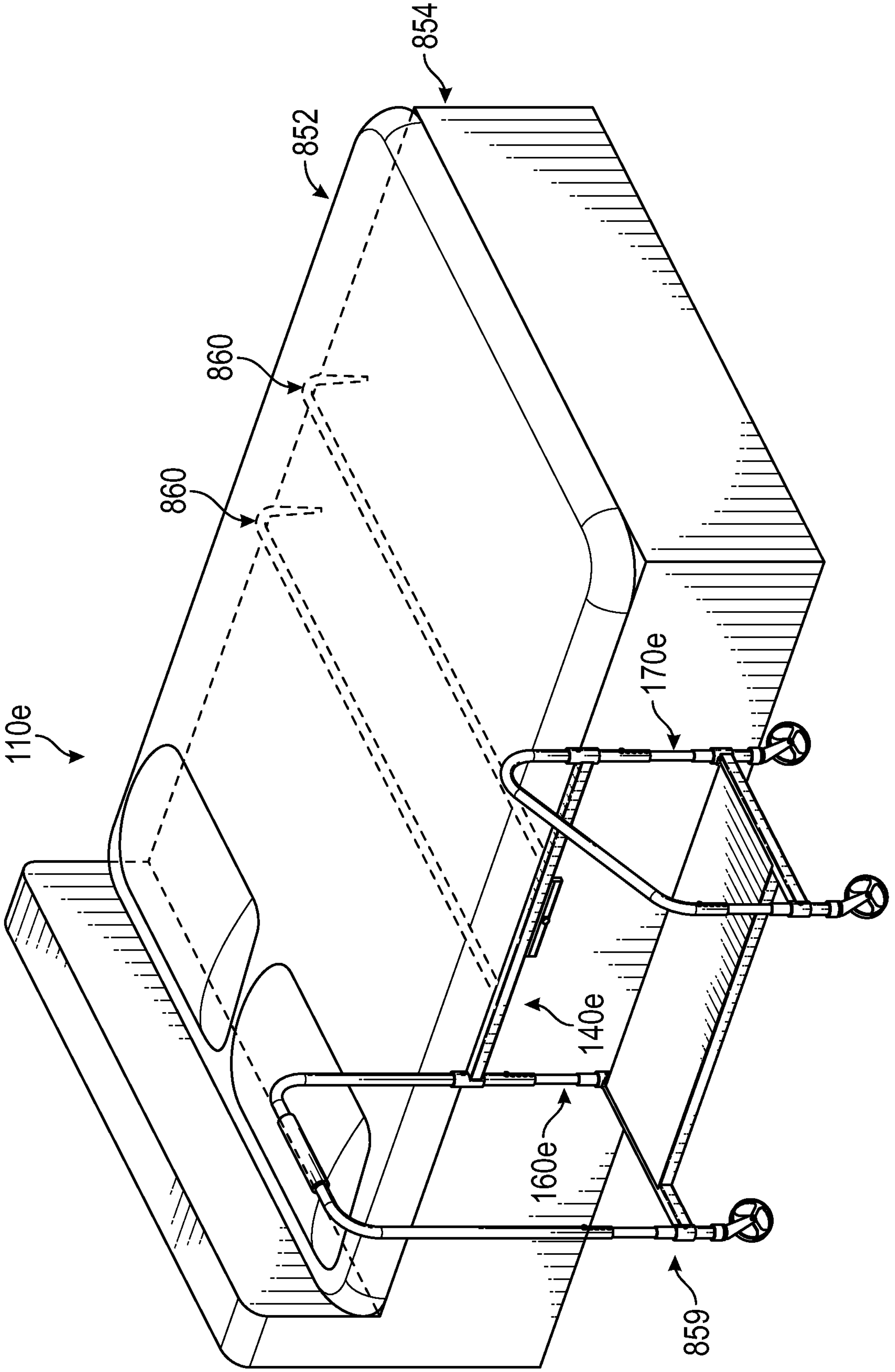

In FIG. 8B, the bed attachment(s) 860 are made of a solid and/or rigid material (e.g., metal, aluminum, plastics) that attach to the lateral crossbar assembly 140*e* (and/or the legs 160*e*, leg 170*e*) and run across the bed 110*e* between a box spring (or other mattress support) 852 and mattress 854 to help stabilize the bed step stool 859 when being used.

Figure 8C:
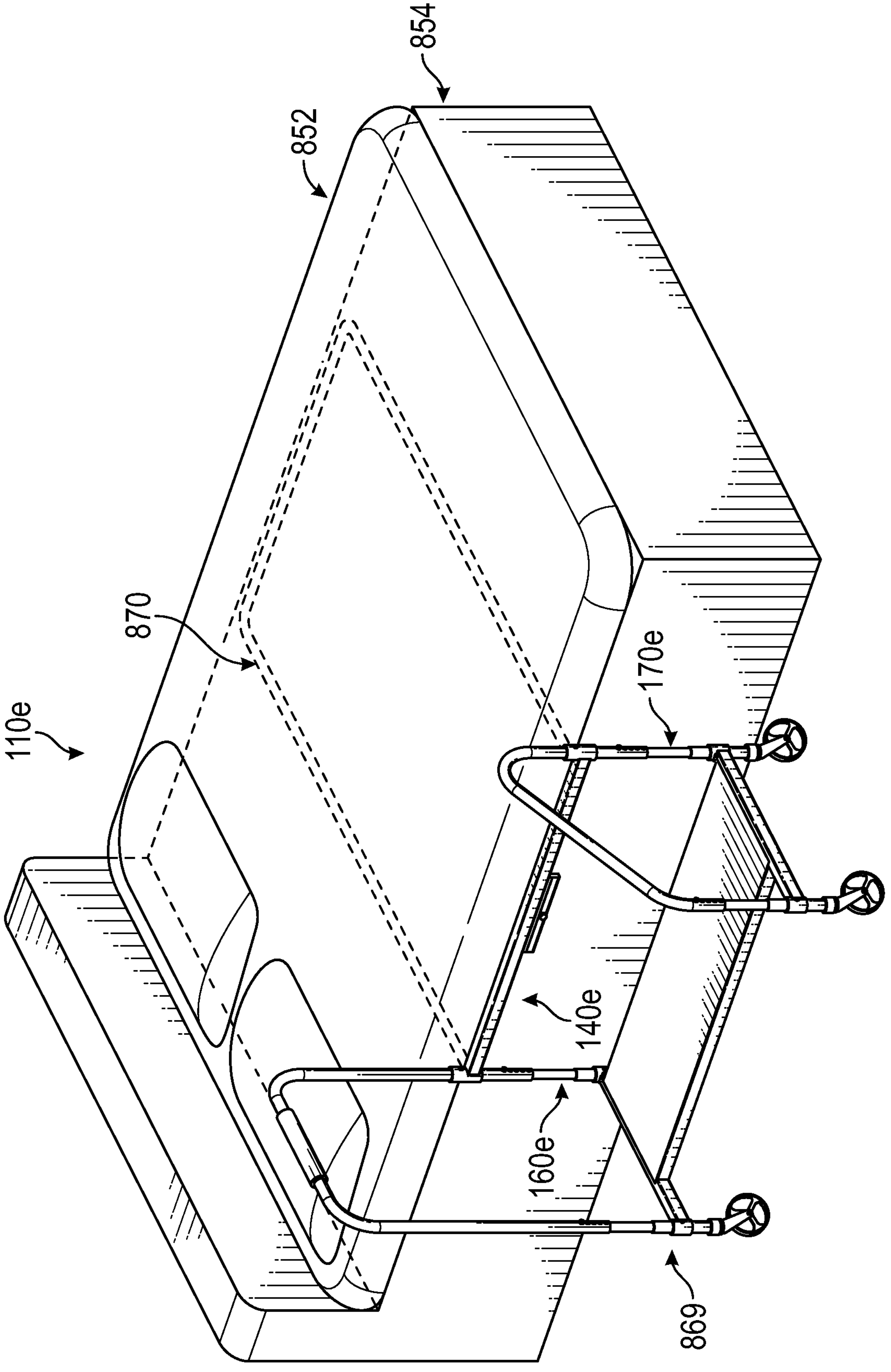

In FIG. 8C, the bed attachment 870 is made of a solid and/or rigid material (e.g., metal, aluminum, plastics) that attach to the lateral crossbar assembly 140*e* (and/or the legs 160*e*, leg 170*e*) and run across the bed 110*e* between a box spring (or other mattress support) 852 and mattress 854 to help stabilize the bed step stool 869 when being used. The bed attachment 870 and/or the bed attachment 870 in connection with the lateral crossbar assembly 140*e* forms a rectangular closed-loop member that runs across the bed 110*e* between the box spring (or other mattress support) 852 and mattress 854.

Figure 8D:
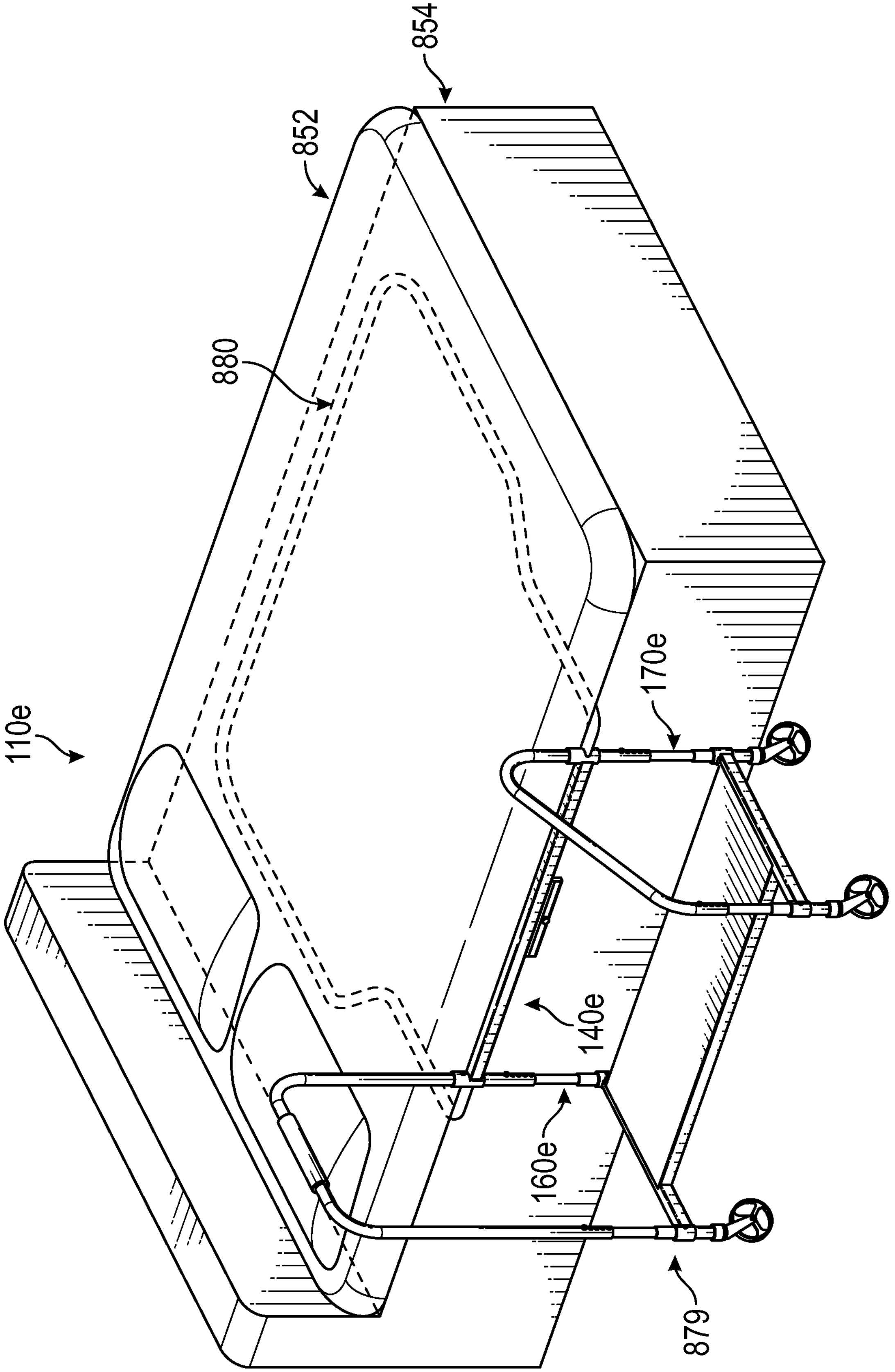

In FIG. 8D, the bed attachment 880 is made of a solid and/or rigid material (e.g., metal, aluminum, plastics) that attach to the lateral crossbar assembly 140*e* (and/or the legs 160*e*, leg 170*e*) and run across the bed 110*e* between a box spring (or other mattress support) 852 and mattress 854 to help stabilize the bed step stool 879 when being used. The bed attachment 880 and/or the bed attachment 880 in connection with the lateral crossbar assembly 140*e* forms a closed-loop member that spans most of the dimension of the mattress 854, running across the bed 110*e* between the box spring (or other mattress support) 852 and mattress 854.

In further embodiments, one or more of the step stools shown and/or described herein is a smaller version of that shown (e.g., not as wide and/or as deep as that/those shown so as to fit in smaller room).

Figure 9:
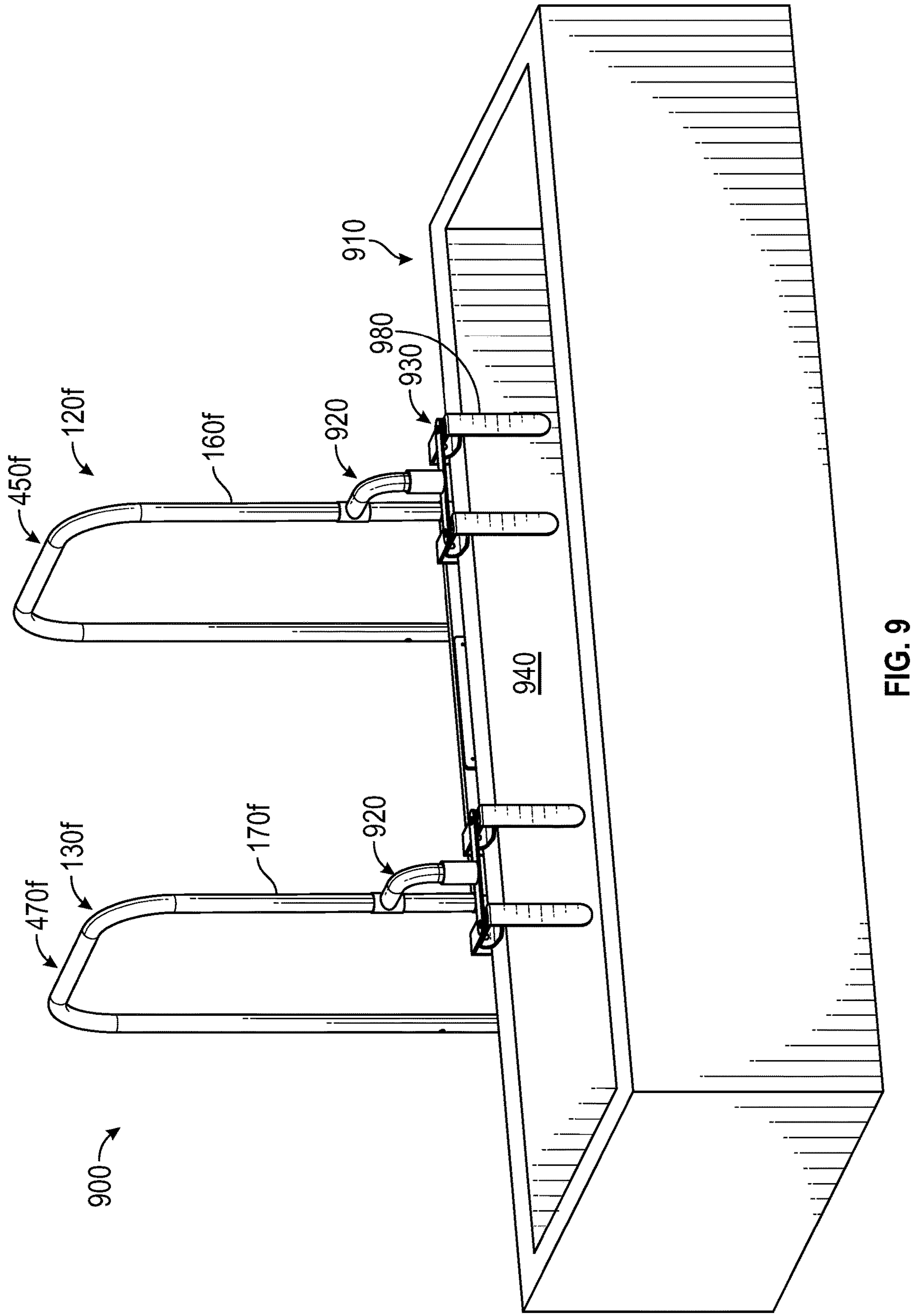
FIG. 9 is a perspective view of a bathtub step stool shown attached to a bathtub.
Figure 10:
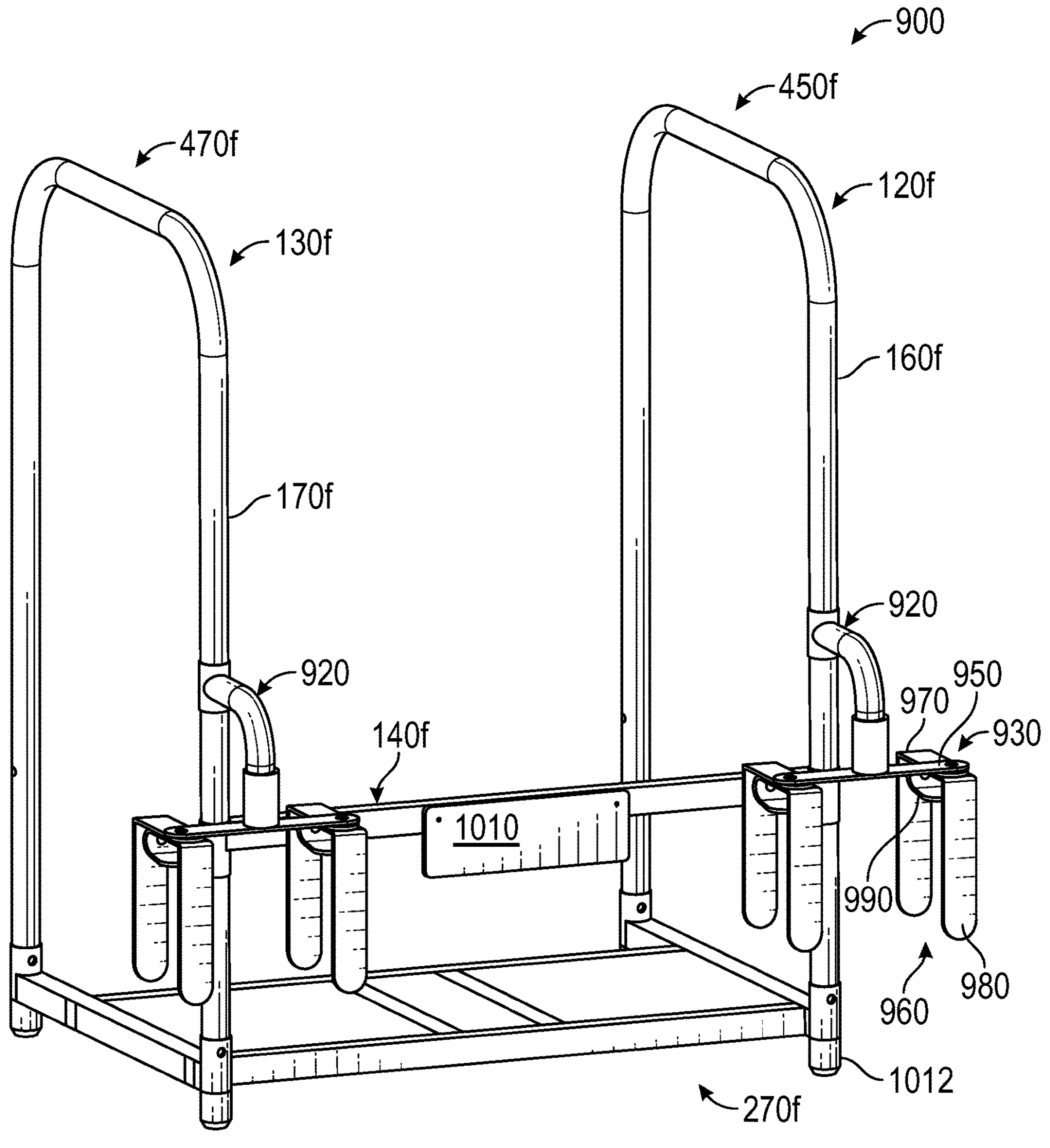
FIG. 10 is a rear perspective view of the bathtub step stool of FIG. 9.
Figure 11:
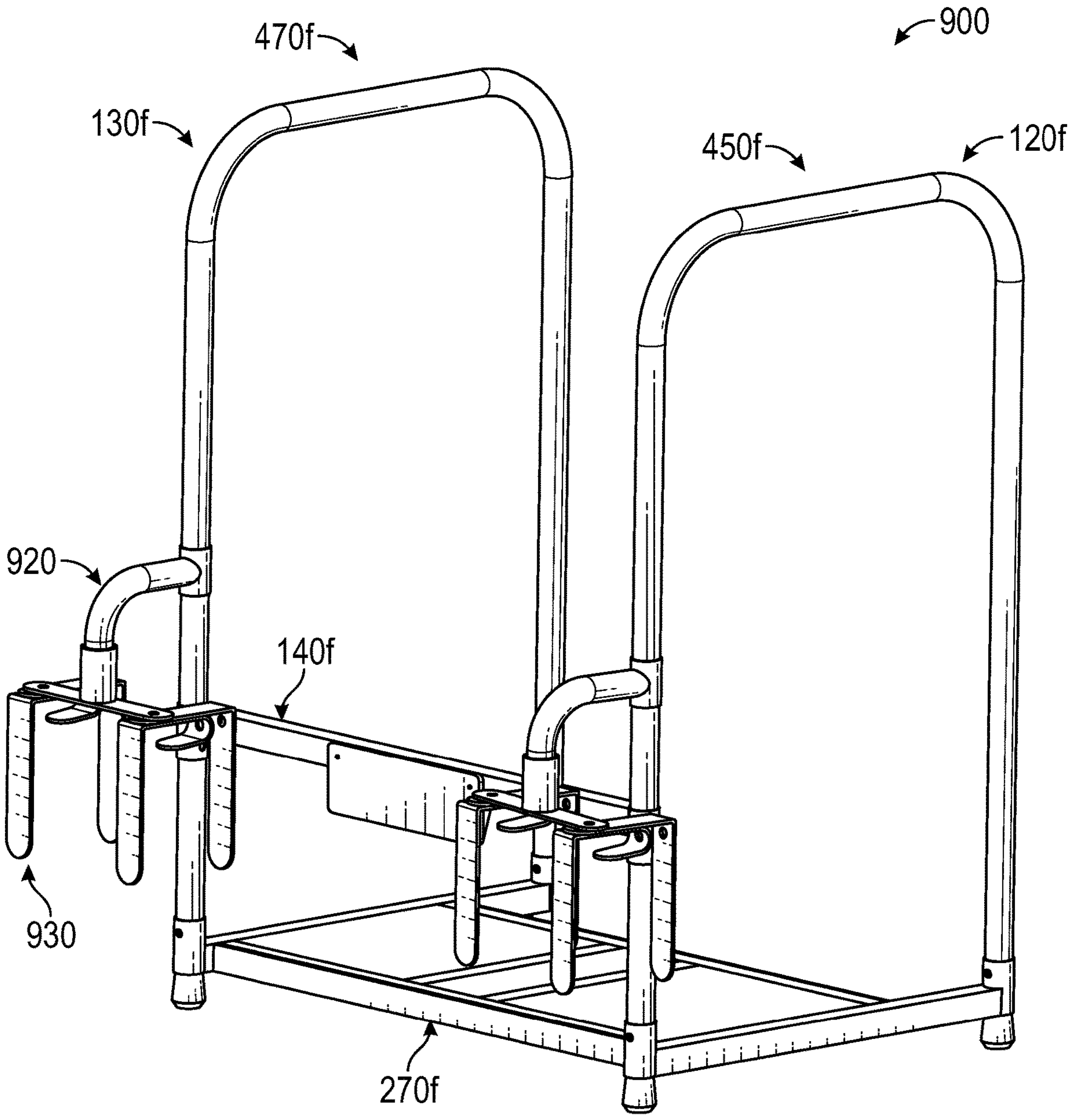
FIG. 11 is another rear perspective view of the bathtub step stool of FIG. 9.
Figure 12:
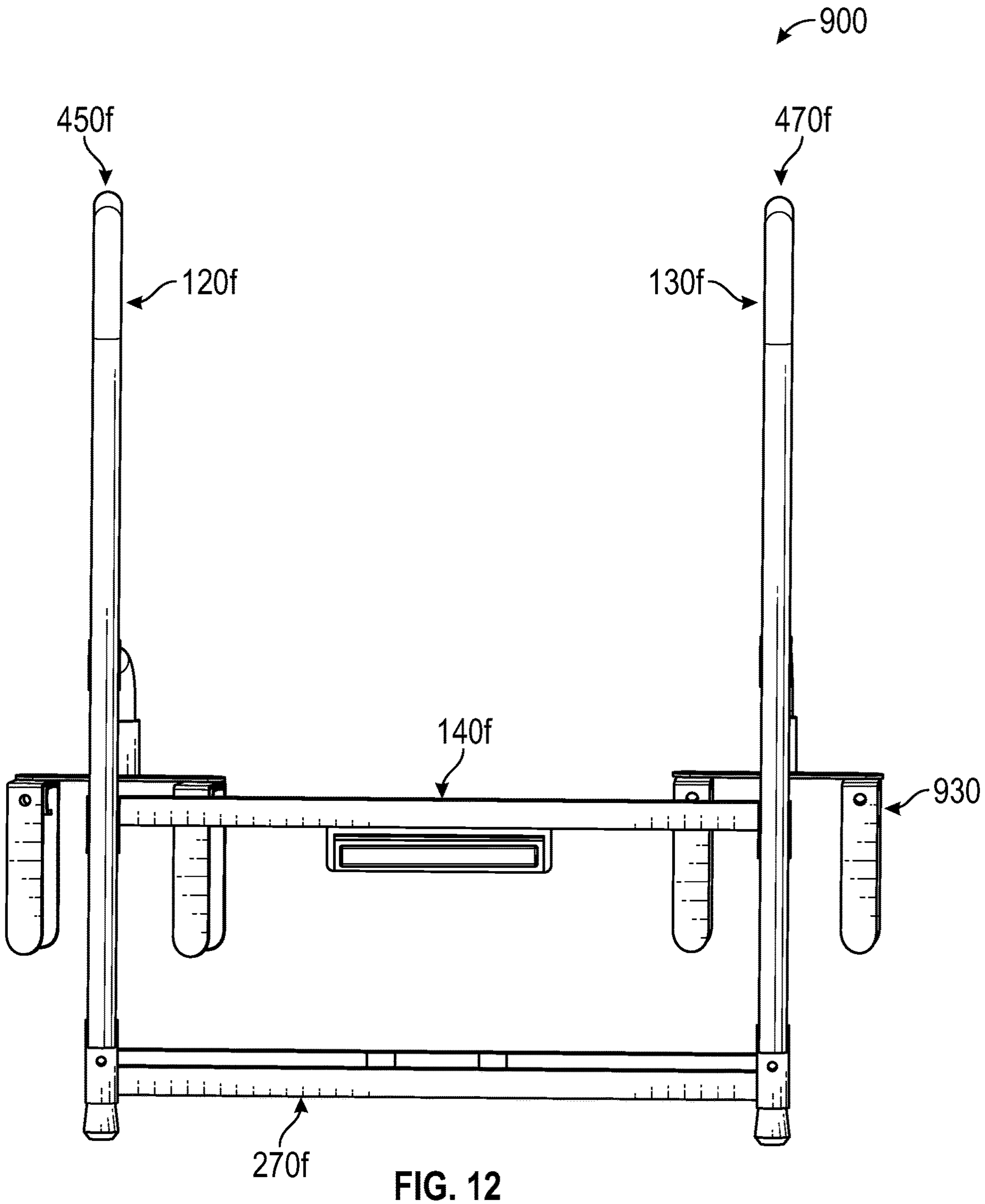
FIG. 12 is a front elevational view of the bathtub step stool of FIG. 9.
Figure 13:
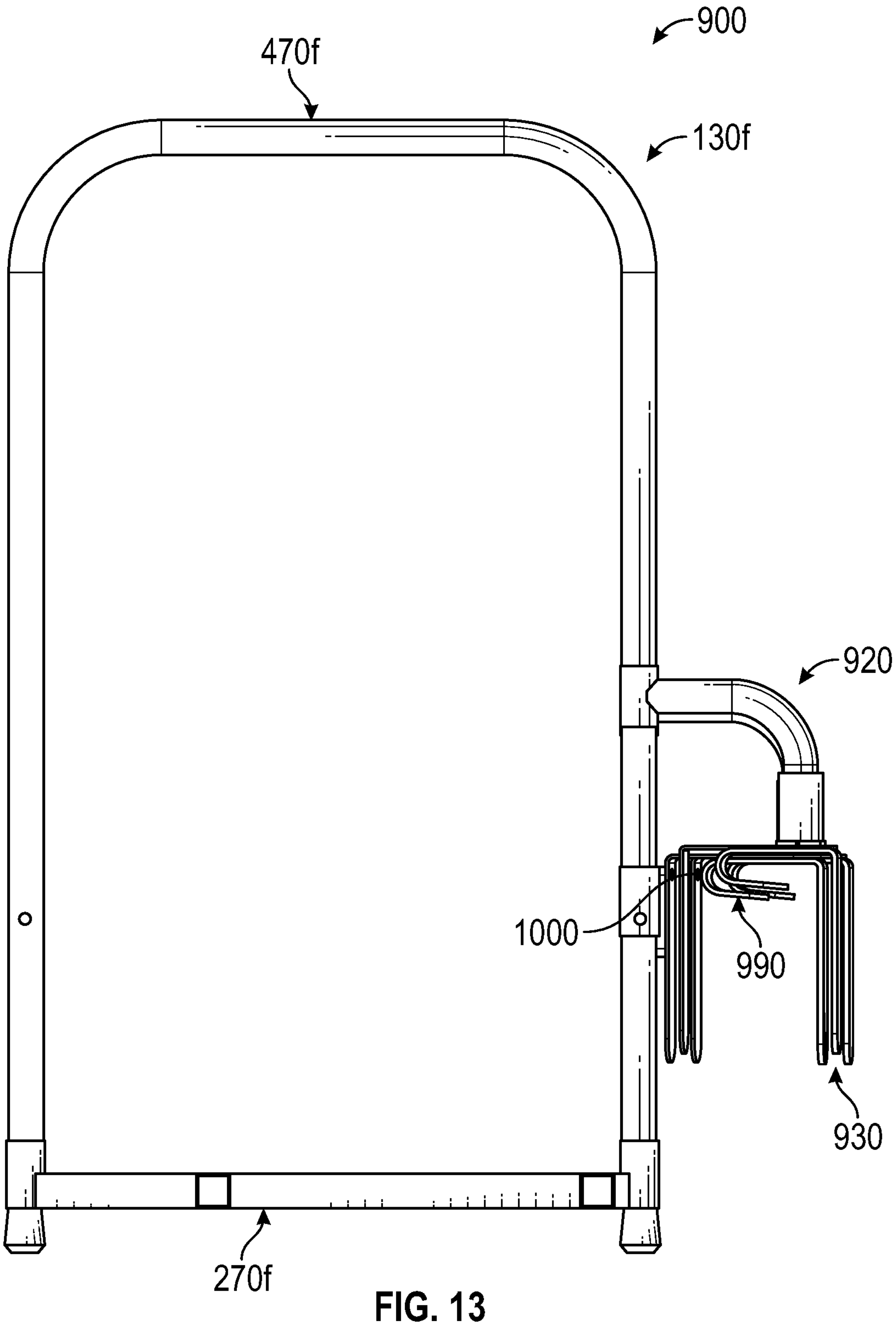
FIG. 13 is a left side elevational view of the bathtub step stool of FIG. 9.
Figure 14:
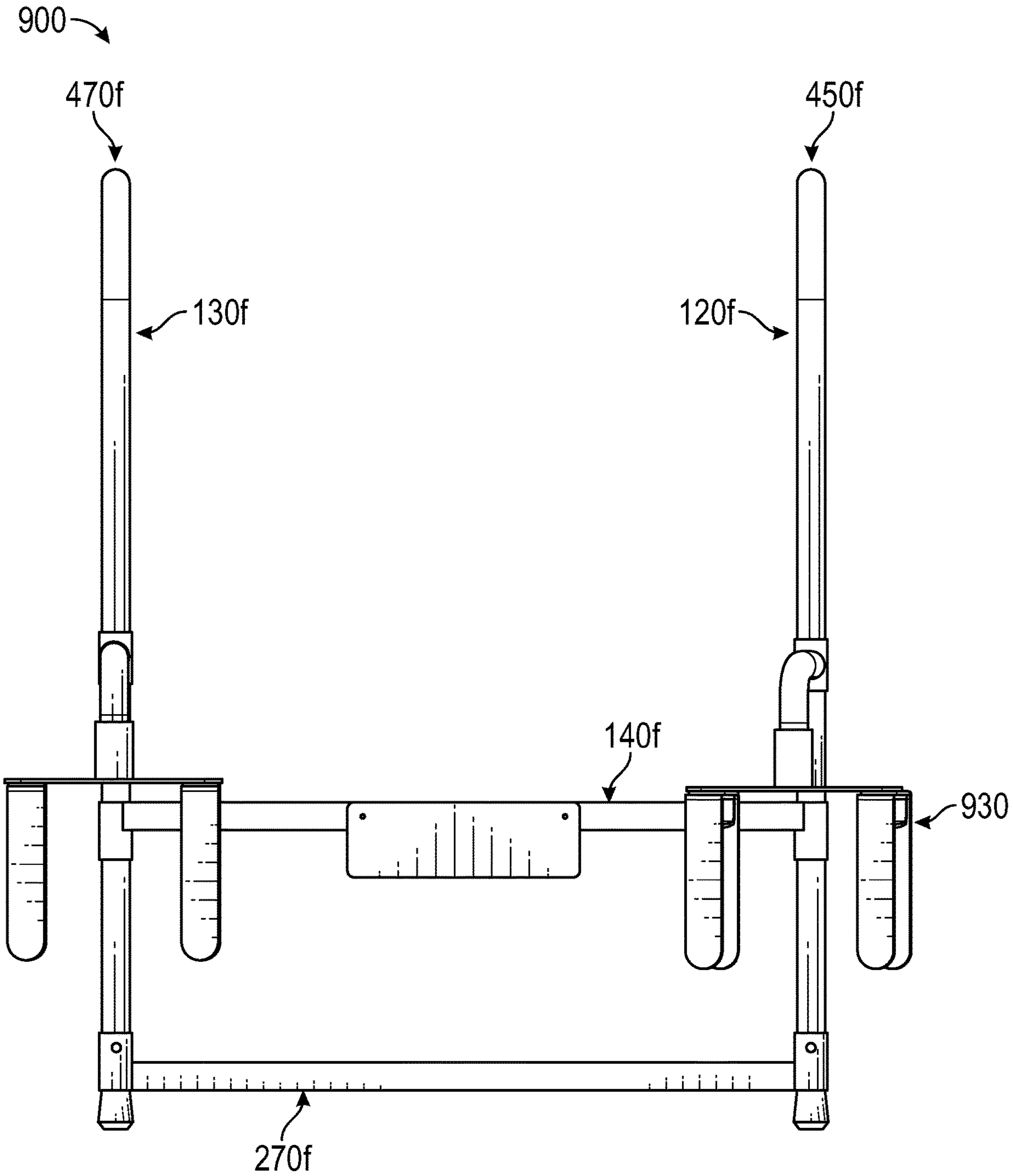
FIG. 14 is a rear elevational view of the bathtub step stool of FIG. 9.
Figure 15:
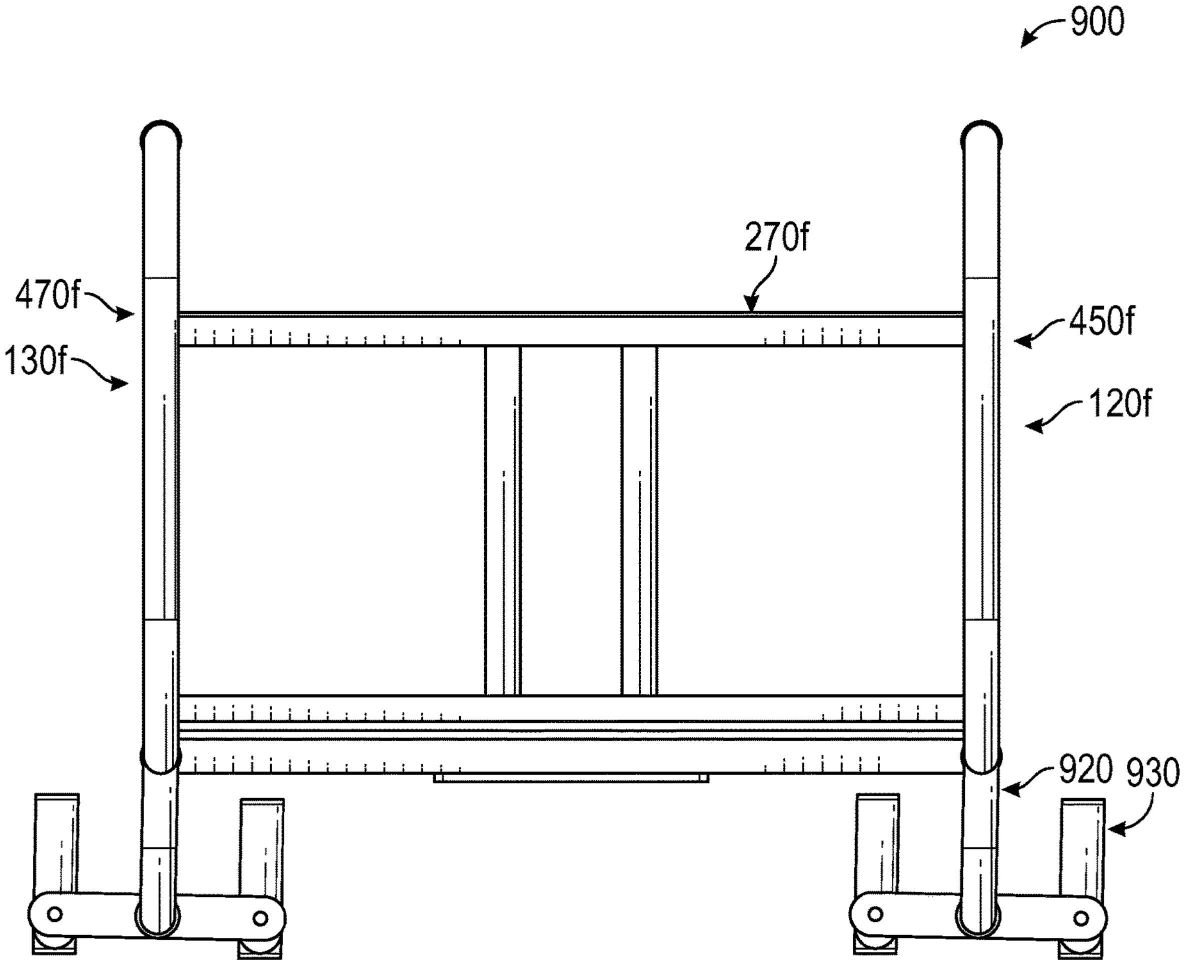
FIG. 15 is a top plan view of the bathtub step stool of FIG. 9.

With reference to FIGS. 9-15, a further embodiment of a bathtub step stool 900 that may be used with a bathtub 910 will be described. Like elements to those shown and/or described with respect to FIGS. 1-8D are shown and/or described with like reference numbers, but with an "f" suffix, and with the subject matter shown and/or described above with respect to FIGS. 1-9D incorporated herein. Attachments 920 (e.g., L-shaped members that raise, lower) that go on the back of the bath step stool 900 (e.g., attached to the leg 160*f* of the first support/guard rail 120*f* and is attached to the leg 170*f* of the second support/guard rail 130*f*)

terminate at mount assembly 930, which mounts onto/over a side/wall 940 of the bathtub 910 as shown in FIG. 9. The mount assembly 930 includes an elongated flat bracket 950 with a pair of downwardly facing U-shaped brackets/clamps 960. The U-shaped brackets/clamps 960 include lateral members 970 and downwardly extending members 980. C-shaped members 990 are disposed along an underside 1000 of the lateral members 970. The C-shaped members 990 allows the -shaped brackets/clamps 960 to be adjusted to fit the side/wall 940 of the bathtub 910 (in some parts of the bathtub 910 the side/wall 940 of the bathtub 910 is thin and other parts it's wider). A bolt may go through mount assembly 930 into C-shaped member 990 990 and this locks the adjustment setting in place so it's snug against side/wall 940. The clamps 960 may be padded and may adjust to different tub wall widths. A lateral crossbar assembly 140*f* is attached to the leg 160*f* of the guard rail 120*f* and is attached to the leg 170*f* of the guard rail 130*f*. The lateral crossbar assembly 140*f* includes a plate 1010. Step assembly 270*f* may be vertically adjustable with respect to guard rails 120*f*, 130*f*. The guard rails 120*f*, 130*f* are of the same height and may have rubberized non slip foot/rubber tip 1012 at bottom of guard rails 120*f*, 130*f* and/or rubber sleeves at top of guard rails 120*f*, 130*f* for secure gripping of guard rails 120*f*, 130*f* by the user when transferring to and from the bathtub or shower.

In use, the bathtub step stool 900 is positioned next to the bathtub entry side/wall 940 and attached/clamped to the bathtub entry side/wall 940 via the U-shaped brackets 960, which slide onto and over the bathtub entry side/wall 940 (and may adjust to different tub wall widths), to secure the bathtub step stool 900 in position. This allows a user to set the bathtub step stool 900 next to the bathtub 910 and be stable so the individual has a step and rails to help the user into and out of the bathtub 910.

To use the bathtub step stool 900 to enter the bathtub 910, a user grips at least one of the first support 120*f* and the second support 130*f*; steps onto the step assembly 270*f*, towards the entry side 940 of the bathtub 910 (passing between the first support 120*f* and the second support 130*f*); turns towards one of the first support 120*f* and the second support 130*f* while standing on the step assembly 270*f*; while gripping one of the first support 120*f* and the second support 130*f*, steps over the entry side 940 of the bathtub 910 and into the bathtub 910; while continuing to grip one of the first support 120*f* and the second support 130*f*, steps again over the entry side of the bathtub and into the bathtub 910. After the user enters the bathtub 910, the user lets go of the support 120*f*, 130*f* and the user starts operation of the water controls to start bath/shower. To use the bathtub step stool 900 to exit/get out of the bathtub 910, a user reaches out and grabs at least one of the supports 120*f*, 130*f* while standing in the bathtub 910. The user continues to grip one of the supports 120*f*, 130*f* and steps one foot laterally out of the bathtub and over the entry side 940, onto the step assembly 270*f* of the bathtub step stool 900. While continuing to grip one of the supports 120*f*, 130*f*, the user steps the other foot laterally out of the bathtub and over the entry side 940, onto the step assembly 270*f* of the bathtub step stool 900. The user then passes between the first support and the second support to step off of the step assembly 270*f* and exit the bathtub step stool 900.

With reference to FIGS. 16A-19, another embodiment of a step stool 1100 that may be used with a bathtub 910 (or a bed 110) will be described. Like elements to those shown and/or described with respect to FIGS. 1-15 are shown and/or described with like reference numbers and/or with a "g" suffix, and with the subject matter shown and/or described above with respect to FIGS. 1-15 incorporated herein.

Figure 16A:
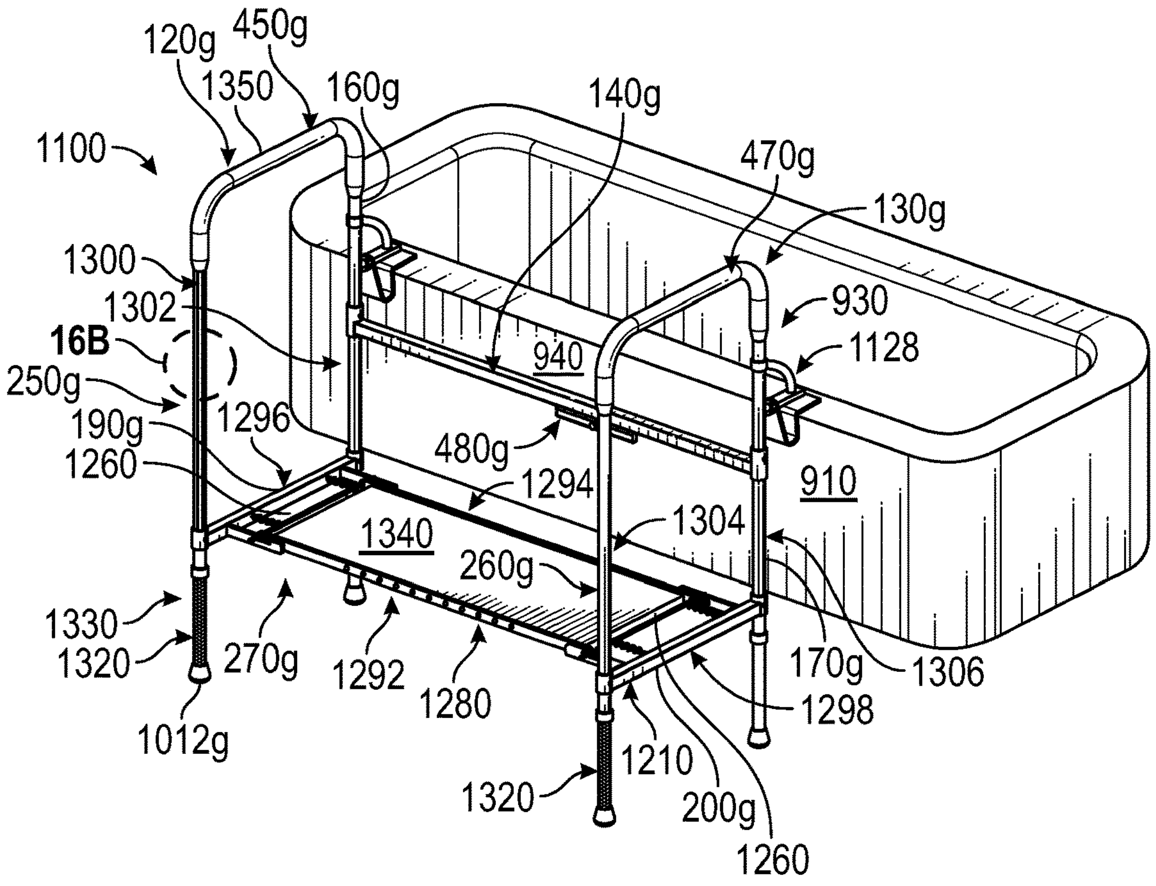
FIG. 16A is a perspective view of another embodiment of a step stool shown attached to a bathtub.

Attachments 1120 (e.g., J-shaped members that raise, lower) that go on the back of the bath step stool 1100 (e.g., attached to the leg 160*g* of the first support/guard rail 120*g* and attached to the leg 170*g* of the second support/guard rail 130*g*) terminate at mount assemblies 1130, which mount onto/over a side/wall 940 of the bathtub 910 as shown in FIG. 16A. The mount assemblies 1130 each include a bracket 1150 with a downwardly facing U-shaped clamp assembly 1160. The U-shaped clamp assembly 1160 includes a first stationary clamp member 1170 and a second movable clamp member 1180. Inner surfaces of the first stationary clamp member 1170 and the second movable clamp member 1180 include respective pads 1190 to prevent scratching of the side/wall 940 of the bathtub 910 when clamped onto the side/wall 940. Rotating member 1200 is rotatably received in the clamp assembly 1160 and coupled to the second movable clamp member 1180 whereby rotation of the rotating member 1200 causes the second movable clamp member 1180 to move towards/away from the first stationary clamp member 1170 to tighten/loosen the clamp assembly 1160 on the side/wall 940.

Figure 18:
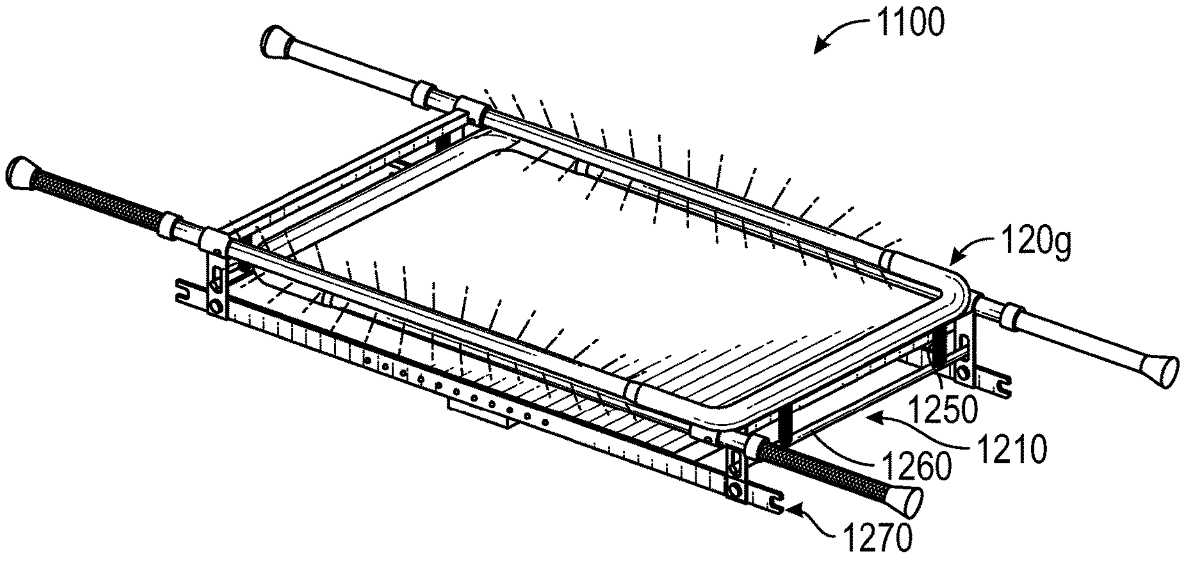
FIG. 18 is a perspective view of the step stool of FIG. 16A shown in a collapsed configuration.
Figure 19:
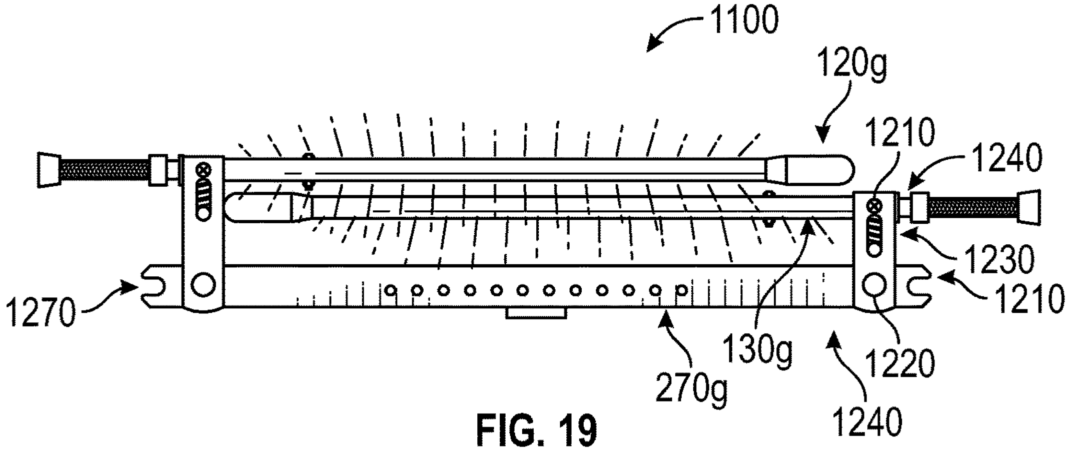
FIG. 19 is a side-elevational view of the step stool of FIG. 16A shown in a collapsed configuration.

With reference to FIGS. 16A, 18, and 19, the step stool 1100, which in an alternative embodiment is a bed step stool (e.g., bed step stool 100, 700, 849, 859, 869, 879 with folding/collapsible tall grab bar and short grab bar), bath step stool (e.g., bath step stool 900), or step stool for another application, includes folding/hinge mechanisms 1210 that allow the rails 120*g*, 130*g* to fold relative to the step assembly 270*g* between the deployed step stool 1100 shown in FIG. 16A and the folded, flat, compact configuration shown in FIGS. 18, 19. The folding mechanisms 1210 include pivots 1220, brackets 1230 connecting end portions 1240 of the step assembly 270*g* at the pivots 1220 to lower portions of the rails 120*g*, 130*g* at fastener locations 1242, springs 1250, grip bars 1260, and c-shaped ends 1270 of the step assembly 270*g*. In use, when the step stool 1100 is in the configuration shown in FIG. 16, to fold the step stool 1100, a user pulls/grabs the grip bar(s) 1260 toward step crossbar assemblies 190*g*, 200*g*, against the biasing force of the springs 1250. This disengages the grip bar(s) 1260 from the c-shaped ends 1270 of the step assembly 270*g*, allowing the folding mechanisms 1210 and the rails 120*g*, 130*g* to pivot about the pivots 1220 to the flat, compact configuration of FIGS. 18, 19 for transporting/storage. To deploy the step stool 1100, the folding mechanisms 1210 and the rails 120*g*, 130*g* are pivoted from the flat, compact configuration of FIGS. 18, 19 about the pivots 1220 to the configuration shown in FIG. 16. The springs 1250 urge the grip bar(s) 1260 into the c-shaped ends 1270, locking the rails 120*g*, 130*g* in a perpendicular orientation relative to the step assembly 270*g*. Another advantage of the folding/hinge mechanisms 1210 is that they allow for an already assembled product to the consumer where the arms just pop up and do not require fasteners for assembly.

As shown in FIG. 16, the step stool 1100 or other step stool (e.g., step stool 100, 700, 849, 859, 869, 879, 900) includes a second motion-detecting lighting assembly 1280 for illuminating via one or more lights (e.g., LEDs) the area in front of the step stool 1100 upon detected motion (e.g., movement of the user's legs) of the user by a motion sensor. The second motion-detecting lighting assembly 1280 is flush with a front of the step stool 1100.

Figure 16B:
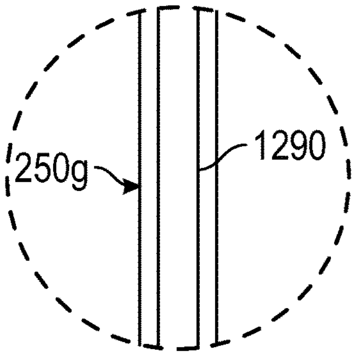
FIG. 16B is a side-elevational view of area 16B of a glow-in-dark strip on one the legs of the step stool of FIG. 16A.
Figure 17:
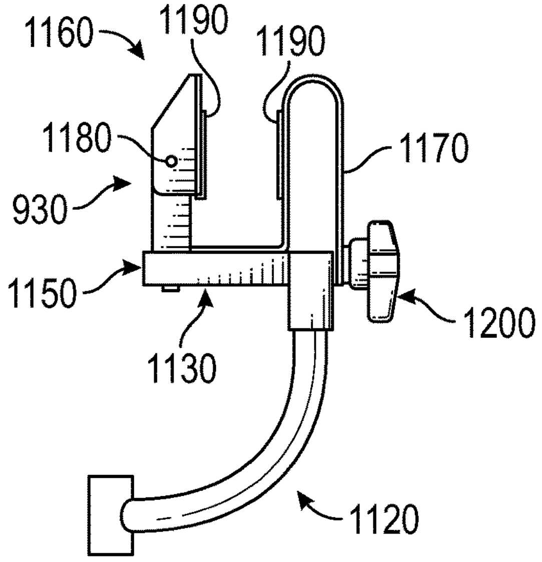
FIG. 17 is a side-elevational view of a mount assembly of the step stool of FIG. 16A.

As shown in FIG. 16B, the step stool 1100 or other step stool (e.g., step stool 100, 700, 849, 859, 869, 879, 900)

includes glow-in-the-dark strips 1290 with phosphorescent pigment (e.g., zinc sulfide) at one or more of locations 1292, 1294, 1296, 1298, 1300, 1302, 1304 to help the user know where the edges of the step stool 1100 are so the user can see easier at night.

The step stool 1100 or other step stool (e.g., step stool 100, 700, 849, 859, 869, 879, 900) includes foam covers 1320 that cover lower portions 1330 of the front legs 250*g*, 260*g*, protecting any corners/edges and helping to prevent the user from scraping their foot and getting hurt.

The step stool 1100 or other step stool (e.g., step stool 100, 700, 849, 859, 869, 879, 900) may come in different colors.

The step stool 1100 or other step stool (e.g., step stool 100, 700, 849, 859, 869, 879, 900) may include a non-slip, warmer temperature, more comfortable upper surface material 1340 on the step assembly 270*g*.

Step assembly 270*g* may be vertically adjustable with respect to guard rails 120*g*, 130*g*. In the embodiment of the step stool 1100, the guard rails 120*g*, 130*g* are of the same height and may have rubberized non slip foot/rubber tip 1012*g* at bottom of guard rails 120*g*, 130*g* and/or rubber sleeves 1350 at top of guard rails 120*g*, 130*g* for secure gripping of guard rails 120*g*, 130*g* by the user when transferring to and from the bathtub or shower.

Figure 20:
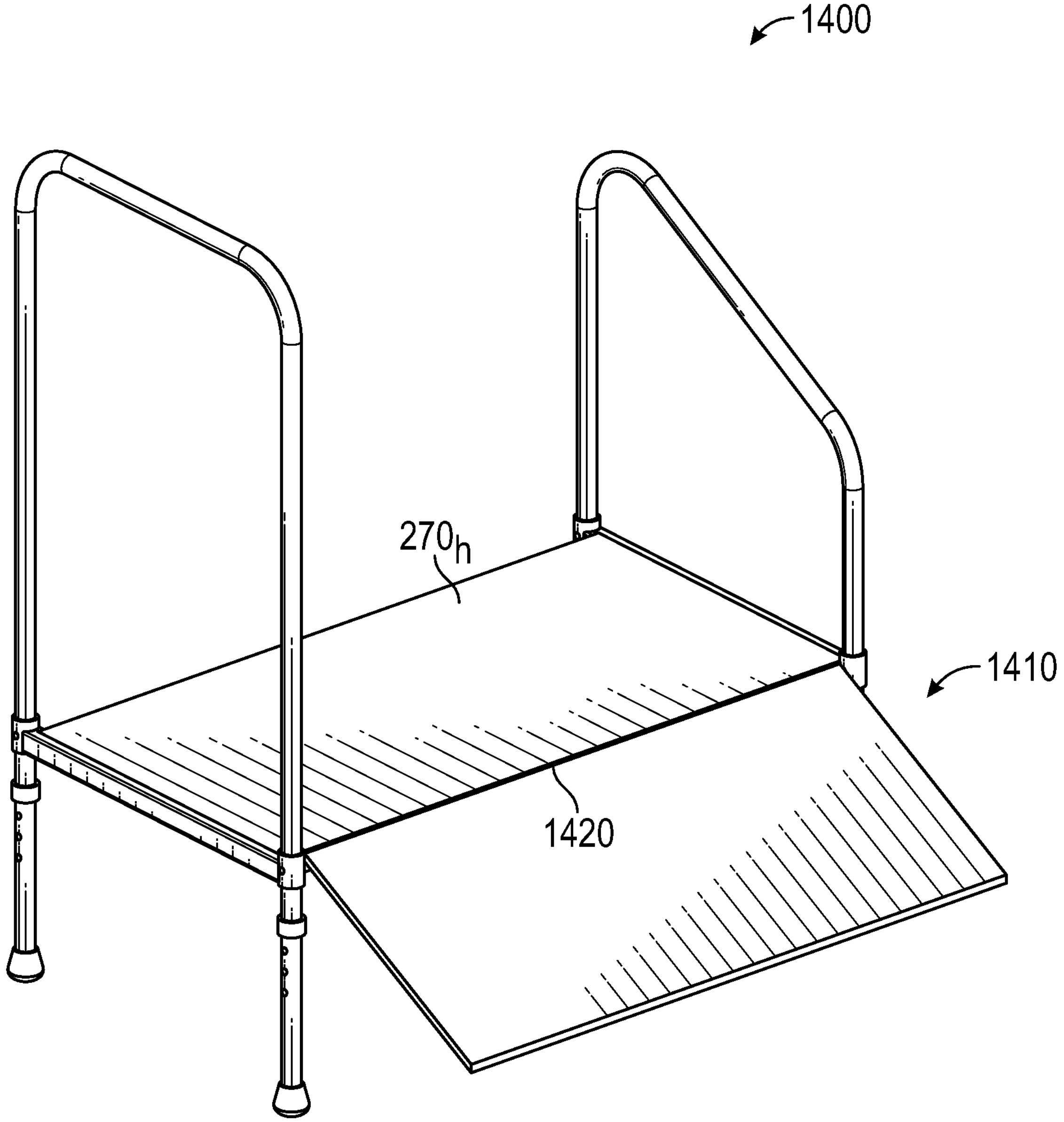
FIG. 20 is a perspective view of another embodiment of a bed step stool.

With reference to FIG. 20, another embodiment of a bed step stool 1400 will be described, with like elements to those shown and/or described with respect to FIGS. 1-4 shown and/or described with like reference numbers, but with a "h" suffix, and with the subject matter described above with respect to FIGS. 1-4 incorporated herein. A ramp 1410 is pivotally attached to a front 1420 of the step assembly 270*h*. The ramp 1410 may allow some users who are not able to take a larger step (e.g., users that shuffle their feet to walk) and use a wheeled support device (e.g., wheelchair) easier access up to the step assembly 270*h*. When not in use, the ramp 1420 may just under the step assembly 270*h* so that the ramp 1410 is parallel to and underneath the step assembly 270*h*. Alternatively, the ramp 1410 may pivotally upwardly 180+ degrees so that an upper side 1430 of the ramp 1410 rests on an upper side 1440 of the step assembly 270*h*.

Figure 21:
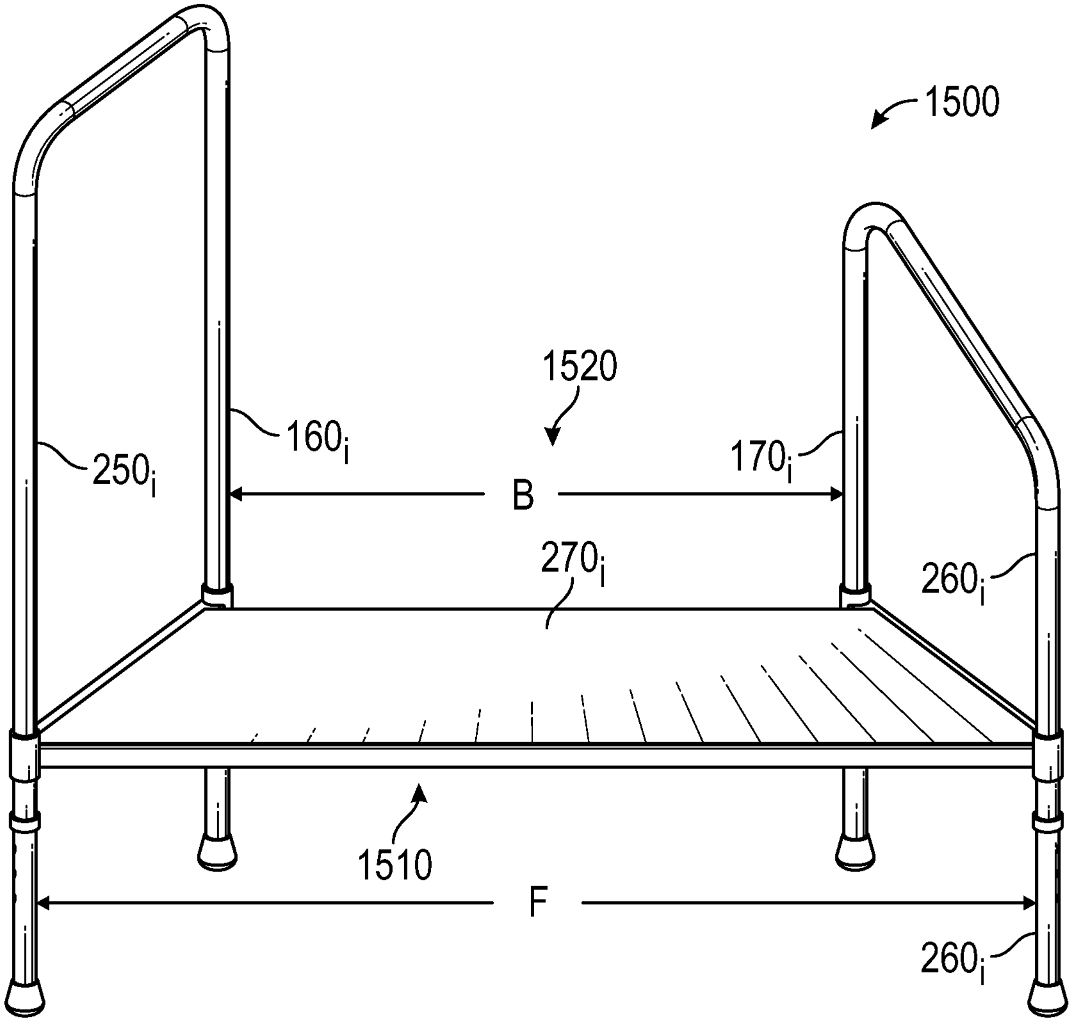
FIG. 21 is a perspective view of an additional embodiment of a bed step stool.

With reference to FIG. 21, an additional embodiment of a bed step stool 1500 will be described, with like elements to those shown and/or described with respect to FIGS. 1-4 shown and/or described with like reference numbers, but with an "i" suffix, and with the subject matter described above with respect to FIGS. 1-4 incorporated herein. The step assembly 270*i* includes a wider front edge 1510, where a user steps onto the step assembly 270*i*, and a narrower rear edge 1520 next to the bed. As a result, a distance F between the front legs 250*i*, 260*i* is greater than a distance B between the rear legs 160*i*, 170*i*. This design allows a user a wider area to access the bed step stool 1500 while funneling or focusing the user's travel across the step assembly 270*i* to a more focused location, which may be important for having the user enter and exit the bed at a certain desired location to reduce the user having to move (or having to move the user) towards or away from the head of the bed once the user is on the bed.

Figure 22A:
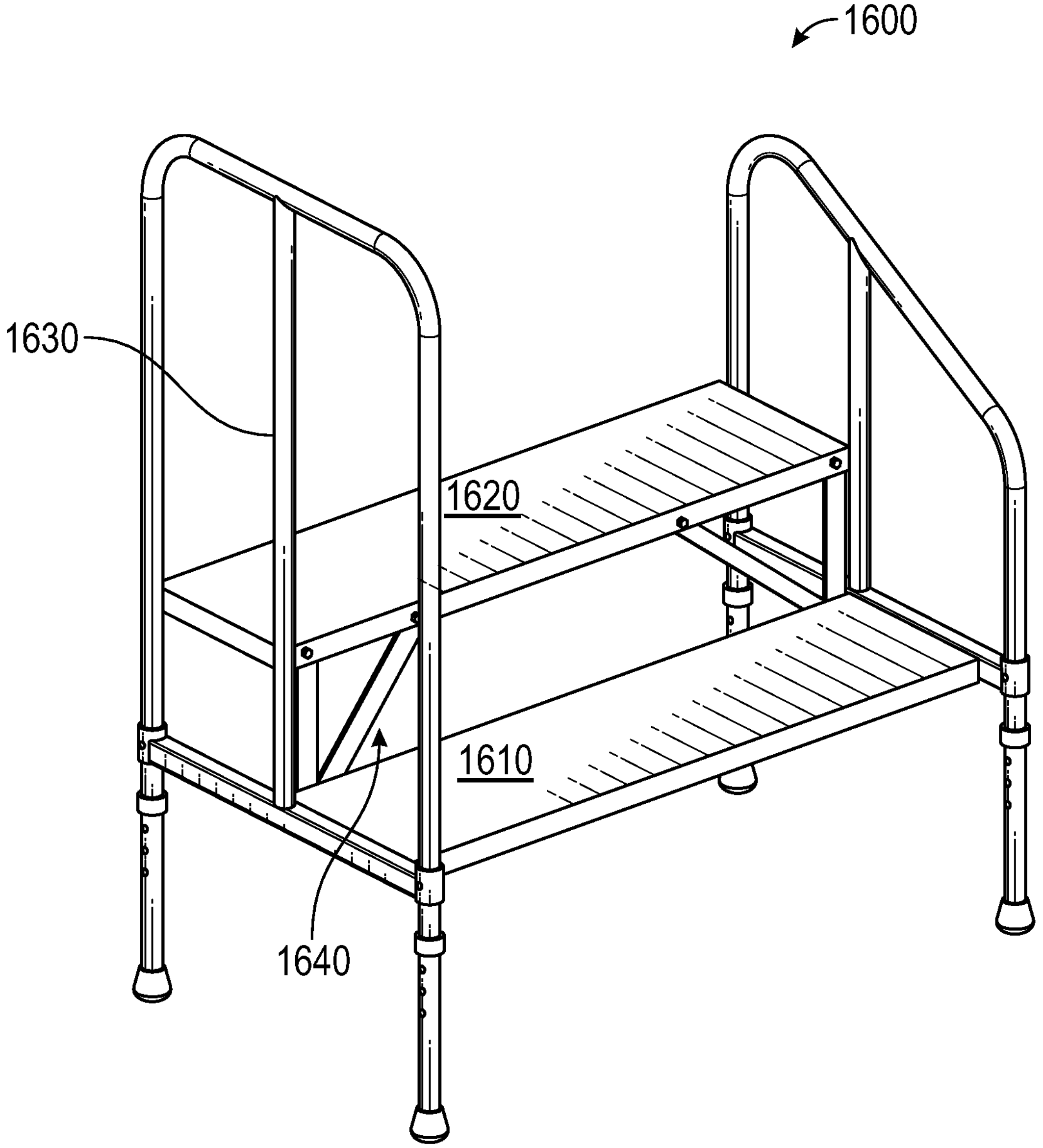
FIGS. 22A and 22B are perspective views of further embodiments of a bed step stool.
Figure 22B:
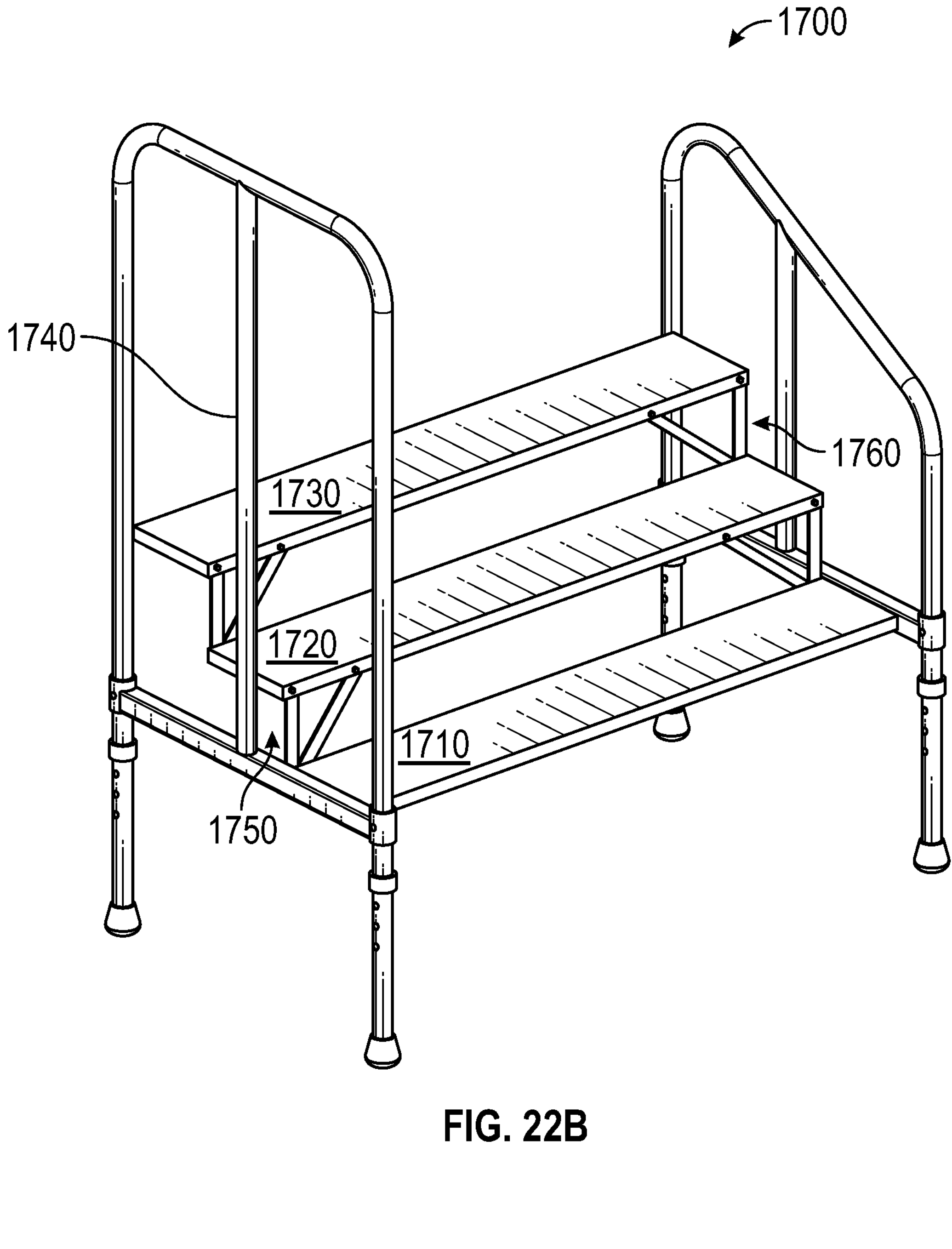
Figure 23:
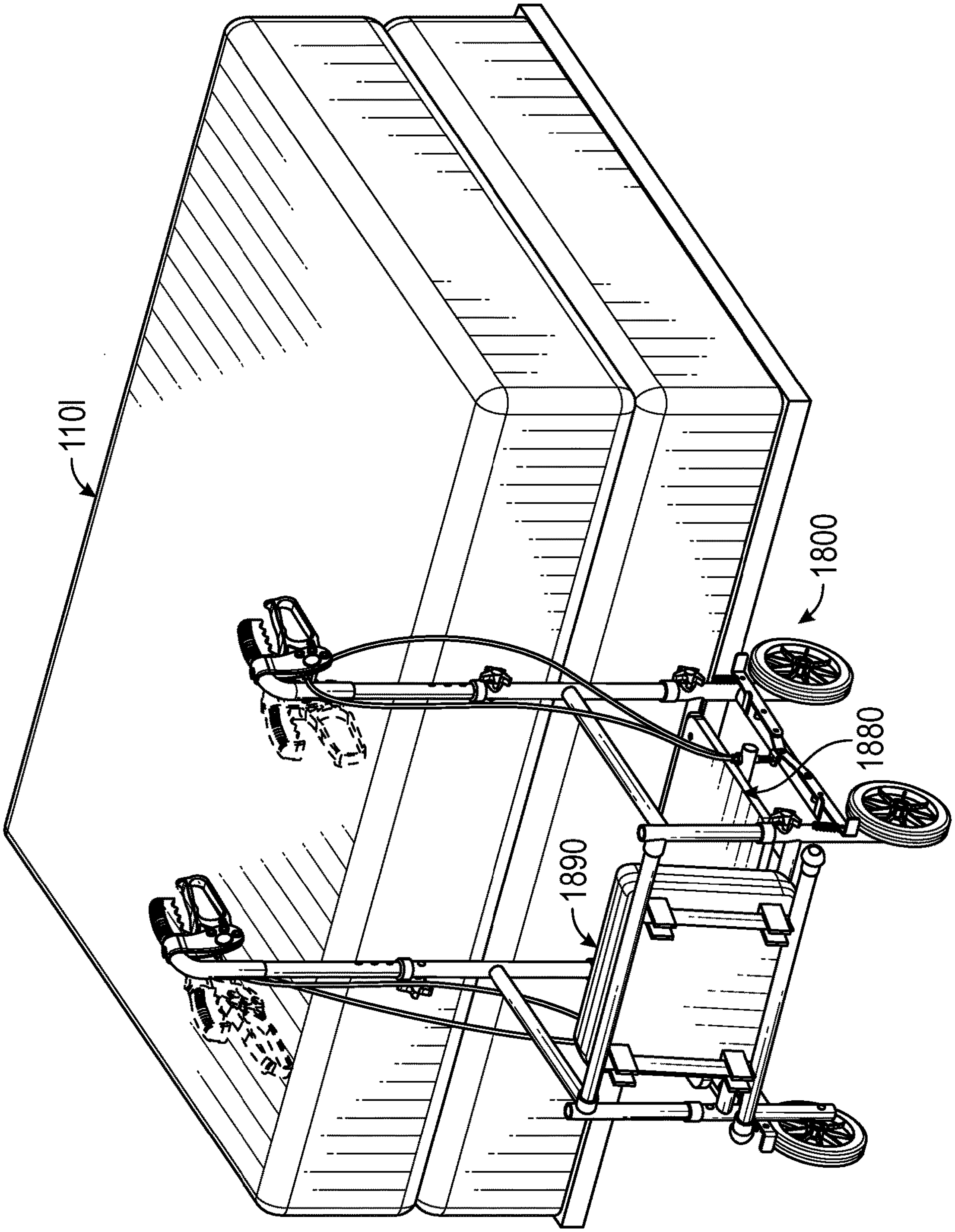
FIG. 23 is a perspective view of an additional embodiment of a bed step stool, which may also function as a walker, shown adjacent to a bed and with a seat shown in a stored position.
Figure 24:
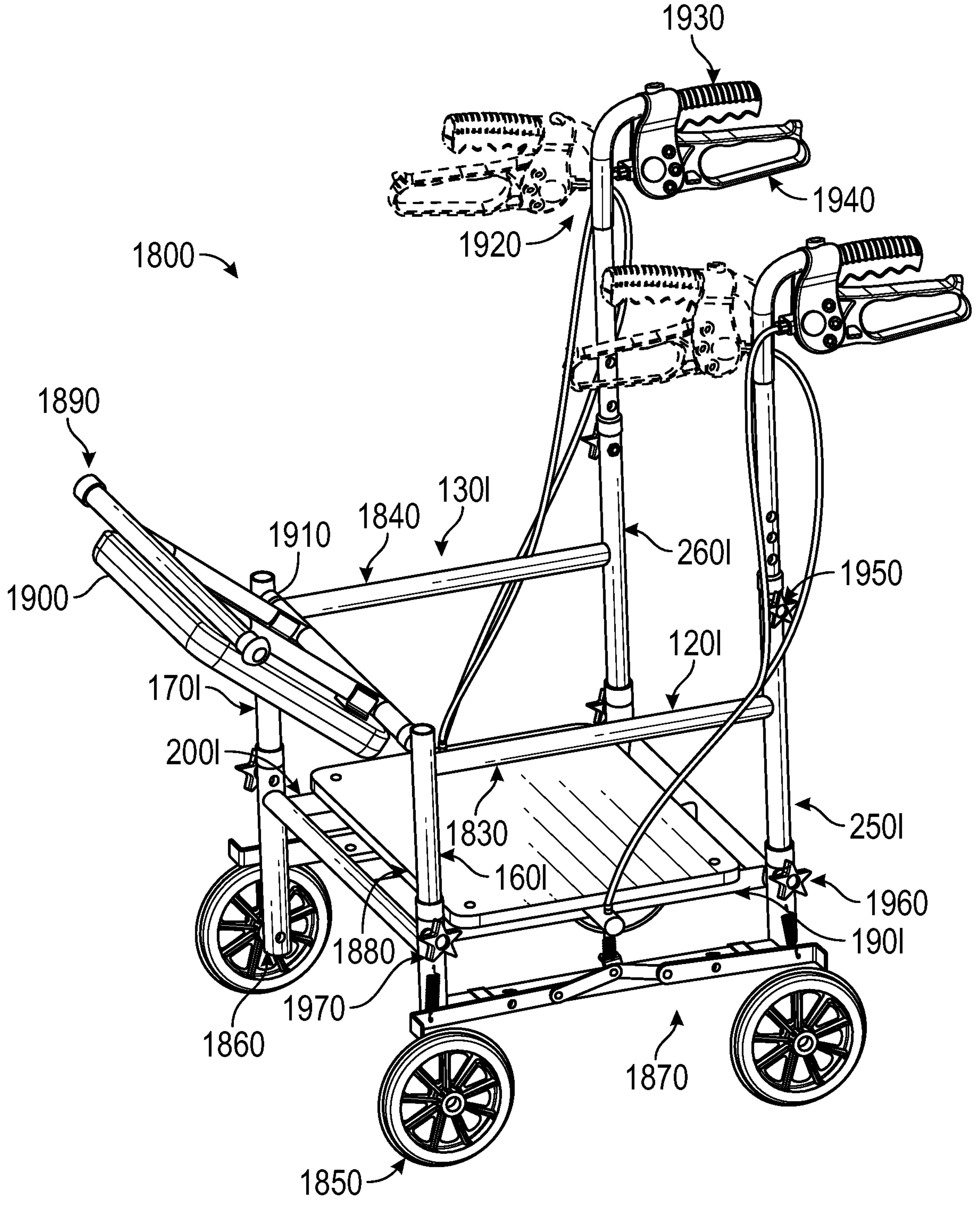
FIG. 24 is a perspective view of the bed step stool/walker of FIG. 23, and shows the seat in a position between the stored position and a deployed seat position.
Figure 25:
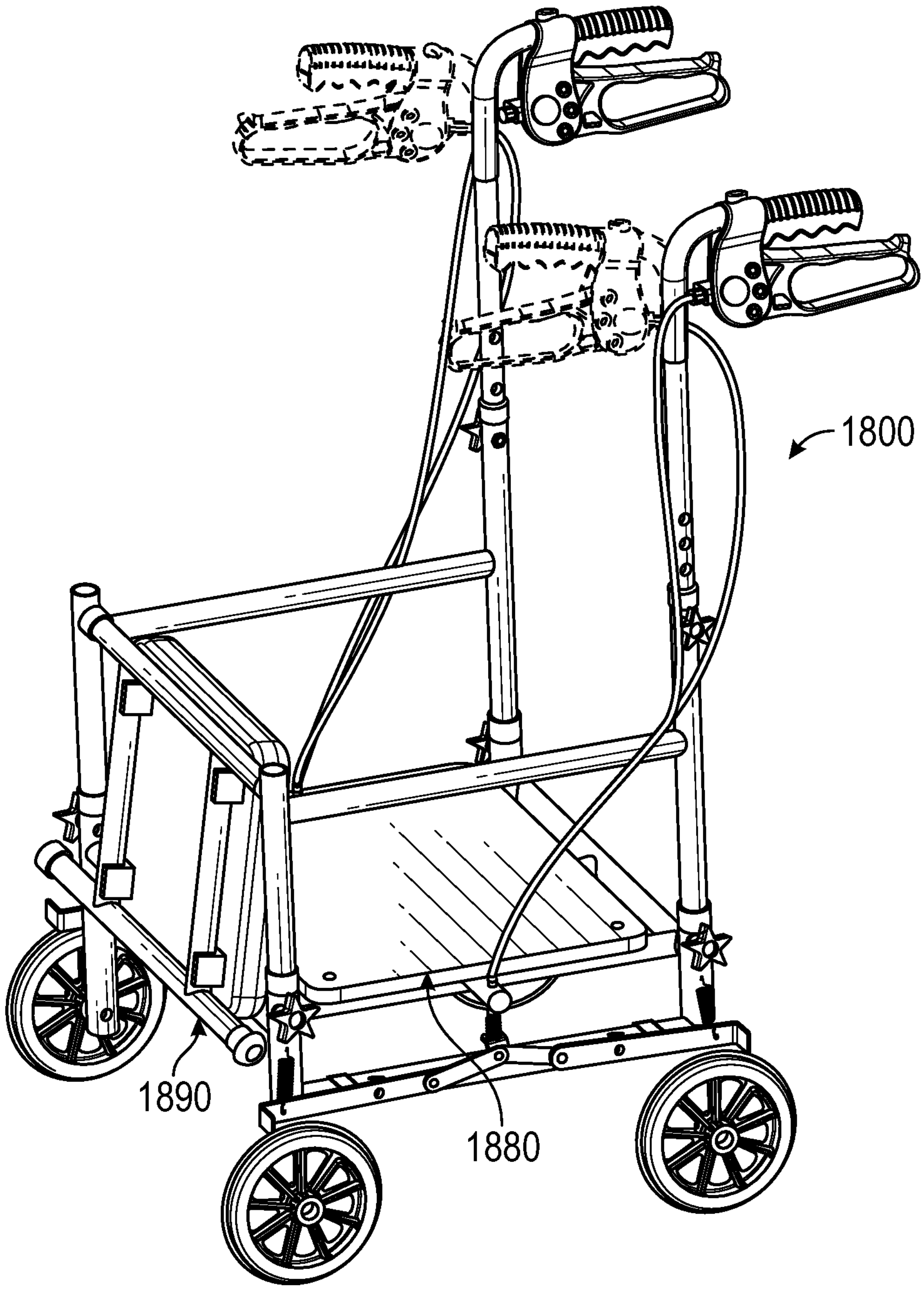
FIG. 25 is another perspective view of the bed step stool/walker of FIG. 23, and shows the seat in a stored position.
Figure 26:
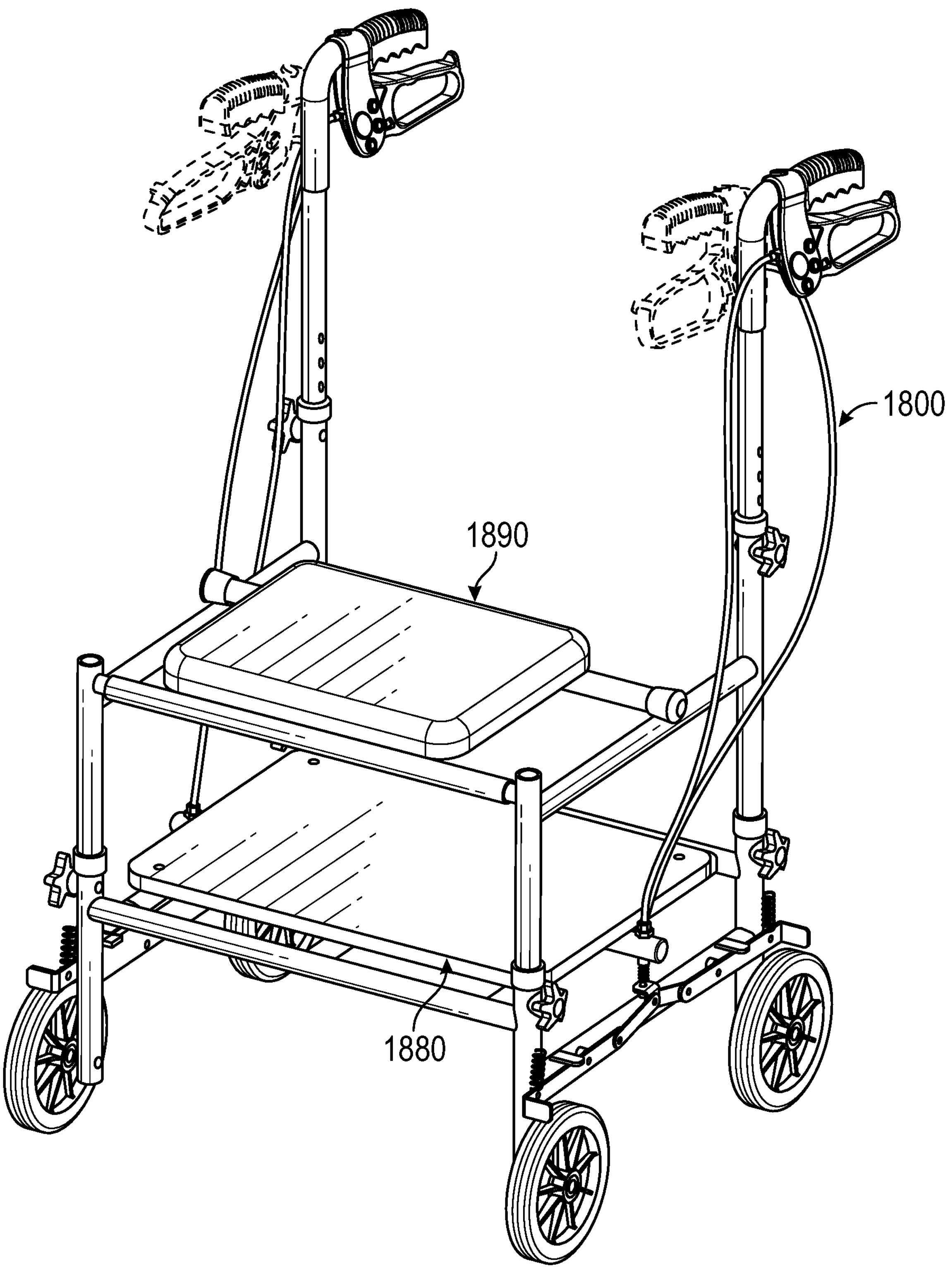
FIG. 26 is a further perspective view of the bed step stool/walker of FIG. 23, and shows the seat in a deployed seat position.
Figure 28:
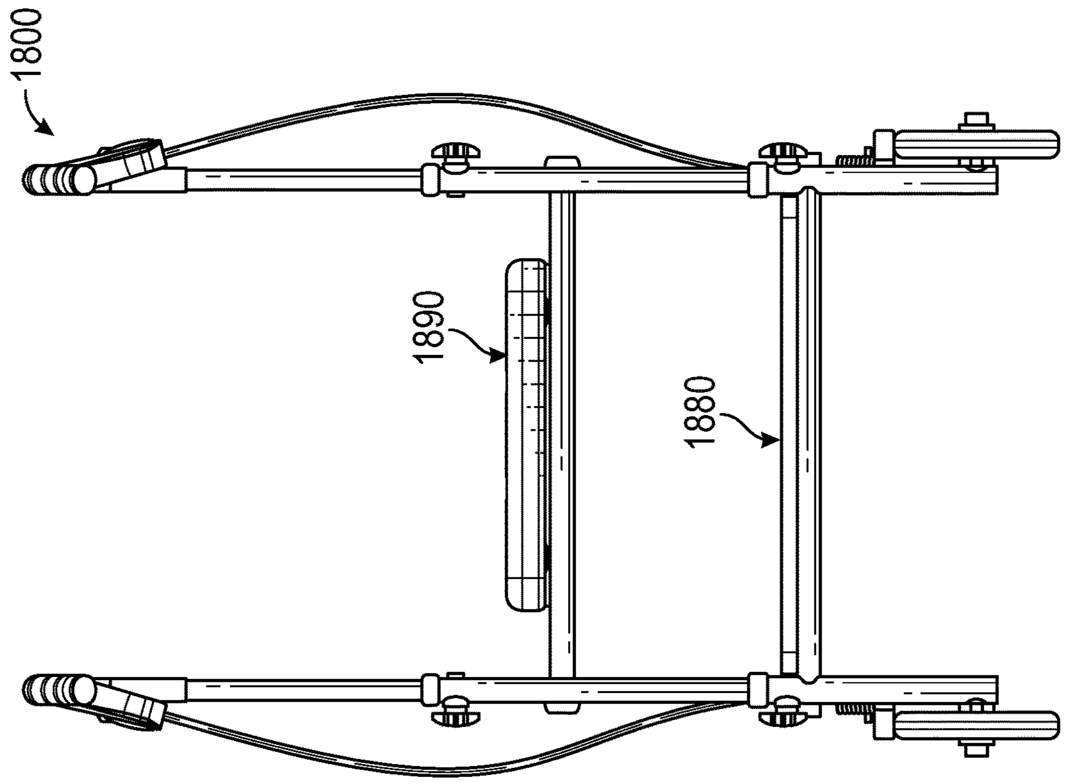
FIG. 28 is a rear elevational view of the bed step stool/walker of FIG. 23, and shows the seat in the deployed seat position.
Figure 27:
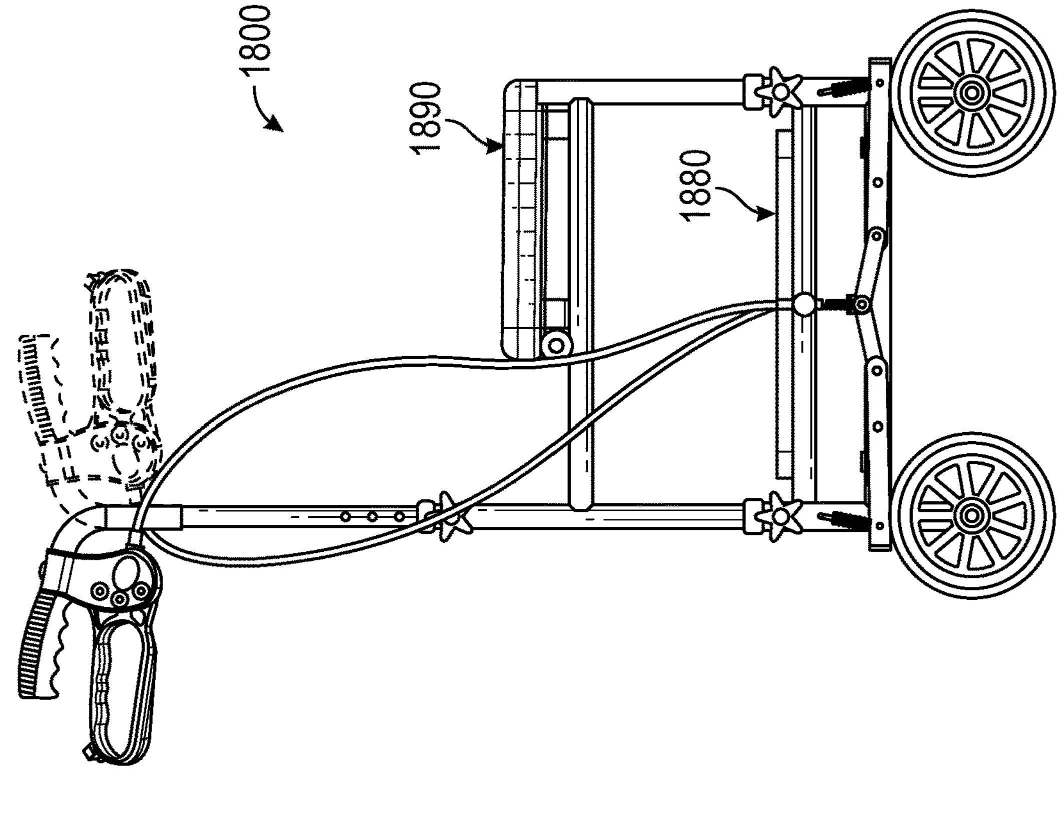
FIG. 27 is a left side elevational view of the bed step stool/walker of FIG. 23, and shows the seat in the deployed seat position.
Figure 29:
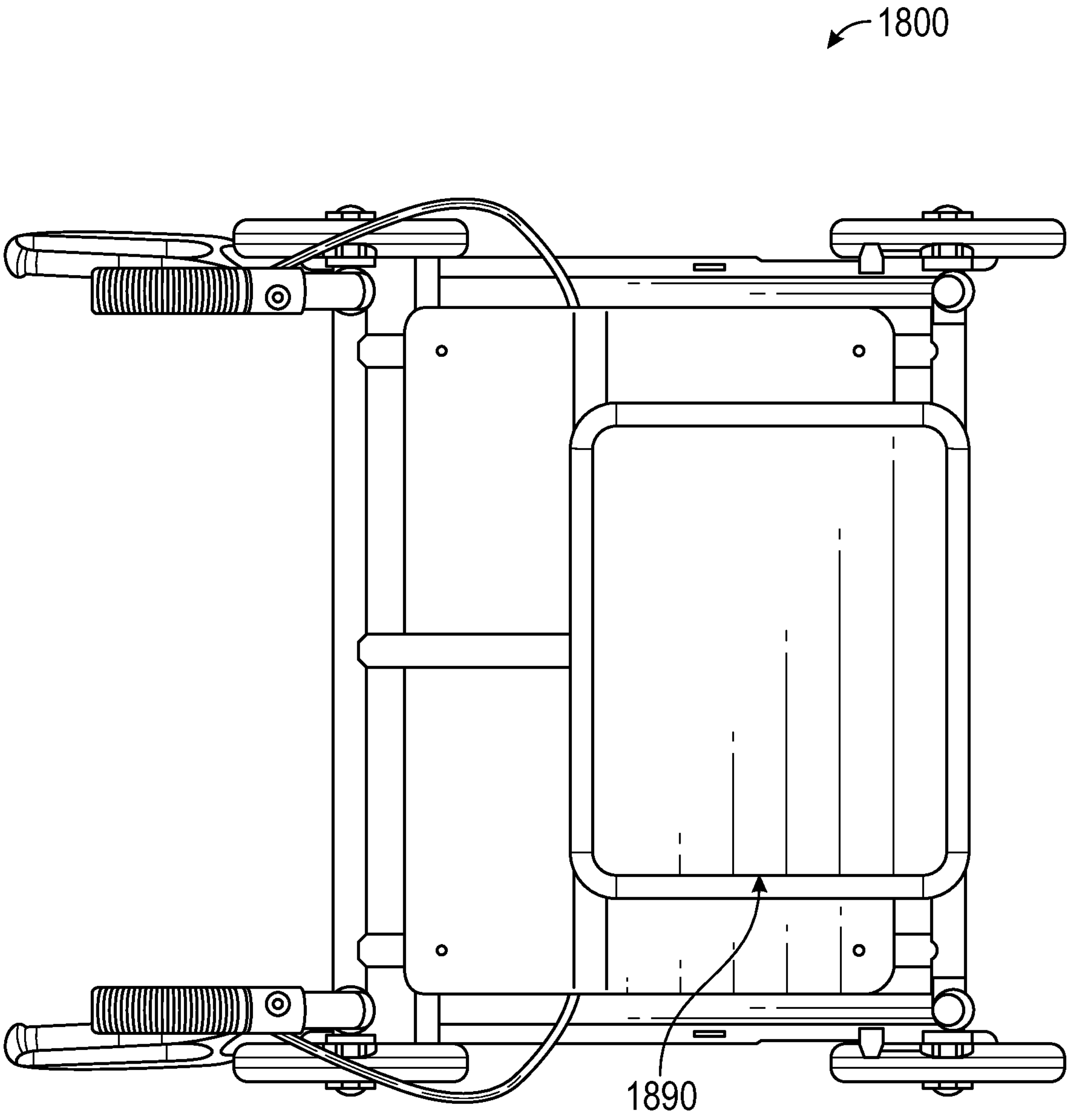
FIG. 29 is a top plan view of the bed step stool/walker of FIG. 23, and shows the seat in the deployed seat position.

With reference to FIGS. 22A and 22B, further embodiments of bed step stools 1600, 1700 will be described, with like elements to those shown and/or described with respect to FIGS. 1-4 shown and/or described with like reference numbers, but with "j" and "k" suffices, and with the subject matter described above with respect to FIGS. 1-4 incorporated herein. The bed step stool 1600 of FIG. 22A includes a pair of step assemblies 1610, 1620 at different heights/locations, enabling a user that is not able to take larger steps to take smaller steps to get up to and on or off the bed. The bed step stool 1600 includes additional central vertical supports 1630 and frame supports 1640 to support a second step assembly 1620. The bed step stool 1700 of FIG. 22B is similar to the bed step stool 1600 of FIG. 22A, but includes three step assemblies 1710, 1720, 1730 at different heights/locations, enabling a user that is not able to take larger steps to take even smaller steps to get up to and on or off the bed. Similar to the bed step stool 1600 of FIG. 22A, the bed step stool 1700 of FIG. 22B includes additional central vertical supports 1740 and frame supports 1750, 1760 to support a second step assembly 1720 and a third step assembly 1730.

With reference to FIGS. 23-29, an additional embodiment of a bed step stool 1800, which may also function as a walker, will be described. Like elements to those shown and/or described with respect to FIGS. 1-4 are shown and/or described with like reference numbers, but with a "l" suffix, and with the subject matter shown and/or described above with respect to FIGS. 1-4 incorporated herein. The bed step stool/walker 1800 is shown adjacent to bed 1101.

The bed step stool/walker 1800 includes guard rails 1201, 130L that are shorter in height than guard rails 120, 130 of FIGS. 1-4, step crossbar assemblies 190I, 200I, 1810, 1820 that connect back legs 160I, 170I to front legs 250I, 260I, and upper cross bars 1830, 1840. Wheels 1850 are disposed at lower portions 1860 of legs 160I, 170I, 250I, 260I. A brake mechanism 1870 is operably coupled to the wheels 1850. A step assembly 1880 is supported by the step crossbar assemblies 190I, 200I, 1810, 1820. A seat assembly 1890 with a seat 1900 is rotatably movably coupled at pivot points 1910 to the back legs 160I, 170I for rotation/movement between a stored position (FIGS. 23, 25) and a deployed seat position (FIG. 26-29). The front legs 250I, 260I terminate in an upper portion 1920 in handles 1930, which include hand brakes 1940 operably coupled to the brake mechanism 1870. The handles 1930/hand brakes 1940 may be disposed in a direction away from the seat assembly 1890 or in a direction toward the seat assembly 1890. The front legs 250I, 260I include upper and lower height adjustment mechanisms 1950, 1960. The back legs 160I, 170I include height adjustment mechanisms 1970.

In use, the bed step stool/walker 1800 may be used as a walker and a seat when the seat assembly 1890 is disposed in the deployed seat position. The bed step stool/walker 1800 is rolled over next to the bed (or other object to be stepped up to) 1101 and the seat assembly 1890 is rotatably moved to the stored position. The user then actuates the brake mechanism 1870 to secure the bed step stool/walker 1800 into position and steps onto the step assembly 1880 to assist in getting onto and/or off of the bed 1101 in the manner described above with respect to FIGS. 1-4, which is incorporated herein. The handles 1930 may be gripped for additional assistance/security when stepping onto and/or off of the step assembly 1880.

In one or more embodiments, the walker 1800 does not function as and/or is not used/designed for used as a bed step stool.

With reference to FIGS. 30-35, an additional embodiment of a bed step stool 2000, which may also function as a walker, will be described. Like elements to those shown and/or described with respect to FIGS. 1-4 and FIGS. 23-29 are shown and/or described with like reference numbers, but with a "m" suffix, and with the subject matter shown and/or described above with respect to FIGS. 1-4 and FIGS. 23-29 incorporated herein. The bed step stool/walker 2000 is shown adjacent to bed 110*m*. The bed step stool/walker 2000 is similar to the bed step stool/walker 1800, but instead of seat assembly 1890 coupled to the back legs 160I, 170I, preventing a user to walk through bed step stool/walker 1800 from one side/front, onto/over step assembly 1880*m*, to opposite side/rear, the bed step stool 2000 includes a seat assembly 1890*m* that is movable between a stored position (FIGS. 30, 32), providing an open path for a user to walk through bed step stool/walker 2000 from one side/front 2010, onto/over step assembly 1880*m*, to opposite side/rear 2020, and a deployed seat position (FIGS. 31, 33-35), blocking the path. In the stored position (FIGS. 30, 32), the seat assembly 1890*m*, which includes couplers 2030 on a bottom 2040, is coupled to one of the upper cross bars so that the seat 1900*m* is disposed along an outer side 2050 of the bed step stool/walker 2000. With the seat assembly 1890*m* in the stored position, the upper cross bars 1830*m*, 1840*m* and handles 1930*m* form first support(s) and second support (s) that define an unobstructed pathway for entry and exit with respect to the bed 110*m* and the bed step stool/walker 2000 that is perpendicular with respect to the sides of the bed 110*m* whereby the user goes between the first support(s) 1830*m*, 1930*m* and the second support(s) 1840*m*, 1930*m*, onto the step assembly 1880*m*, and off the step assembly 1880*m* without any obstruction. In the deployed seat position (FIGS. 31, 33-35), the seat assembly 1890*m* straddles (and is coupled via the couplers 2030 to) the upper cross bars 1830*m*, 1840*m* and obstructs the pathway when used to assist the user into/out of bed 110*m*.

In one or more embodiments, the walker 2000 does not function as and/or is not used/designed for used as a bed step stool.

Figure 30:
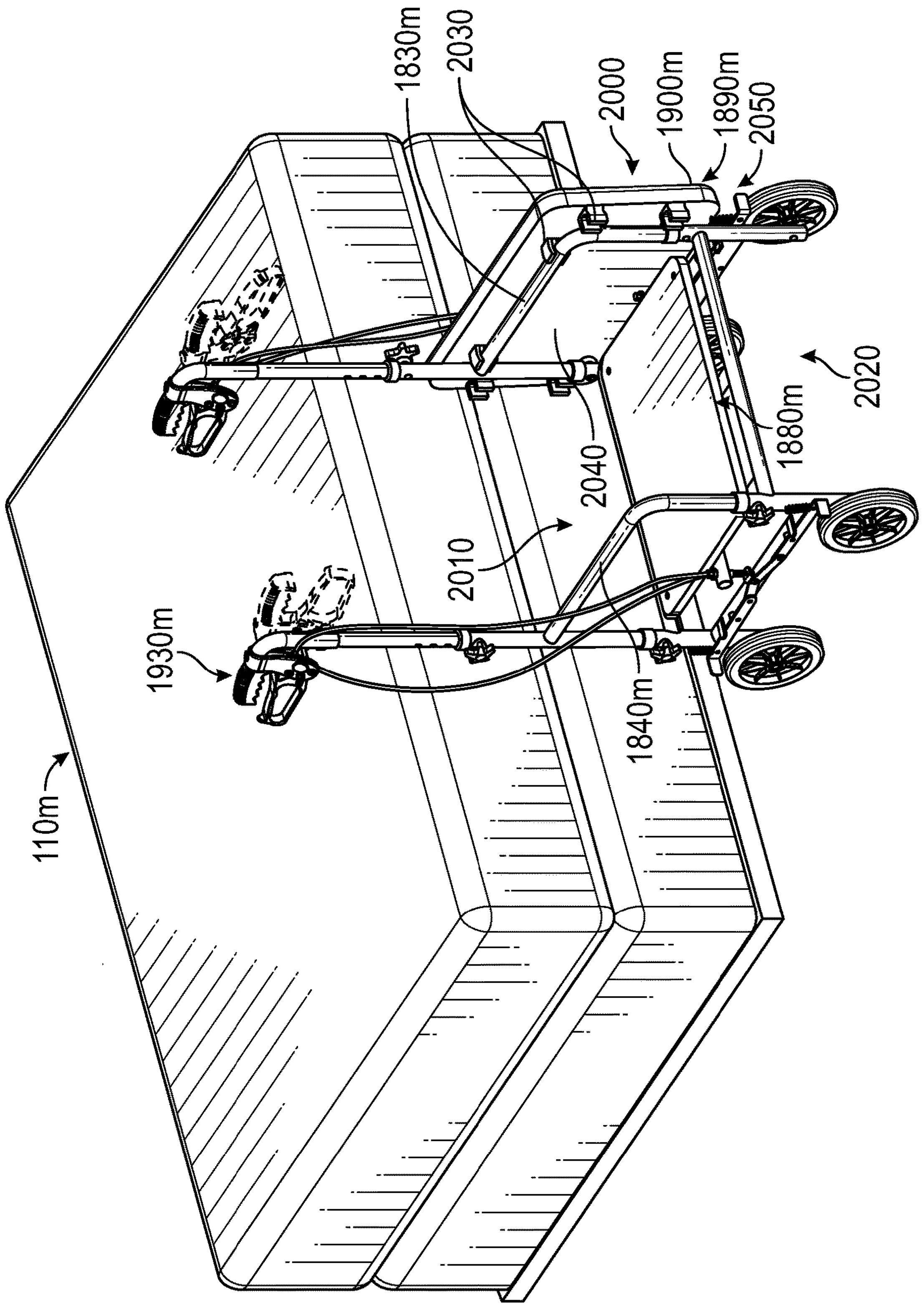
FIG. 30 is a perspective view of another embodiment of a bed step stool, which may also function as a walker, shown adjacent to a bed and with a seat shown in a stored position.
Figure 31:
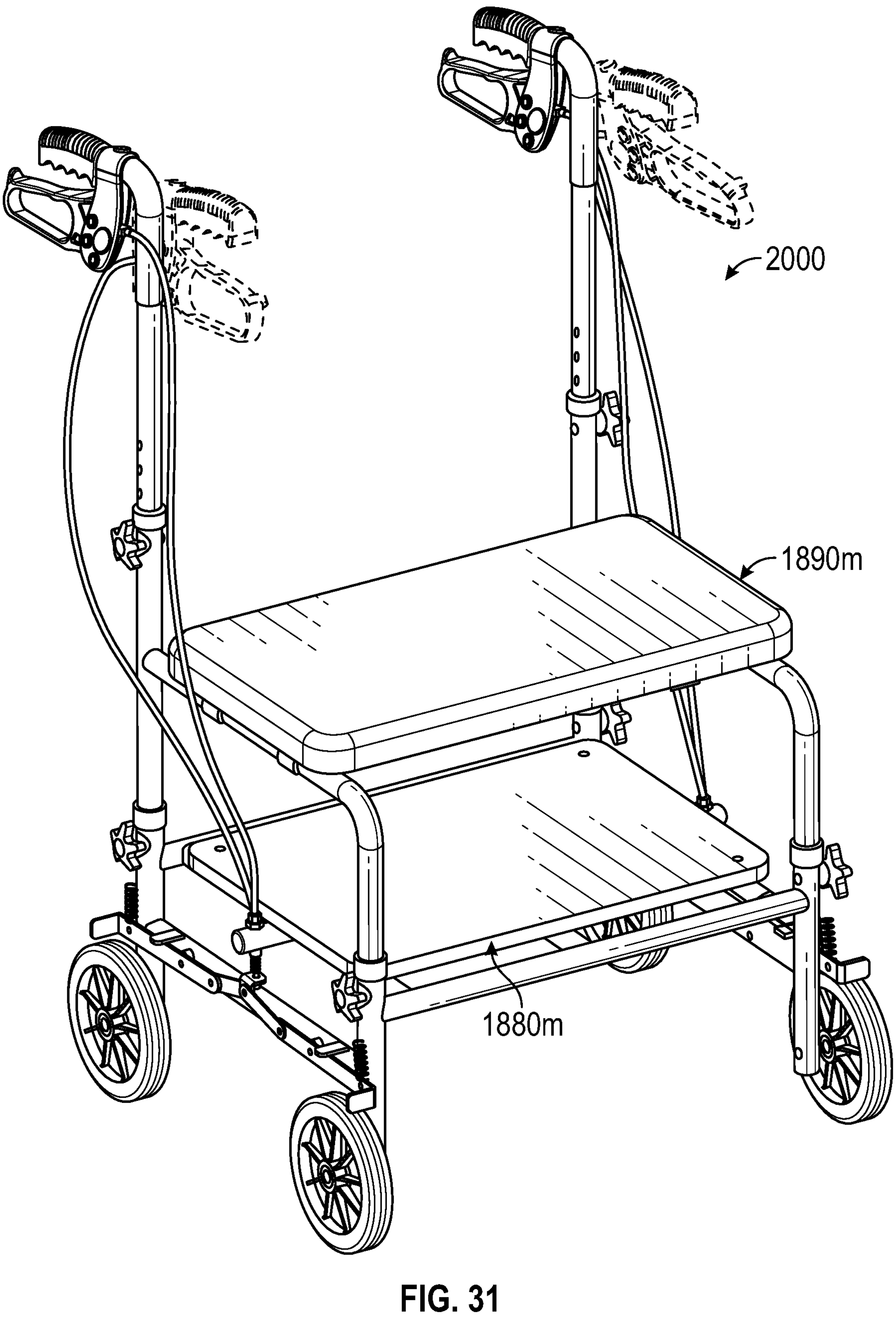
FIG. 31 is a perspective view of the bed step stool/walker of FIG. 30, and shows the seat in the deployed seat position.
Figure 32:
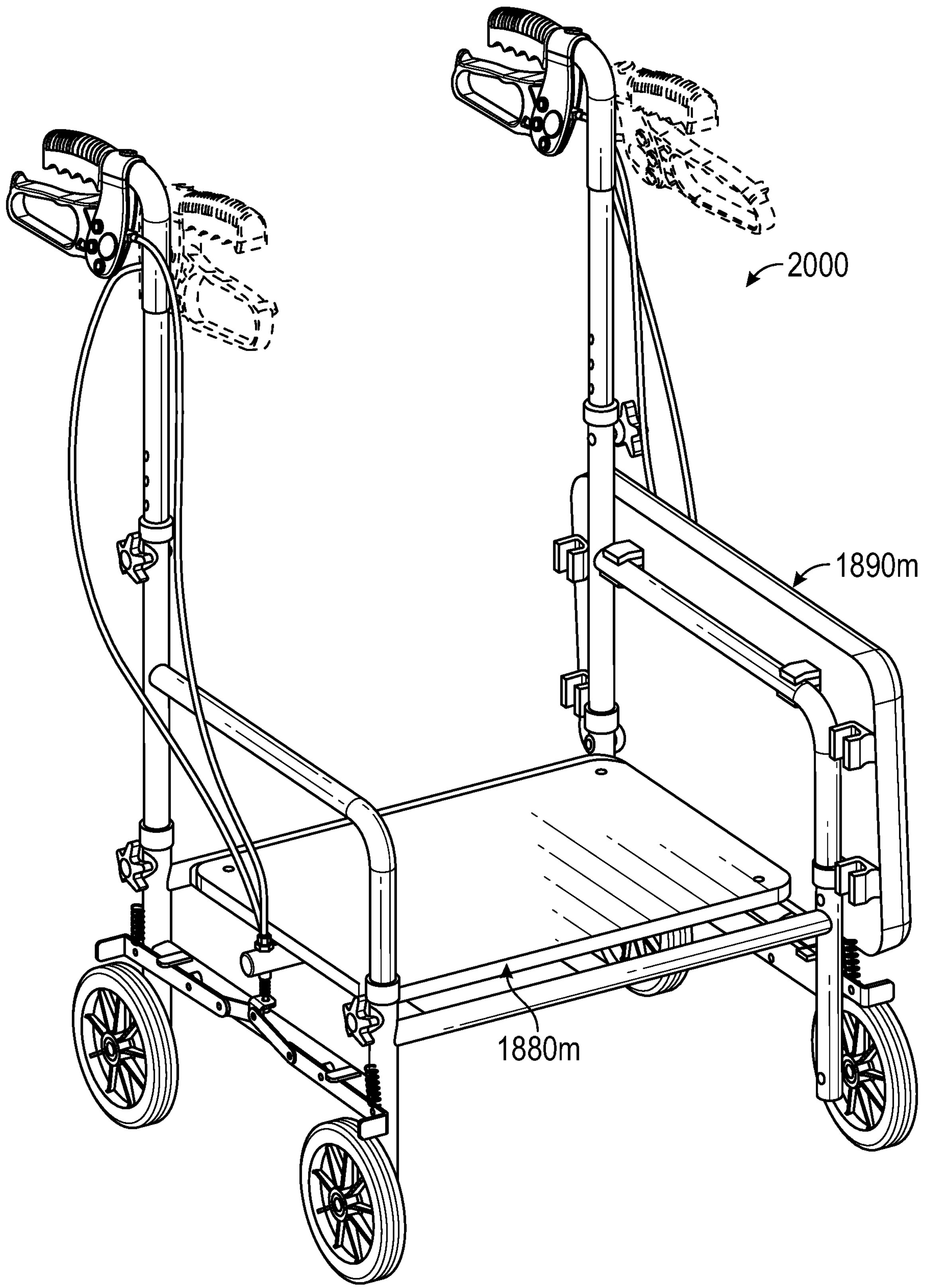
FIG. 32 is another perspective view of the bed step stool/walker of FIG. 30, and shows the seat in the stored seat position.
Figure 34:
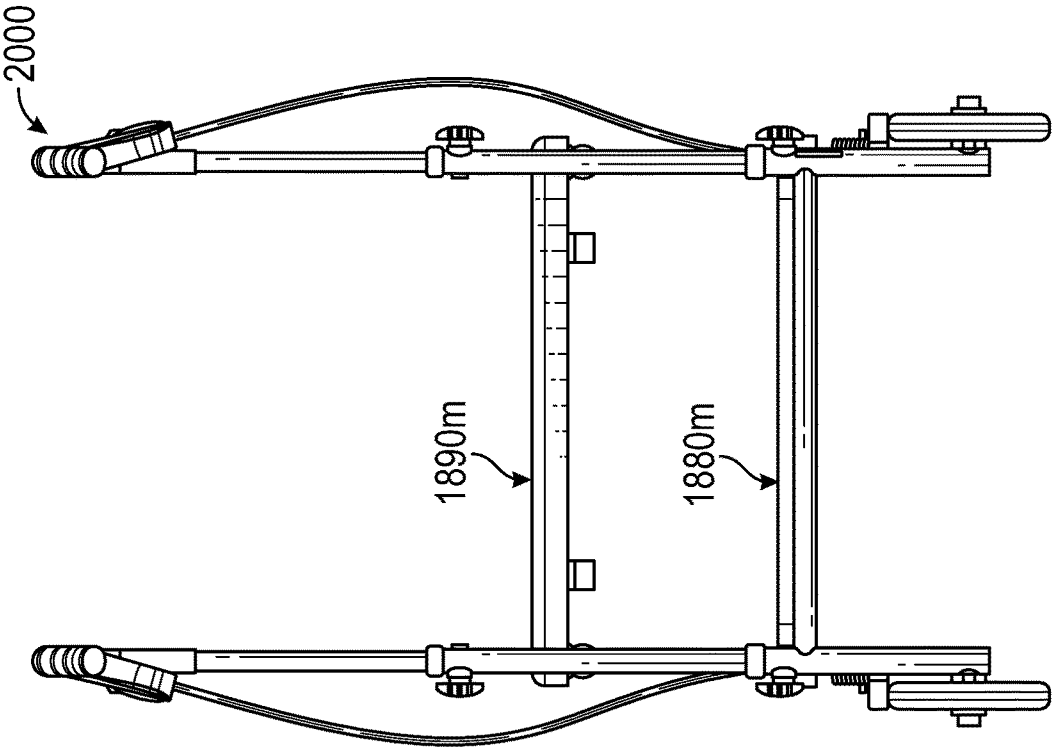
FIG. 34 is a rear elevational view of the bed step stool/walker of FIG. 30, and shows the seat in the deployed seat position.
Figure 33:
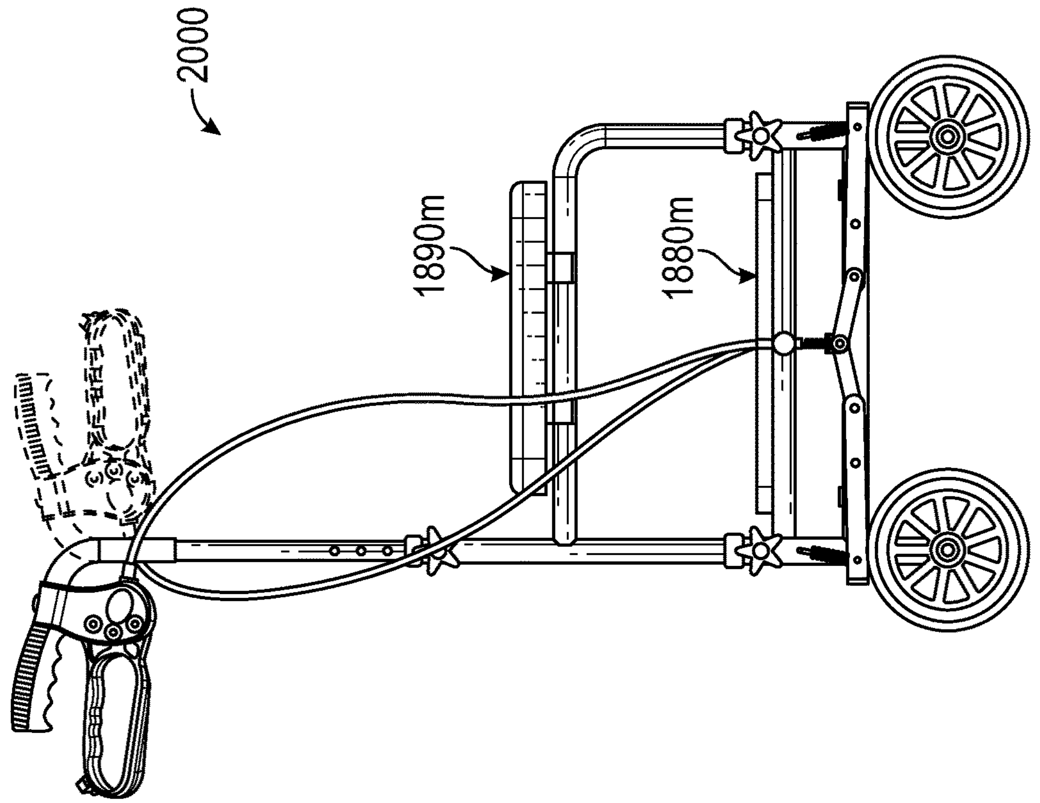
FIG. 33 is a left side elevational view of the bed step stool/walker of FIG. 30, and shows the seat in the deployed seat position.
Figure 35:
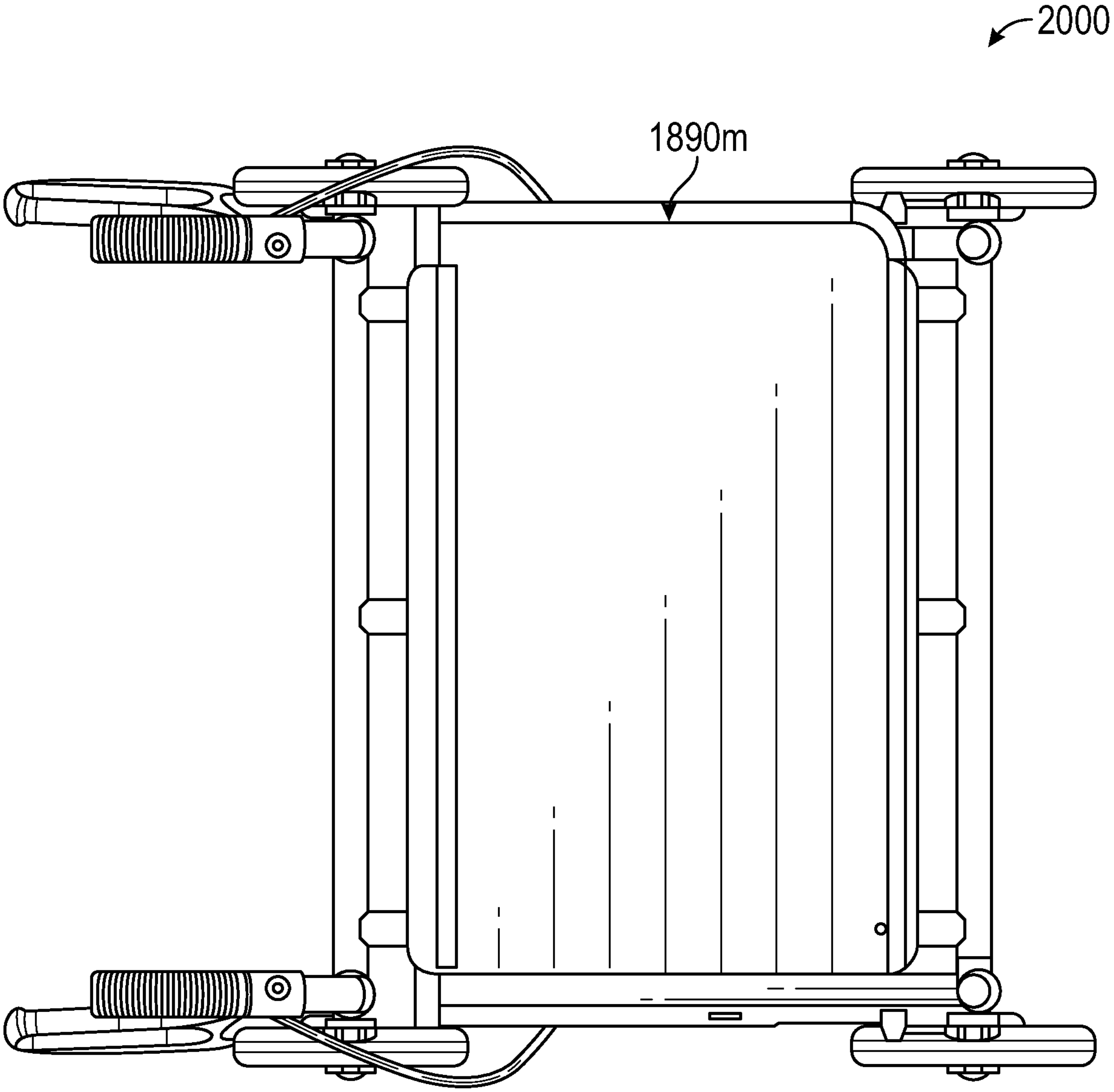
FIG. 35 is a top plan view of the bed step stool/walker of FIG. 30, and shows the seat in the deployed seat position.
Figure 36:
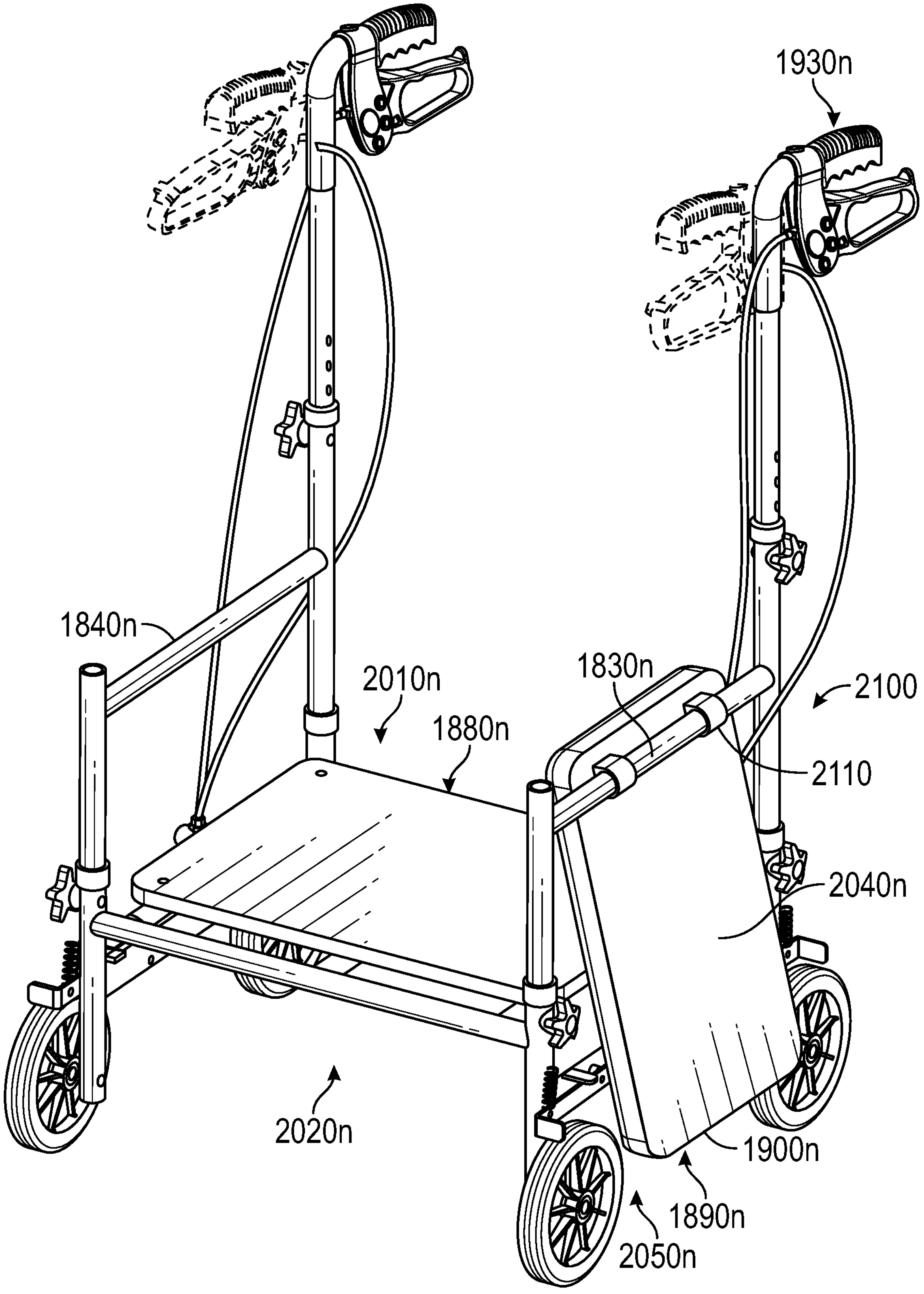
FIG. 36 is a perspective view of a further embodiment of a bed step stool, which may also function as a walker, and shows a seat in a stored position.
Figure 37:
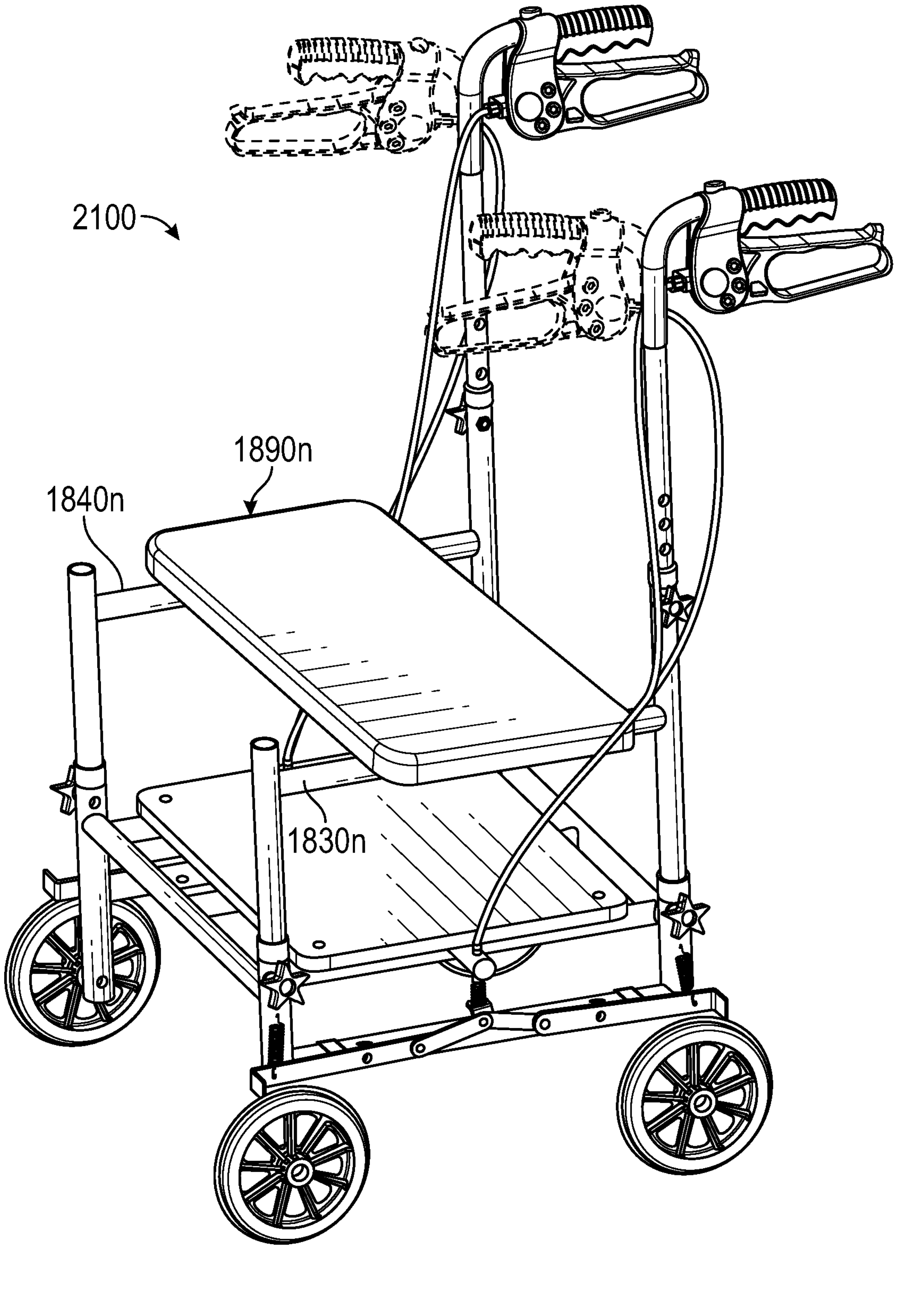
FIG. 37 is another perspective view of the bed step stool/walker of FIG. 36, and shows the seat in a deployed seat position.

With reference to FIGS. 36 and 37, another embodiment of a bed step stool 2100, which may also function as a walker, will be described. Like elements to those shown and/or described with respect to FIGS. 1-4 and FIGS. 23-35 are shown and/or described with like reference numbers, but with a "n" suffix, and with the subject matter shown and/or described above with respect to FIGS. 1-4 and FIGS. 23-35 incorporated herein. The bed step stool/walker 2100 is similar to the bed step stool/walker 2000, but instead of seat assembly 1890*m* removably and movably coupled to one of the upper cross bars 1830*m*, 1840*m* as shown in FIG. 30, seat assembly 1890*n* is rotatably coupled to one of upper cross bars 1830*n*, 1840*n* for rotation between a stored position (FIG. 36) along outer side 2050*n*, providing an open path for a user to walk through bed step stool/walker 2100 from one side/front 2010*n*, onto/over step assembly 1880*n*, to opposite side/rear 2020*n*, and a deployed seat position (FIG. 37), blocking the path. In the stored position (FIG. 36), the seat assembly 1890*n*, which includes rotatable couplers 2110 on a bottom 2040*n*, is coupled to one of the upper cross bars 1830*n*, 1840*n* so that the seat 1900*n* is disposed along the outer side 2050*n* of the bed step stool/walker 2100. With the seat assembly 1890*n* in the stored position, the upper cross bars 1830*n*, 1840*n* and handles 1930*n* form first support(s) and second support(s) that define an unobstructed pathway for entry and exit with respect to the bed 110*m* and the bed step stool/walker 2100 that is perpendicular with respect to the sides of the bed 110*m* whereby the user goes between the first support(s) 1830*n*, 1930*n* and the second support(s) 1840*n*, 1930*n*, onto the step assembly 1880*n*, and off the step assembly 1880*n* without any obstruction. In the deployed seat position (FIG. 37), the seat assembly 1890*n* straddles and is supported by the upper cross bars 1830*n*, 1840*n* and obstructs the pathway when used to assist the user into/out of bed 110*m*.

In one or more embodiments, the walker 2100 does not function as and/or is not used/designed for used as a bed step stool.

Figure 38:
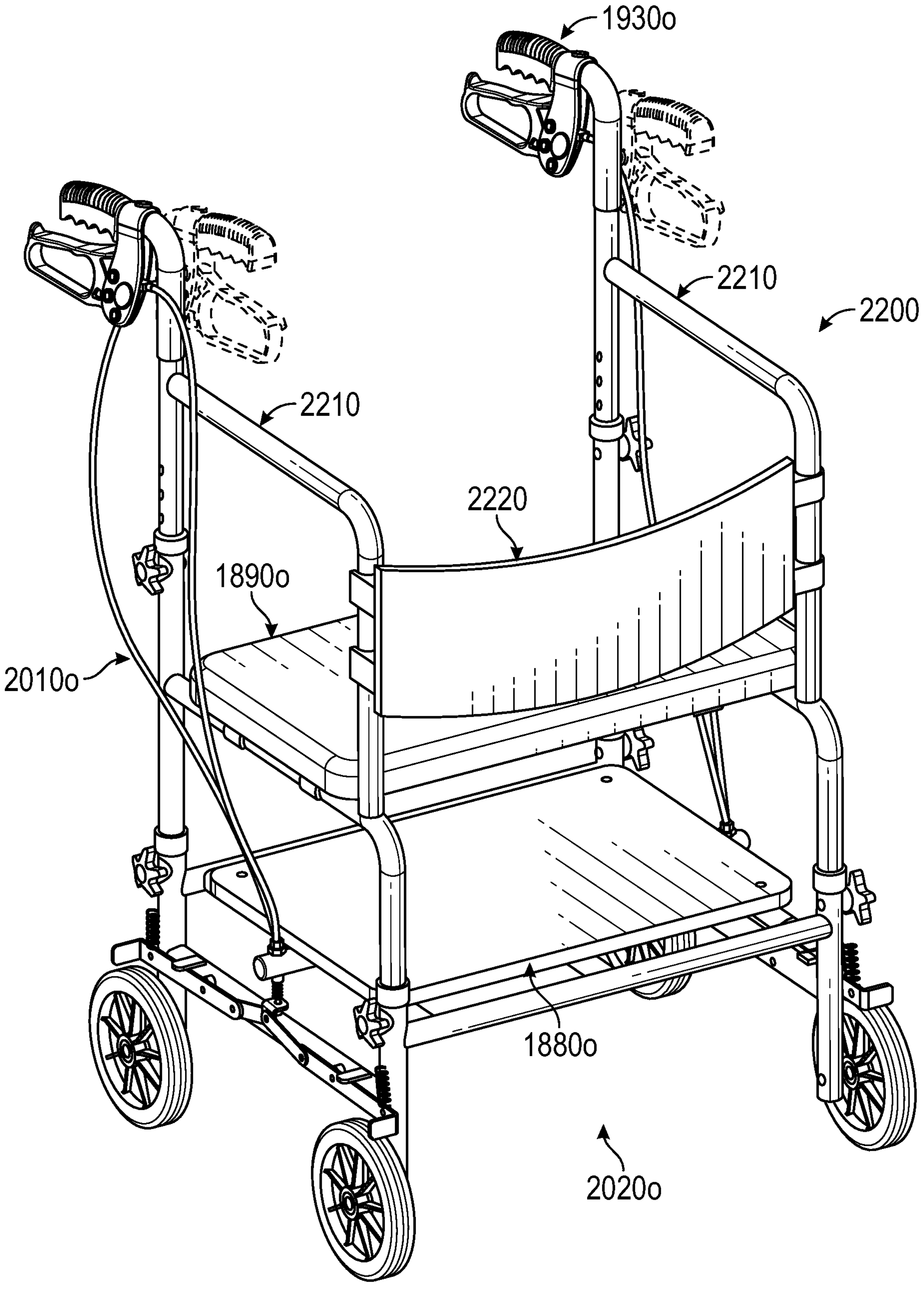
FIG. 38 is a perspective view of a still further embodiment of a bed step stool, which may also function as a walker, and shows a securement device in a deployed securement position.
Figure 39:
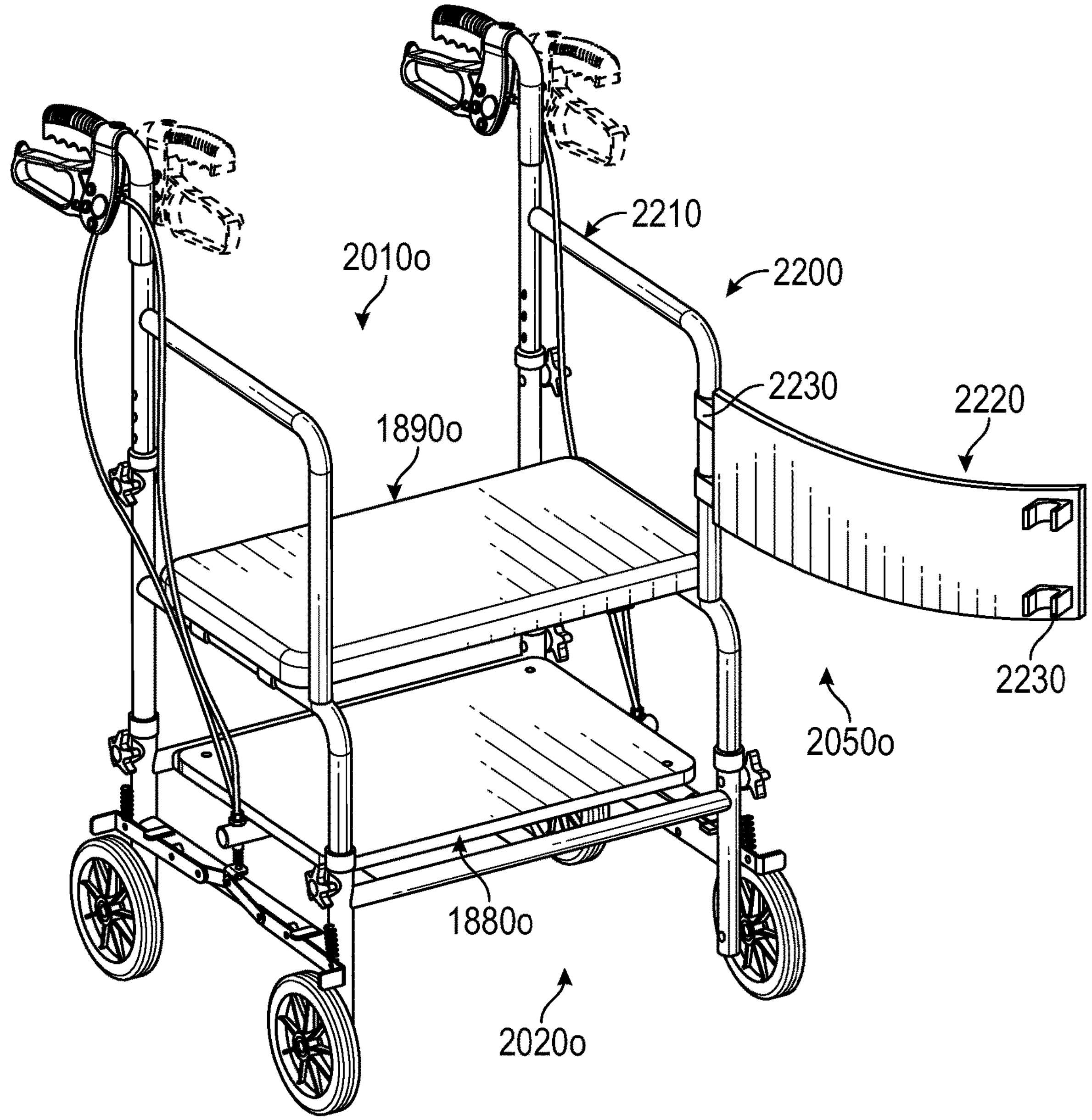
FIG. 39 is another perspective view of the bed step stool/walker of FIG. 38, and shows the securement device in a retracted position.

With reference to FIGS. 38 and 39, another embodiment of a bed step stool 2200, which may also function as a walker, will be described. Like elements to those shown and/or described with respect to FIGS. 1-4 and FIGS. 23-37 are shown and/or described with like reference numbers, but with an "o" suffix, and with the subject matter shown and/or described above with respect to FIGS. 1-4 and FIGS. 23-37 incorporated herein. The bed step stool/walker 2200 is similar to the bed step stool/walkers 2000, 2100, but additionally includes L-shaped upper handrails 2210 and a guard rail/back support 2220 rotatably movably coupled to one of the L-shaped upper handrails 2210 via couplers 2230. The guard rail/back support 2220 is movable and rotatable between a stored position or out-of-the-way position (FIG. 39) along outer side 2050*o*, providing an open path for a user to walk through bed step stool/walker 2200 (when seat assembly 1890*o* is also in stored position) from one side/front 2010*o*, onto/over step assembly 1880*o*, to opposite side/rear 2020*o*, and a deployed safety position (FIG. 38), providing back support, preventing the user from falling backward, and blocking the path. With the seat assembly 1890*o* and the guard rail/back support 2220 in the stored position or out-of-the-way position, the upper cross bars 1830*o*, 1840*o* and handles 1930*o* form first support(s) and second support(s) that define an unobstructed pathway for entry and exit with respect to the bed 110*m* and the bed step stool/walker 2200 that is perpendicular with respect to the sides of the bed 110*m* whereby the user goes between the first support(s) 1830*o*, 1930*o* and the second support(s) 1840*o*, 1930*o*, onto the step assembly 1880*o*, and off the step assembly 1880*o* without any obstruction. In the deployed position(s) (FIG. 38), the seat assembly 1890*o*, which straddles the second support(s) 1840*o*, 1930*o*, and the guard rail/back support 2220 obstruct the pathway when used to assist the user into/out of bed 110*m*.

In one or more embodiments, the walker 2200 does not function as and/or is not used/designed for used as a bed step stool.

Figure 40:
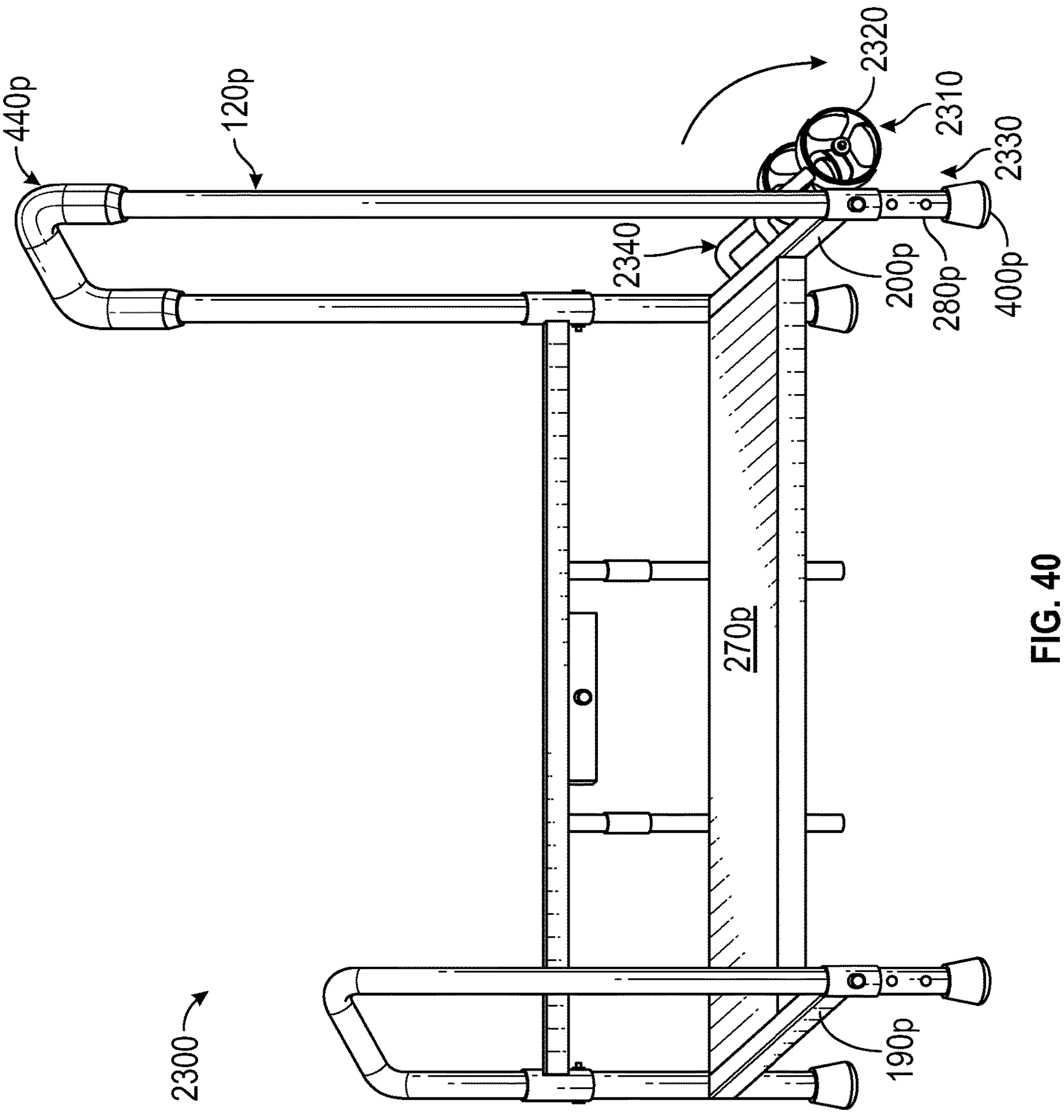
FIG. 40 is a perspective view of an additional embodiment of a bed step stool, which may wheeled from location to location.

With reference to FIG. 40, an additional embodiment of a bed step stool 2300, which may wheeled from location to location, will be described. Like elements to those shown and described with respect to FIGS. 1-4 and FIGS. 23-39 are shown and/or described with like reference numbers, but with a "p" suffix, and with the subject matter shown and/or described above with respect to FIGS. 1-4 and FIGS. 23-39 incorporated herein. The bed step stool 2300 is generally similar to the bed step stool 100, but includes a wheel assembly 2310 including one or more wheels 2320 coupled to the step assembly 270*p* at a side 2330 of the step assembly 270*p* via wheel clamp/mount 2340 and step crossbar assembly 200*p* (or step crossbar assembly 190*p*), or may be coupled to the step assembly 270*p* via wheel mount 2340 and legs 280*p*. The wheel assembly 2310 may be detachably coupled to the side 2330 of the bed step stool 2300.

In use, the bed step stool 2300 is wheeled from location to location (e.g., from storage to side of bed, from side of bed to storage) by pulling on the upper portion 440*p* of the tall guardrail 120*p* to cause the bed step stool 2300 to tilt/lean about the pair of rubber tips 400*p* of the tall guardrail 120*p* towards the side 2330 in the direction of the arrow shown until the bed step stool 2300 is supported by the wheel assembly 2310. This orientation is a tilted/leaned/wheel assembly supported orientation. Using the upper portion 440*p* of the tall guardrail 120*p* as a handle bar gripped by one's hands, the bed step stool 2300 is pushed or pulled (and rolled) using the wheel assembly 2310 like a cart to the desired location. At the desired location, the bed step stool 2300 is positioned for use by handling the upper portion 440*p* and initially tilting/leaning the bed step stool 2300 about the wheel assembly 2310 until the pair of rubber tips 400*p* of the tall guardrail 120*p* engage the support surface/floor and then the bed step stool 2300 is continued to be tilted about the rubber tips 400*p* until the bed step stool 2300 is disposed in position in an orientation similar to those shown in FIGS. 2 and 40 and used in the manner described herein. This bed step stool orientation is a stabilized/wheel assembly out of the way orientation.

Figure 41:
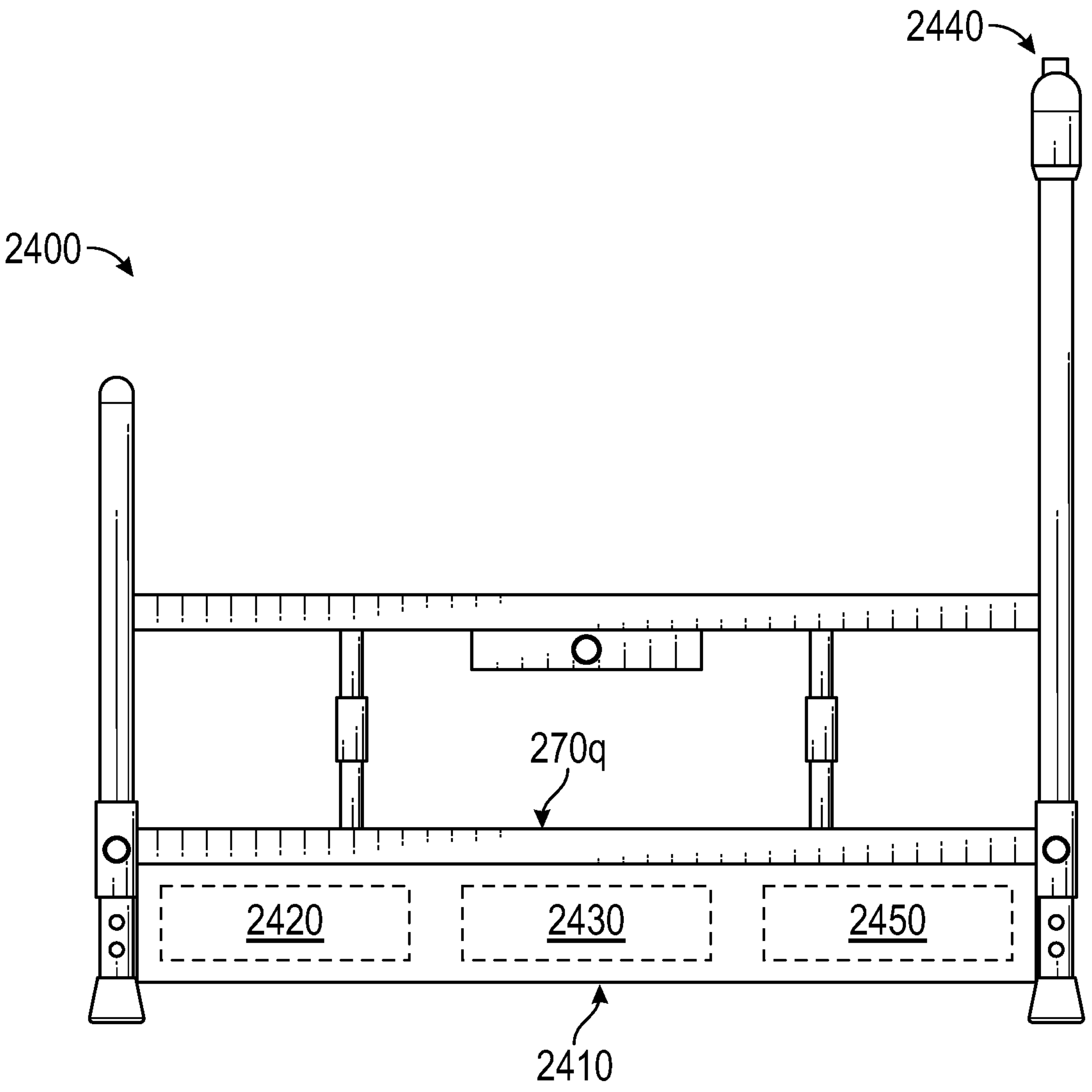
FIG. 41 is a front elevational view of another embodiment of a bed step stool, which includes a step assembly that may be raised and lowered.

With reference to FIG. 41, another embodiment of a bed step stool 2400, which includes a step assembly 270*q* that may be raised and lowered, will be described. Like elements to those shown and described with respect to FIGS. 1-4 and FIGS. 23-40 are shown and/or described with like reference numbers, but with a "q" suffix, and with the subject matter shown and/or described above with respect to FIGS. 1-4 and FIGS. 23-40 incorporated herein. A raising and lowering mechanism 2410 is disposed under the step assembly 270*q* and is used to raise and lower the step assembly 270*q* (or allows the raising and/or lowering of the step assembly 270*q*) for users that may have more difficult time stepping onto and/or stepping off of the step assembly 270*q* shown and described herein. The raising and lowering mechanism 2410 may be, for example, a stair stepper mechanism 2420 that depresses/lowers when one steps on the step assembly 270*q* and then recoils, lifting the user up after both feet are on the step assembly 270*q*. Alternatively, the raising and lowering mechanism 2410 may be a scissor hydraulic (or pneumatic/scissor pneumatic) vertical lift mechanism 2430 that a user controls via manual control 2440 to raise/lower the step assembly 270*q* as desired. Alternatively, the raising and lowering mechanism 2410 may be a counterbalance vertical lift mechanism 2450 that a user controls via manual control 2440 to raise/lower the step assembly 270*q* as desired.

In use, the user either steps on the step assembly 270*q* (e.g., when using the stair stepper mechanism 2420) or the user lowers the step assembly 270*q* (via the scissor hydraulic (or pneumatic/scissor pneumatic) vertical lift mechanism 2430 or the counterbalance vertical lift mechanism 2450) using the manual control 2440 until the step assembly 270*q* is at a suitable height for the user to step thereon. The user then steps on the step assembly 270*q*, and the raising and lowering mechanism 2410 automatically raises (e.g., via the stair stepper mechanism 2420) the step assembly 270*q* and user to a desired height or the user uses the manual control 2440 (via the scissor hydraulic (or pneumatic/scissor pneumatic) vertical lift mechanism 2430 or the counterbalance vertical lift mechanism 2450) to raise the step assembly 270*q* and user to the desired height. When getting off the bed step stool 2400, the user steps on the step assembly 270*q* and the step assembly 270*q* automatically slowly lowers (e.g., via the stair stepper mechanism 242) until it is adjacent to/on the support surface/ground, or the user uses the manual control 2440 to lower the step assembly 270*q* and user (via the scissor hydraulic (or pneumatic/scissor pneumatic) vertical lift mechanism 2430 or the counterbalance vertical lift mechanism 2450) to the desired height such as adjacent to/on the support surface/ground. The user then steps off the step assembly 270*q* and onto the support surface/floor. Thus, the bed step stool 2400 includes a first orientation where the raising and lowering mechanism orients the step assembly in a raised position to facilitate getting the user into and out of bed and a second orientation where the raising and lowering mechanism orients the step assembly in a lowered position to facilitate getting the user onto and off of the step relative to a support surface.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. A bed step stool for assisting a user into and out of bed including opposite sides, a head, and a foot, comprising:

a first support to be disposed closer to the head of the bed;

a second support to be disposed closer to the foot of the bed, the bed step stool including a side and at least one of the first support and the second support including an upper portion configured to be gripped by a user;

a wheel assembly coupled to the side of the bed step stool and including one or more wheels configured to roll on a surface;

a step assembly supported between the first support and the second support, the step assembly to enable the user to step thereon for assisting the user into and out of the bed;

wherein the first support and the second support define an unobstructed pathway for entry and exit with respect to the bed and the bed step stool that is perpendicular with respect to the sides of the bed whereby the user goes between the first support and the second support, onto the step assembly, and off the step assembly without any obstruction, and the bed step stool including a first orientation where the bed step stool is stabilized on the surface and the wheel assembly coupled to the side of the bed step stool is out of the way, and a second orientation where the bed step stool is tilted towards the side and is supported by the wheel assembly coupled to the side of the bed step stool, allowing rolling movement of the bed step stool on the surface via the one or more wheels of the wheel assembly.

2. The bed step stool of claim 1, wherein the wheel assembly is detachably coupled to the side of the bed step stool.

3. A bed step stool for assisting a user into and out of bed including opposite sides, a head, and a foot, comprising:

a first support to be disposed closer to the head of the bed;

a second support to be disposed closer to the foot of the bed;

a wheel assembly coupled to the side of the bed step stool and including one or more wheels configured to roll on a surface;

a step assembly supported between the first support and the second support, the step assembly to enable the user to step thereon for assisting the user into and out of the bed;

a raising and lowering mechanism disposed under the step assembly configured to raise and lower the step assembly;

wherein the first support and the second support define an unobstructed pathway for entry and exit with respect to the bed and the bed step stool that is perpendicular with respect to the sides of the bed whereby the user goes between the first support and the second support, onto the step assembly, and off the step assembly without any obstruction, and the bed step stool including a first orientation where the raising and lowering mechanism orients the step assembly in a raised position to facilitate getting the user into and out of bed and a second orientation where the raising and lowering mechanism orients the step assembly in a lowered position to facilitate getting the user onto and off of the step relative to a support surface.

4. The bed step stool of claim 3, wherein the raising and lowering mechanism is a stair stepper mechanism that lowers when the user steps on the step assembly and then recoils, lifting the user up after both feet are on the step assembly.

5. The bed step stool of claim 3, wherein the raising and lowering mechanism is a manual control and a hydraulic or pneumatic vertical lift mechanism that a user controls via the manual control to raise and lower the step assembly to a desired height.

6. The bed step stool of claim 3, wherein the raising and lowering mechanism is a manual control and a counterbalance vertical lift mechanism that a user controls via the manual control to raise and lower the step assembly to a desired height.

* * * * *